US012785504B2

(12) United States Patent
Klosterman et al.

(10) Patent No.: US 12,785,504 B2
(45) **Date of Patent: *Nov. 3, 2026**

(54) ELECTRIC MOTOR HAVING SEGMENTED STATOR

(71) Applicant: MILWAUKEE ELECTRIC TOOL CORPORATION, Brookfield, WI (US)

(72) Inventors: Keith M. Klosterman, Gurnee, IL (US); Matthew R. Bailey, Racine, WI (US); Jorge L. Ibarra, Milwaukee, WI (US); Lu Yang, Huizhou (CN); Hongru Huang, Shenzhen (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 80 days.

This patent is subject to a terminal disclaimer.

(21) Appl. No.: 18/390,724

(22) Filed: Dec. 20, 2023

(65) Prior Publication Data

US 2024/0120801 A1 Apr. 11, 2024

Related U.S. Application Data

(62) Division of application No. 17/895,788, filed on Aug. 25, 2022, now Pat. No. 11,894,755.

(30) Foreign Application Priority Data

Aug. 25, 2021 (CN) ......................... 202122021994.3
Nov. 3, 2021 (CN) ......................... 202122676869.6

(51) Int. Cl.
*H02K 7/14* (2006.01)
*H02K 11/33* (2016.01)

(52) U.S. Cl.
CPC ............. *H02K 7/145* (2013.01); *H02K 11/33* (2016.01); *H02K 2203/09* (2013.01); *H02K 2211/03* (2013.01)

(58) Field of Classification Search
CPC ...... H02K 7/45; H02K 11/33; H02K 2203/09; H02K 2211/03
(Continued)

(56) References Cited

U.S. PATENT DOCUMENTS 4,350,914 A 9/1982 Searle
4,698,542 A 10/1987 Muller
(Continued)

FOREIGN PATENT DOCUMENTS

CN 202068244 U 12/2011
CN 102420470 A 4/2012
(Continued)

OTHER PUBLICATIONS

International Search Report and Written Opinion for Application No. PCT/US2022/041559 dated Dec. 22, 2022 (11 pages).
(Continued)

*Primary Examiner* — Jose A Gonzalez Quinones
(74) *Attorney, Agent, or Firm* — Michael Best & Friedrich LLP

(57) ABSTRACT

An electric motor includes a rotor assembly including a rotor shaft and a stator assembly including a plurality of stator segments. Each stator segment includes a core, an insulator at least partially covering the core and including a mounting portion, and a coil winding including a wire lead. The plurality of stator segments include a first stator segment and a second stator segment adjacent the first stator segment in a circumferential direction. The electric motor also includes a printed circuit board assembly coupled to the mounting portions and configured to direct electric current to each coil winding. The printed circuit board assembly includes a plurality of peripheral slots formed at intervals about a periphery thereof. The wire leads are received into the
(Continued)

peripheral slots and soldered to electrically connect the wire leads to the printed circuit board assembly.

14 Claims, 33 Drawing Sheets

(58) Field of Classification Search
USPC ............................................................ 310/50
See application file for complete search history.

(56) References Cited

U.S. PATENT DOCUMENTS 5,029,379 A 7/1991 Niemela et al.
6,087,755 A 7/2000 Suzuki et al.
6,226,856 B1 5/2001 Kazama et al.
6,369,687 B1 4/2002 Akita et al.
6,504,284 B1 1/2003 Kazama et al.
6,538,548 B2 3/2003 Akita et al.
6,584,813 B2 7/2003 Peachee et al.
6,658,721 B2 12/2003 Kazama et al.
6,700,284 B2 3/2004 Williams et al.
6,737,785 B2 5/2004 De Luca et al.
6,744,166 B2 6/2004 Harter et al.
6,870,292 B2 3/2005 Owada et al.
6,897,591 B2 5/2005 Peachee et al.
6,941,638 B2 9/2005 Hartsfield, Jr. et al.
6,946,769 B2 9/2005 Yamamura et al.
7,012,350 B2 3/2006 Peachee et al.
7,111,380 B2 9/2006 Sheeran et al.
7,340,822 B2 3/2008 Yamamura et al.
7,345,397 B2 3/2008 Sheeran et al.
7,348,706 B2 3/2008 Ionel et al.
7,382,075 B2 6/2008 Wang et al.
7,414,347 B2 8/2008 Wang et al.
7,468,570 B2 12/2008 Ionel et al.
7,471,025 B2 12/2008 Sheeran et al.
7,583,002 B2 9/2009 Lyle et al.
7,586,231 B2 9/2009 Wang et al.
7,595,578 B2 9/2009 Aramaki et al.
7,667,367 B2 2/2010 Matsuo et al.
7,705,509 B2 4/2010 Harada et al.
7,705,510 B2 4/2010 Pflueger et al.
7,821,175 B2 10/2010 Ionel et al.
7,986,064 B2 7/2011 Katagiri et al.
8,008,832 B2 8/2011 Rhode
8,018,115 B2 9/2011 Lyle
8,044,551 B2 10/2011 Kim
8,115,362 B2 2/2012 Okamoto et al.
8,222,791 B2 7/2012 Lyle
8,288,903 B2 10/2012 Matsuda et al.
8,400,041 B2 3/2013 Modi et al.
8,492,948 B2 7/2013 Wang et al.
8,497,618 B2 7/2013 Kato
8,638,019 B2 1/2014 Stark et al.
8,661,651 B2 3/2014 Tsuiki et al.
8,736,129 B2 5/2014 Wang et al.
8,736,130 B2 5/2014 Modi et al.
8,736,134 B2 5/2014 Lyle
8,816,544 B2 8/2014 Tanimoto et al.
9,000,629 B2 4/2015 Yokogawa et al.
9,343,930 B2 5/2016 Hoffman et al.
9,419,500 B2 8/2016 Ryu
9,450,465 B2 9/2016 Eckert et al.
9,455,606 B2 9/2016 Ewert et al.
9,641,029 B2 5/2017 Kreidler et al.
9,653,951 B2 5/2017 Kreidler
9,806,566 B2 10/2017 Nagao et al.
9,915,156 B2 3/2018 Jones et al.
10,020,695 B2 7/2018 Chuang
10,063,118 B2 8/2018 Yoshida et al.
10,348,163 B2 7/2019 Lin et al.
10,404,122 B2 9/2019 Peng et al.
10,468,930 B2 11/2019 Dawson et al.
10,476,336 B2 11/2019 Pithwa
10,491,057 B2 11/2019 Seki et al.
10,505,407 B2 12/2019 Nagao et al.
10,530,200 B2 1/2020 Jayasoma et al.
10,594,174 B2 3/2020 Kreidler et al.
11,043,869 B2 6/2021 Hsu
11,139,722 B2 10/2021 Velderman et al.
11,355,984 B2 6/2022 Hishida et al.
11,404,930 B2 8/2022 Hishida et al.
2002/0093269 A1 7/2002 Harter et al.
2002/0139606 A1 10/2002 Williams et al.
2004/0051417 A1 3/2004 Yamazaki et al.
2006/0138894 A1* 6/2006 Harada .................. H02K 15/02
310/156.19
2007/0011487 A1 1/2007 Probst et al.
2007/0278876 A1 12/2007 Haga et al.
2007/0279178 A1 12/2007 Zimmer et al.
2008/0219867 A1* 9/2008 Sakata .................. H02K 3/522
310/71
2011/0215660 A1 9/2011 Goto et al.
2011/0229355 A1 9/2011 Hara et al.
2012/0256499 A1 10/2012 Bader et al.
2012/0286593 A1 11/2012 Yokogawa et al.
2013/0026878 A1 1/2013 Feuerrohr et al.
2013/0169086 A1* 7/2013 Chai ........................ H02K 3/28
310/71
2013/0200742 A1 8/2013 Seki et al.
2013/0342041 A1 12/2013 Ayers et al.
2014/0001903 A1* 1/2014 Gasser .................. H02K 5/161
310/90
2014/0015349 A1 1/2014 Chamberlin et al.
2014/0361657 A1 12/2014 Vohlgemuth
2015/0357886 A1* 12/2015 Ishizeki ................ F04C 11/008
310/71
2016/0013697 A1 1/2016 Haga et al.
2016/0156246 A1 6/2016 Hotori et al.
2017/0201135 A1 7/2017 Kai et al.
2017/0288499 A1 10/2017 Beyerl et al.
2017/0358966 A1 12/2017 Fung et al.
2018/0048194 A1* 2/2018 Endo ...................... H02K 1/276
2019/0058373 A1 2/2019 Fogle et al.
2019/0140509 A1 5/2019 Kitora et al.
2019/0149014 A1 5/2019 Haga et al.
2019/0157919 A1 5/2019 Ge et al.
2020/0036239 A1 1/2020 Seki et al.
2020/0036255 A1* 1/2020 Shirai .................... H02K 3/522
2020/0076259 A1 3/2020 Hackl et al.
2020/0119600 A1 4/2020 Inuzuka
2020/0220410 A1 7/2020 Hishida et al.
2020/0220415 A1 7/2020 Hishida et al.
2020/0235629 A1 7/2020 Dolnicki et al.
2020/0259385 A1 8/2020 Hishida et al.
2021/0028665 A1 1/2021 Ogawa et al.
2021/0050760 A1 2/2021 Yamaguchi et al.
2021/0152038 A1 5/2021 Kutrovich et al.
2022/0077750 A1 3/2022 Velderman et al.
2022/0166277 A1 5/2022 Ogawa et al.
2022/0166278 A1 5/2022 Ogawa et al.
2022/0200397 A1 6/2022 Mikkelsen et al.
2022/0224173 A1 7/2022 Inuzuka
2022/0263371 A1 8/2022 Zbyrowski et al.
2023/0067680 A1 3/2023 Klosterman et al.
2023/0361651 A1 11/2023 Inuzuka
2024/0063666 A1 2/2024 Onihashi et al.

FOREIGN PATENT DOCUMENTS

CN 102545450 A 7/2012
CN 103368304 A * 10/2013 ............. H02K 3/522
CN 204334137 U 5/2015
CN 204465159 U 7/2015
CN 106487142 A 3/2017
CN 107546900 A 1/2018
CN 107666189 A 2/2018
CN 207382070 U 5/2018
CN 104518577 B 4/2019
CN 109586431 A 4/2019
CN 109586481 A 4/2019
CN 109586483 A 4/2019
CN 209434970 U 9/2019

(56) References Cited

FOREIGN PATENT DOCUMENTS

| | | | | | |
|---|---|---|---|---|---|
| CN | 110611389 | A | | 12/2019 | |
| CN | 111817470 | A | | 10/2020 | |
| CN | 111817471 | A | | 10/2020 | |
| CN | 216981644 | U | | 7/2022 | |
| DE | 10359577 | A1 | | 6/2005 | |
| DE | 10258218 | B4 | | 8/2006 | |
| DE | 102007013211 | A1 | | 10/2007 | |
| DE | 102008033601 | A1 | | 1/2010 | |
| DE | 102011114280 | A1 | | 3/2013 | |
| DE | 102012210365 | A1 | | 12/2013 | |
| DE | 102012214567 | A1 | | 2/2014 | |
| DE | 102013007645 | A1 | | 11/2014 | |
| DE | 112013005061 | T5 | * | 7/2015 | ............... H02K 3/28 |
| DE | 102013223727 | B4 | | 8/2015 | |
| DE | 102017208350 | A1 | | 11/2018 | |
| DE | 102018118465 | A1 | | 2/2019 | |
| DE | 102018208556 | A1 | | 12/2019 | |
| DE | 102021102761 | B3 | | 8/2022 | |
| EP | 0748025 | B1 | | 10/2006 | |
| EP | 2330722 | A2 | | 6/2011 | |
| EP | 2985883 | B1 | | 10/2018 | |
| JP | 2003032952 | A | | 1/2003 | |
| JP | 2016096705 | A | | 5/2016 | |
| JP | 2016197966 | A | * | 11/2016 | |
| WO | 2007137656 | A1 | | 12/2007 | |
| WO | 2010066493 | A2 | | 6/2010 | |
| WO | 2011080140 | A2 | | 7/2011 | |
| WO | 2012143088 | A2 | | 10/2012 | |
| WO | 2012143089 | A2 | | 10/2012 | |
| WO | 2016101983 | A1 | | 6/2016 | |
| WO | 2019117207 | A1 | | 6/2019 | |
| WO | 2019146450 | A1 | | 8/2019 | |
| WO | 2019156600 | A1 | | 8/2019 | |

OTHER PUBLICATIONS

Extended European Search Report for Application No. 22862098.5 dated Jun. 30, 2025 (12 pages).

* cited by examiner

ELECTRIC MOTOR HAVING SEGMENTED STATOR

CROSS-REFERENCE TO RELATED APPLICATIONS

This application is a divisional of U.S. patent application Ser. No. 17/895,788, filed Aug. 25, 2022, now U.S. Pat. No. 11,894,755, which claims priority to Chinese Utility Model Application No. 202122676869.6 filed on Nov. 3, 2021, now issued as Chinese Utility Model No. ZL202122676869.6, and to Chinese Utility Model Application No. 202122021994.3 filed on Aug. 25, 2021, the entire contents of all of which are incorporated herein by reference.

FIELD OF THE INVENTION

The present invention relates to electric motors, and more specifically to stators for electric motors.

BACKGROUND OF THE INVENTION

A stator for an electric motor can be formed from a plurality of annular stator segments arranged into a tubular shape.

SUMMARY OF THE INVENTION

The present invention provides, in one aspect, a power tool including a housing and an electric motor. The electric motor includes a rotor assembly including a rotor shaft and a stator assembly including a plurality of stator segments. Each stator segment includes a core, an insulator at least partially covering the core, and a coil winding. The insulator includes a mounting portion. The electric motor also includes a printed circuit board assembly configured to direct electric current to each coil winding. The electric motor further includes a bus bar assembly attached to at least one of the mounting portions and configured to electrically connect the coil windings to the printed circuit board assembly. The bus bar assembly includes a molded body and a plurality of conductors. The bus bar assembly defines a bearing pocket. The electric motor further includes rotor bearing that is received into the bearing pocket and that supports the rotor shaft for rotation relative to the stator assembly.

The present invention provides, in another aspect, an electric motor including a rotor assembly including a rotor shaft and a stator assembly including a plurality of stator segments. Each stator segment includes a core, an insulator at least partially covering the core and including a mounting portion, and a coil winding including a wire lead. The plurality of stator segments include a first stator segment and a second stator segment adjacent the first stator segment in a circumferential direction. The electric motor also includes a printed circuit board assembly coupled to the mounting portions and configured to direct electric current to each coil winding. The printed circuit board assembly includes a plurality of peripheral slots formed at intervals about a periphery thereof. The wire leads are received into the peripheral slots and soldered to electrically connect the wire leads to the printed circuit board assembly.

The present invention provides, in another aspect, an electric motor including a rotor assembly including a rotor shaft and a stator assembly including a plurality of stator segments. Each stator segment includes a core, an insulator at least partially covering the core, and a coil winding. The plurality of stator segments includes a first stator segment and a second stator segment adjacent the first stator segment in a circumferential direction. The electric motor also includes a printed circuit board assembly configured to direct electric current to each coil winding. The electric motor further includes a bus bar assembly attached to the stator assembly and configured to electrically connect the coil windings to the printed circuit board assembly. The bus bar assembly includes a molded body and a plurality of conductors, the bus bar assembly defining a bearing pocket. The electric motor also includes rotor bearing that is received into the bearing pocket and that supports the rotor shaft for rotation relative to the stator assembly.

The present invention provides, in another aspect, an electric motor including a rotor assembly including a rotor shaft and a stator assembly including a plurality of stator segments. Each stator segment includes a core, an insulator at least partially covering the core, and a coil winding. The plurality of stator segments includes a first stator segment and a second stator segment adjacent the first stator segment in a circumferential direction. The electric motor also includes a bus bar assembly attached to the stator assembly and configured to electrically connect to the coil windings. The bus bar assembly includes a molded body and a plurality of conductors. The molded body includes a disk portion and a terminal block portion extending axially from a circumferential edge of the disk portion. The disk portion defines a bearing pocket and the terminal block portion supports a plurality of terminals of the plurality of conductors. The electric motor also includes rotor bearing that is received into the bearing pocket and that supports the rotor shaft for rotation relative to the stator assembly.

The present invention provides, in another aspect, an electric motor including a rotor assembly including a rotor shaft and a stator assembly including a plurality of stator segments. Each stator segment includes a core, an insulator at least partially covering the core, a coil winding having a wire lead, and a terminal affixed to the insulator. The wire lead is electrically and mechanically connected to the terminal. The electric motor also includes a printed circuit board assembly coupled to the terminals and configured to direct electric current to each coil winding. The plurality of stator segments comprises a first stator segment and a second stator segment adjacent the first stator segment in a circumferential direction.

The present invention provides, in another aspect, an electric motor including a rotor assembly including a rotor shaft and a stator assembly including a plurality of stator segments. Each stator segment includes a core, an insulator at least partially covering the core, and a coil winding. The plurality of stator segments includes a first stator segment and a second stator segment adjacent the first stator segment in a circumferential direction. The electric motor also includes a bus bar assembly attached to the stator assembly and configured to electrically connect to the coil windings. The bus bar assembly includes a molded body and a plurality of conductors. The molded body includes a disk portion defining a bearing pocket. Each conductor includes a terminal protruding radially outward from the disk portion. The electric motor further includes a rotor bearing that is received into the bearing pocket and that supports the rotor shaft for rotation relative to the stator assembly.

The present invention provides, in another aspect, an electric motor including a rotor assembly including a rotor shaft and a stator assembly including a plurality of stator segments. Each stator segment includes a core, an insulator at least partially covering the core, and a coil winding. The plurality of stator segments include a first stator segment and a second stator segment adjacent the first stator segment in a circumferential direction. The electric motor also includes a bus bar assembly attached to the stator assembly and configured to electrically connect to the coil windings. The bus bar assembly includes a molded body and a plurality of conductors, the molded body defining a bearing pocket, each conductor including a terminal protruding outward from the molded body. Each terminal includes a leg portion. The leg portions together define a plane that extends perpendicular to a central axis of the electric motor. The electric motor further includes a rotor bearing that is received into the bearing pocket and that supports the rotor shaft for rotation relative to the stator assembly.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
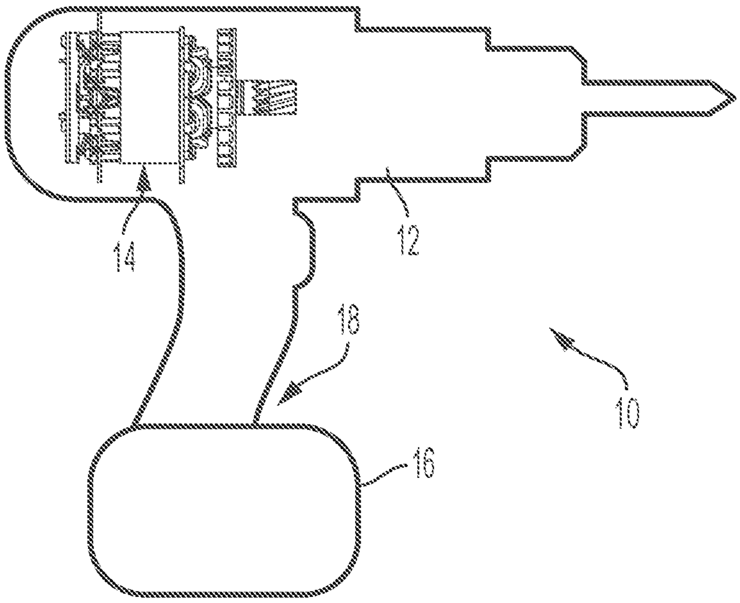
FIG. 1 is a perspective view of a power tool according to one embodiment.
Figure 2:
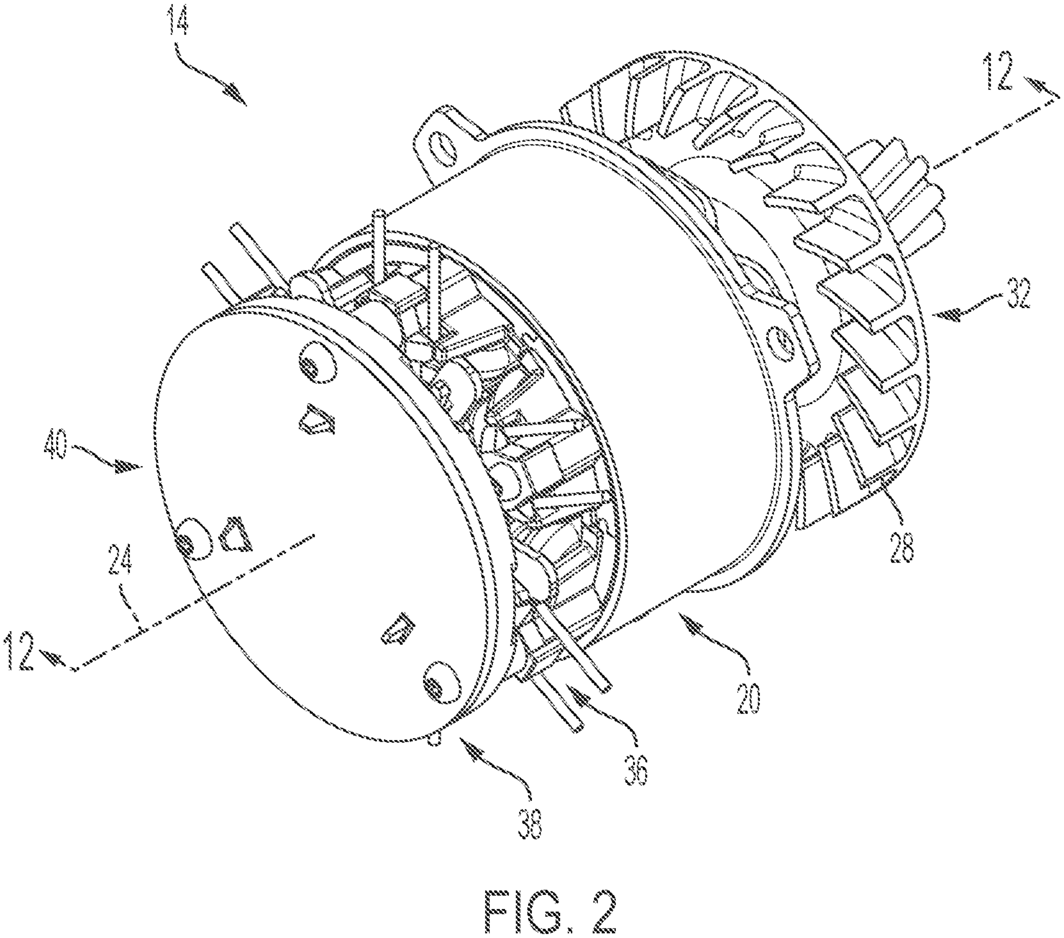
FIG. 2 is a perspective view of an electric motor of the power tool of FIG. 1.

FIGS. 1 and 2 illustrate a power tool 10 such as, e.g., a drill, a rotary impact tool, and the like. The power tool 10 includes a housing 12 and an electric motor 14. The power tool 10 is operable with a battery pack 16 removably coupled to a battery receptacle 18 located at a bottom end of the housing 12. The battery pack 16 includes a plurality of battery cells (not shown), which are electrically connected to provide the desired output (e.g., nominal voltage, current capacity, etc.) of the battery pack 16. The electric motor 14 receives power from the battery pack 16 when the battery pack 16 is coupled to the battery receptacle 18.

In some embodiments, the power tool 10 may include a power cord for electrically connecting the motor 14 to a source of AC power. The battery pack 16 is the preferred means for powering the power tool 10, however, because a cordless power tool can be used in locations where other power sources are unavailable.

Figure 3:
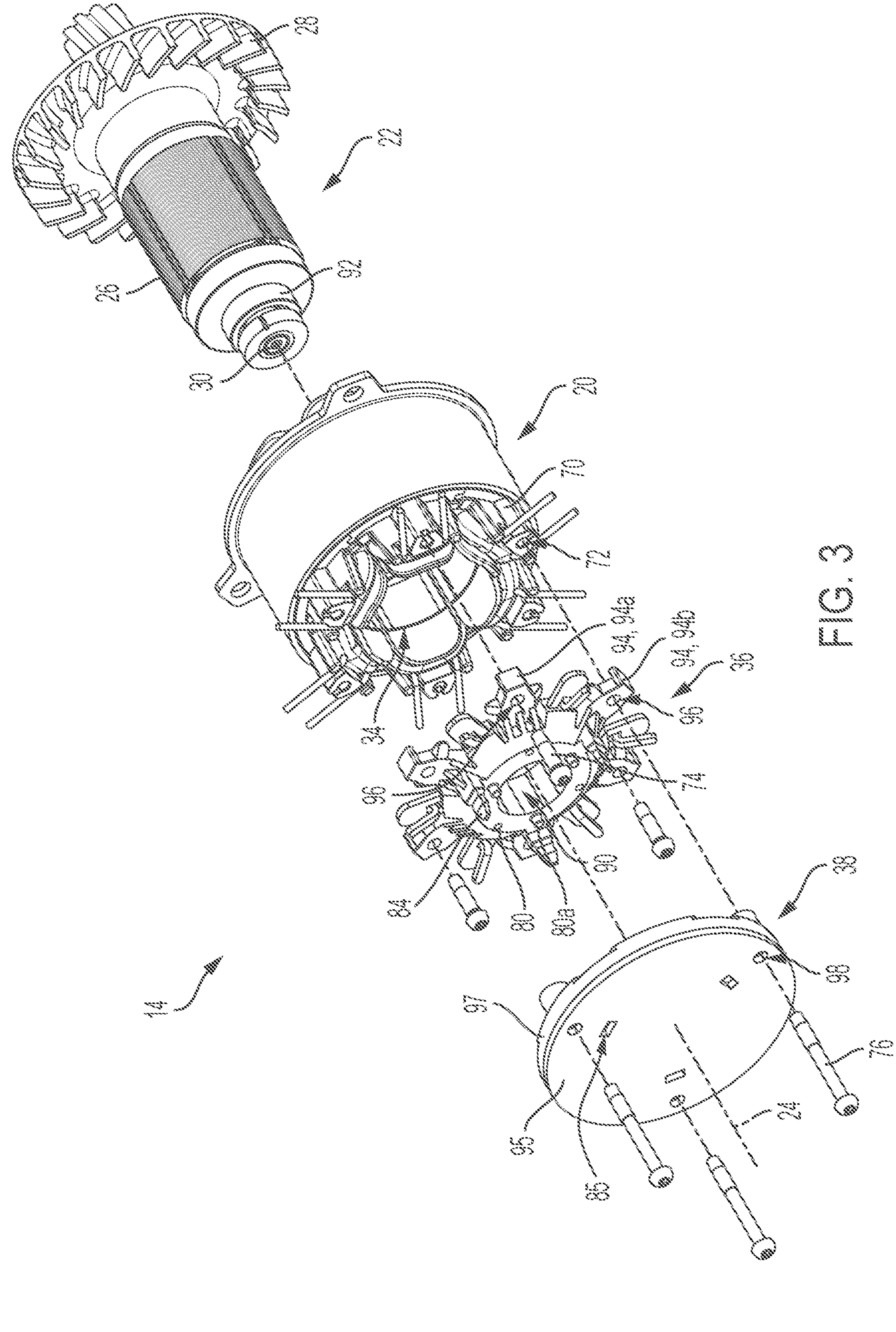
FIGS. 3 and 4 are exploded perspective views of the electric motor of FIG. 2.
Figure 4:
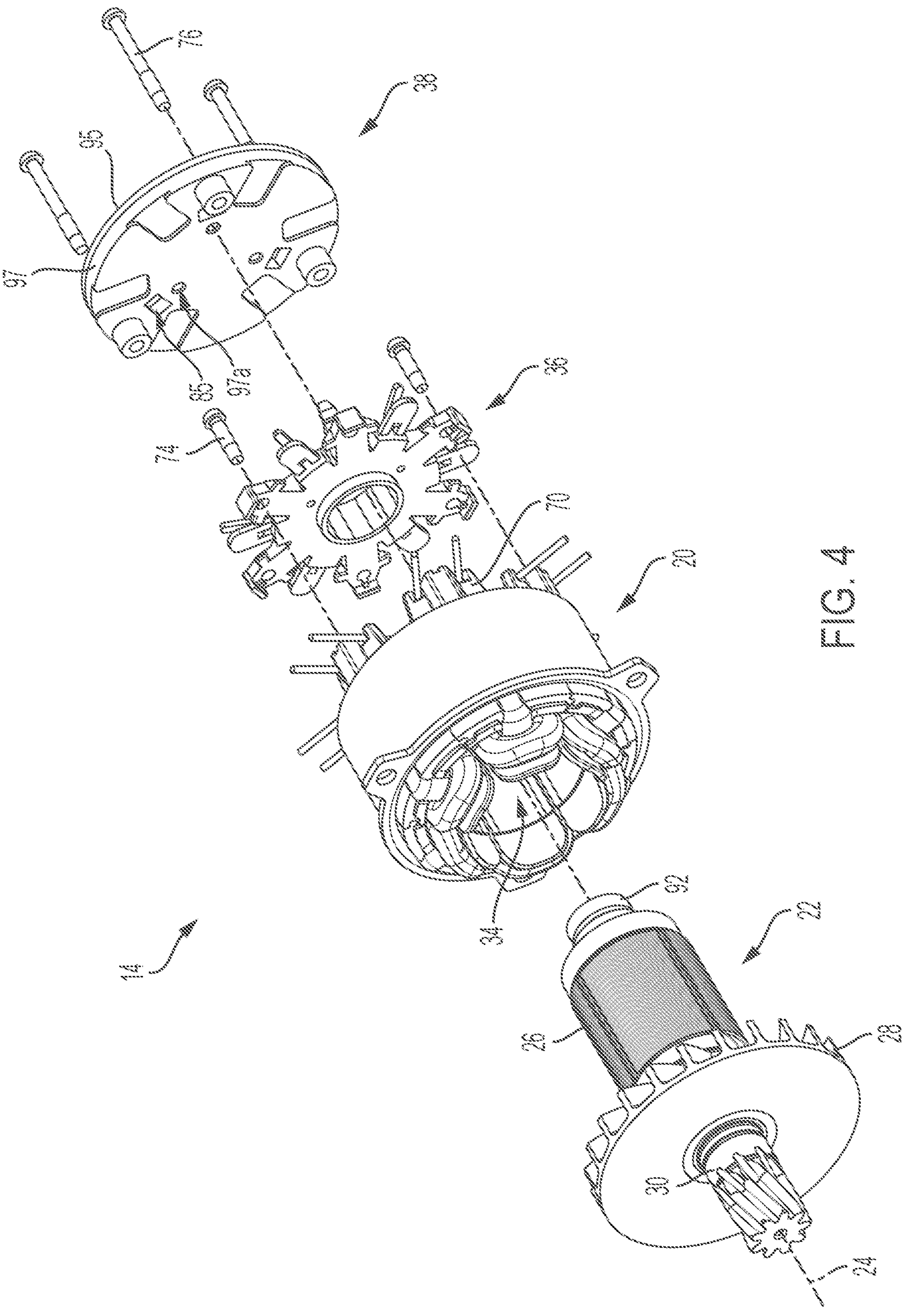
Figure 6:
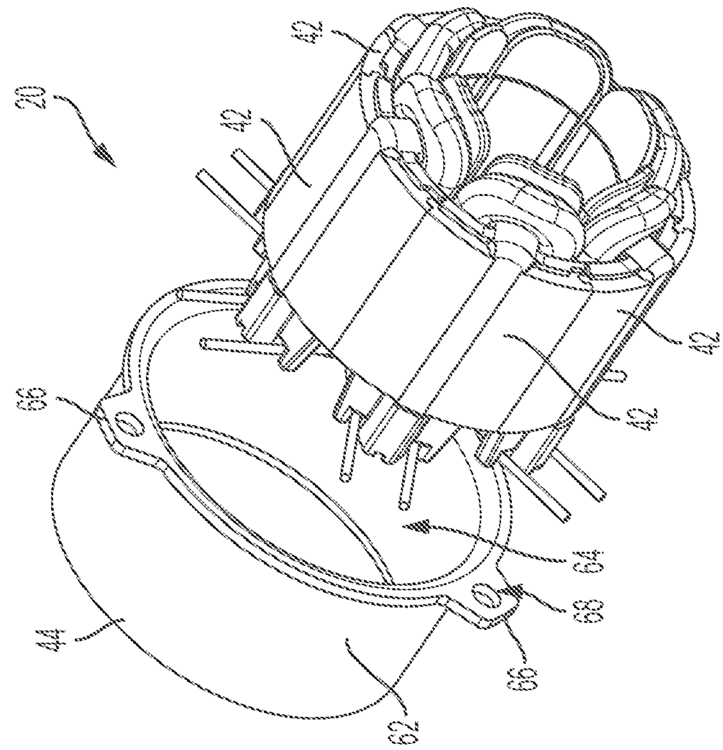
FIG. 6 is a partially exploded perspective view illustrating the stator assembly of FIG. 5.
Figure 5:
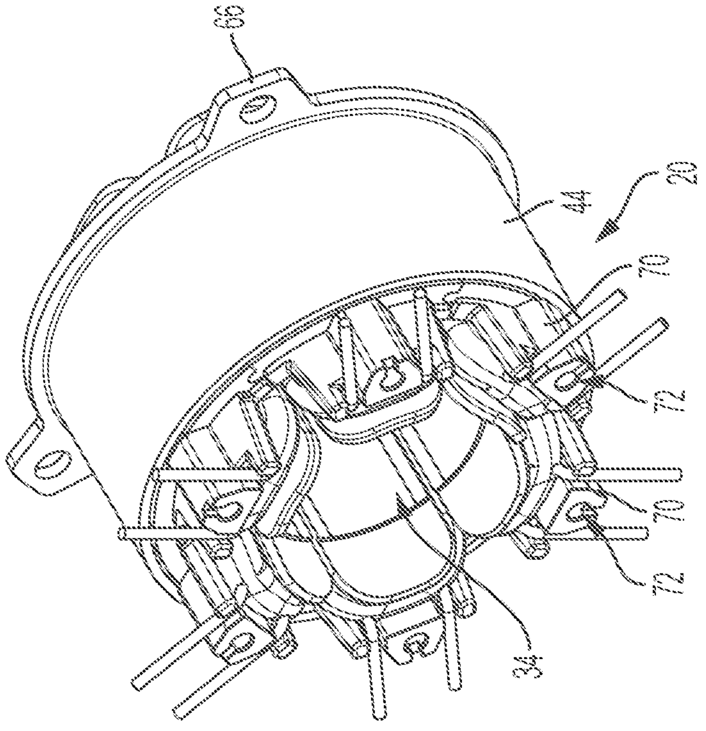
FIG. 5 is a perspective view illustrating a stator assembly of the electric motor of FIG. 2.

With reference to FIGS. 2-4, the illustrated motor 14 is a brushless direct current ("BLDC") motor with a stator assembly 20 and a rotor assembly 22 that is rotatable with respect to the stator assembly 20 about an axis 24. The rotor assembly 22 includes a rotor body 26 and a fan 28 that are each supported on a rotor shaft 30. The fan 28 is located adjacent a first end or front end 32 of the motor 14. The stator assembly 20 includes a central cavity 34 that receives the rotor assembly 22 for rotation about the axis 24. The motor 14 also includes a bus bar assembly 36 and a printed circuit board assembly (PCBA) 38 that are each coupled to the stator assembly 20 at a second end or rear end 40 of the motor 14 opposite the front end 32.

With reference to FIGS. 5-9, the stator assembly 20 is a segmented stator assembly 20 including, in the illustrated embodiment, six stator segments 42 arranged within a tubular housing 44. Each stator segment 42 includes a core 46, an overmolded insulator 48, and a stator winding 50. Adjacent stator segments 42 are interconnected to each other with a notch and protrusion interlock 52. Specifically, each stator segment 42 includes a longitudinally extending notch 54 provided in a first circumferential end face 56, and a longitudinally extending protrusion 58 protruding from a second circumferential end face 60. The notch 54 of one stator segment 42 receives the protrusion 58 of the adjacent stator segment 42 to align two adjacent stator segments 42.

The tubular housing 44 surrounds the arranged stator segments 42 to fix the stator segments 42 together. Specifically, the tubular housing 44 includes a tubular wall 62 that defines an inner cavity 64, and the stator segments 42 are received into the inner cavity 64 such that the tubular wall 62 converges about the stator segments 42. In one example, the tubular housing 44 can be heated to expand an outside diameter of the tubular wall 62, and then the tubular housing 44 can be pressed onto the stator segments 42. As the tubular housing 44 cools, the tubular wall 62 contracts about the stator segments 42 to secure the assembly. In the illustrated embodiment, the tubular housing 44 also includes mounting tabs 66 extending radially outward from the tubular wall 62, with each mounting tab 66 defining a mounting aperture 68 configured to receive a fastener (e.g., a screw) for securing the motor 14 to, e.g., a gearcase (not shown).

Figure 8:
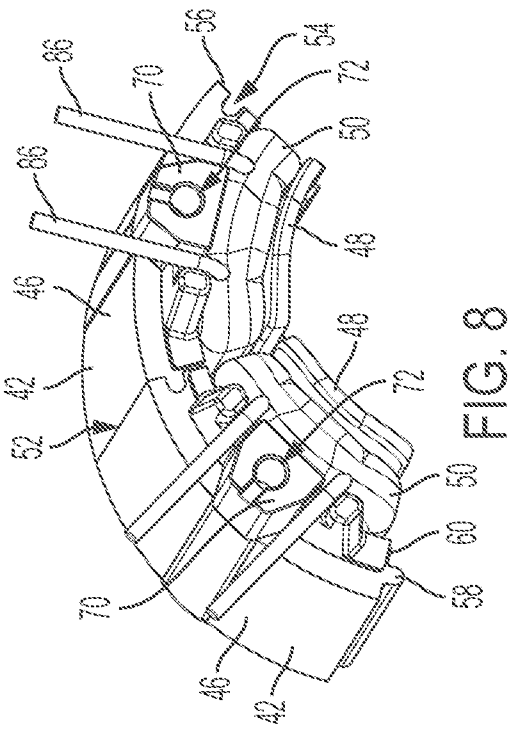
FIGS. 8 and 9 are perspective views illustrating portions of the stator assembly of FIG. 5.
Figure 9:
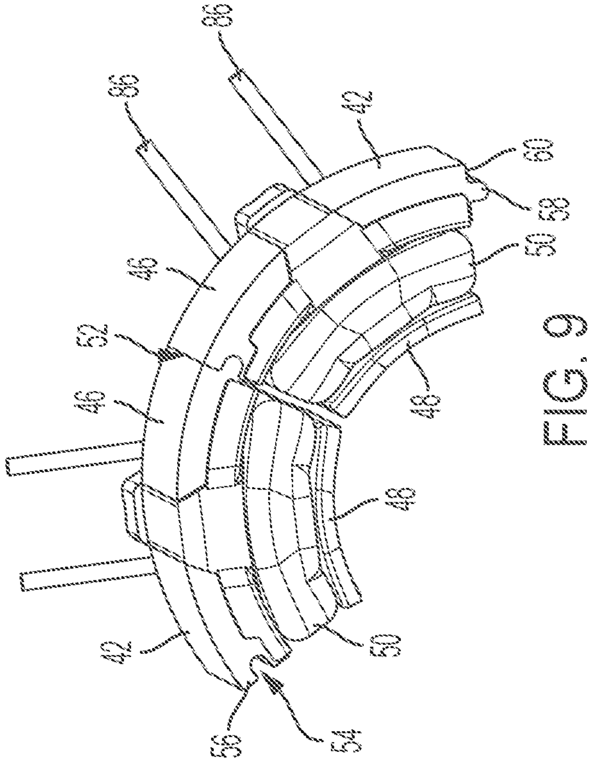
Figure 7:
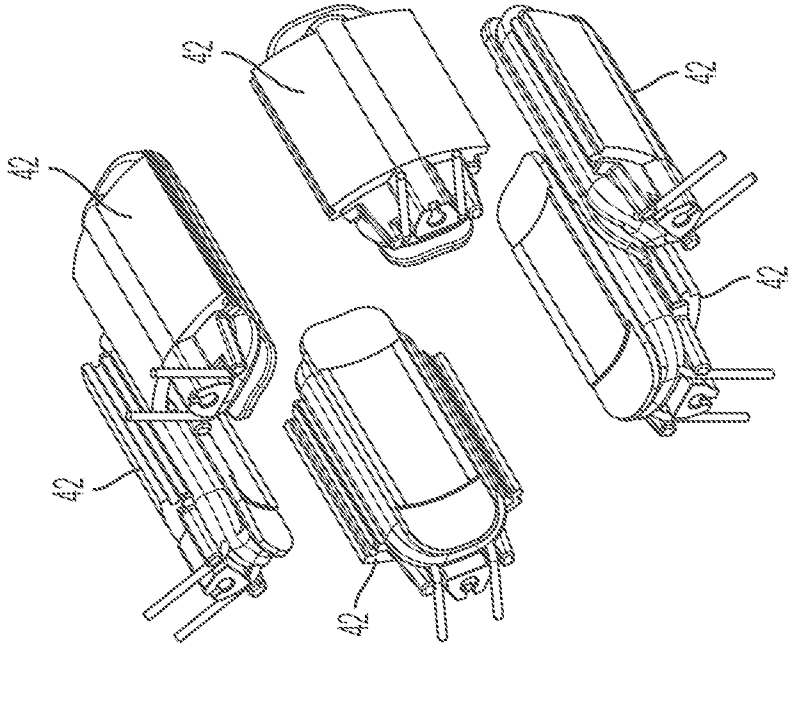
FIG. 7 is a partially exploded perspective view illustrating the stator assembly of FIG. 5 with portions removed.

With reference to FIG. 8, each overmolded insulator 48 includes a mounting portion 70 protruding toward the rear end 40 of the motor 14. Each mounting portion 70 defines an axially extending threaded bore 72 that receives a first fastener 74 or a second fastener 76 to secure the bus bar assembly 36 and the PCBA 38 to the stator assembly 20 (FIGS. 3 and 4).

Figure 11:
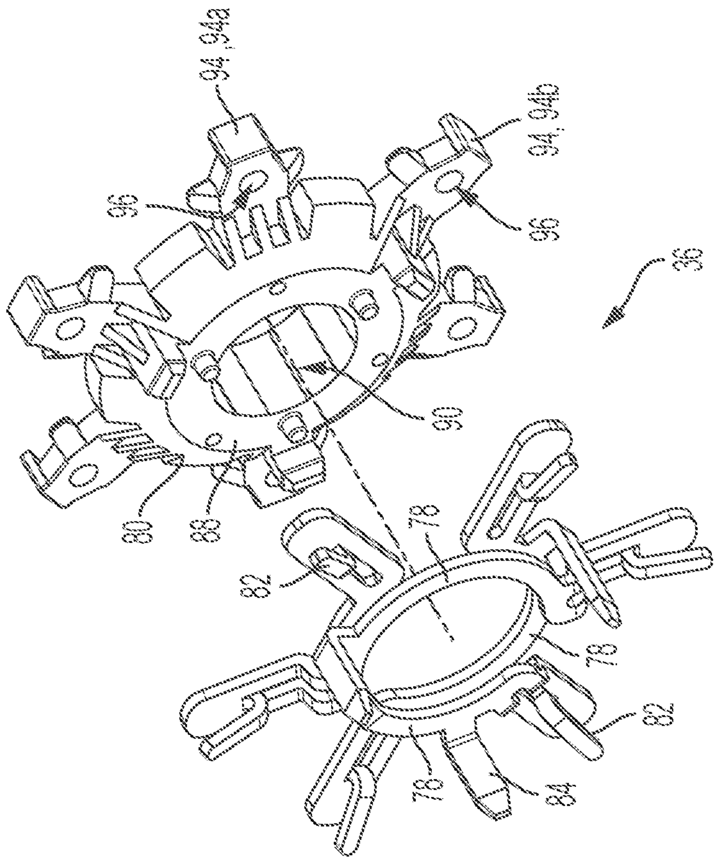
FIG. 11 is an exploded perspective view illustrating the bus bar assembly of FIG. 10.
Figure 10:
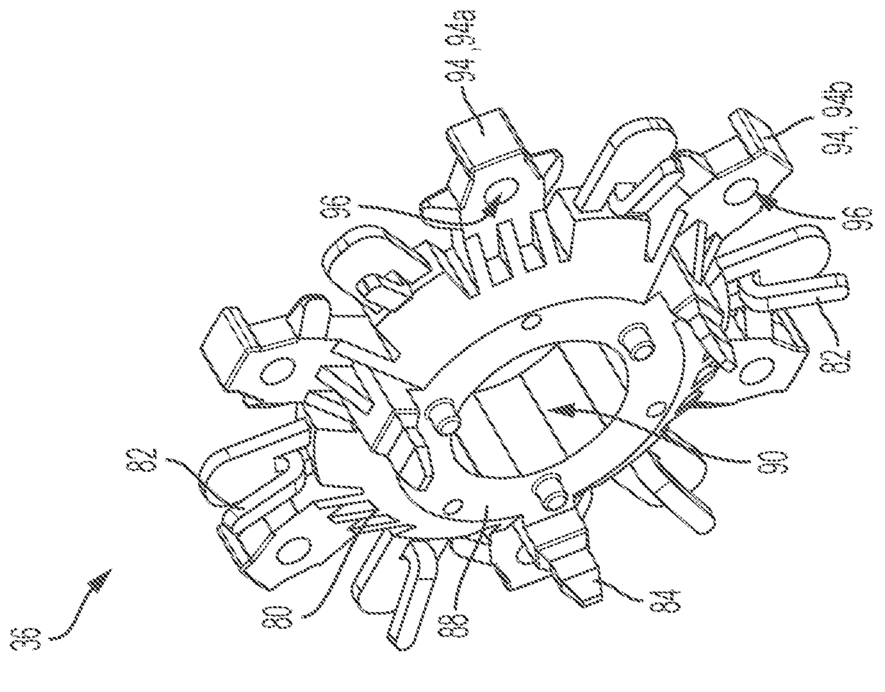
FIG. 10 is a perspective view illustrating a bus bar assembly of the electric motor of FIG. 2.

With reference to FIGS. 10 and 11, the bus bar assembly 36 includes three annular conductors 78 generally extending circumferentially about the motor 14, and an overmolded body 80 that fixedly supports the conductors 78. Each conductor 78 includes two tangs 82 provided at opposite ends of the conductor 78, and a terminal 84 extending in the axial direction of the motor 14. Each terminal 84 mechanically and electrically connects to the PCBA 38. Specifically, the PCBA 38 includes a plurality of apertures 85 (FIGS. 3 and 12) corresponding to the locations of the terminals 84. During assembly, the terminals 84 are inserted into the apertures 85 and soldered to the PCBA 38 to mechanically and electrically connect the terminals 84 to the PCBA 38. Each stator winding 50 includes a pair of leads 86 (FIG. 8) that connect to the adjacent tangs 82 of the conductors 78. The leads 86 can be soldered or fused to the tangs 82. In this way, the conductors 78 electrically connect the stator windings 50 to the PCBA 38. The PCBA 38 receives power from the battery pack 16 and selectively applies electrical current to the windings 50 to thereby cause the rotor shaft 30 to rotate about the axis 24.

Figure 12:
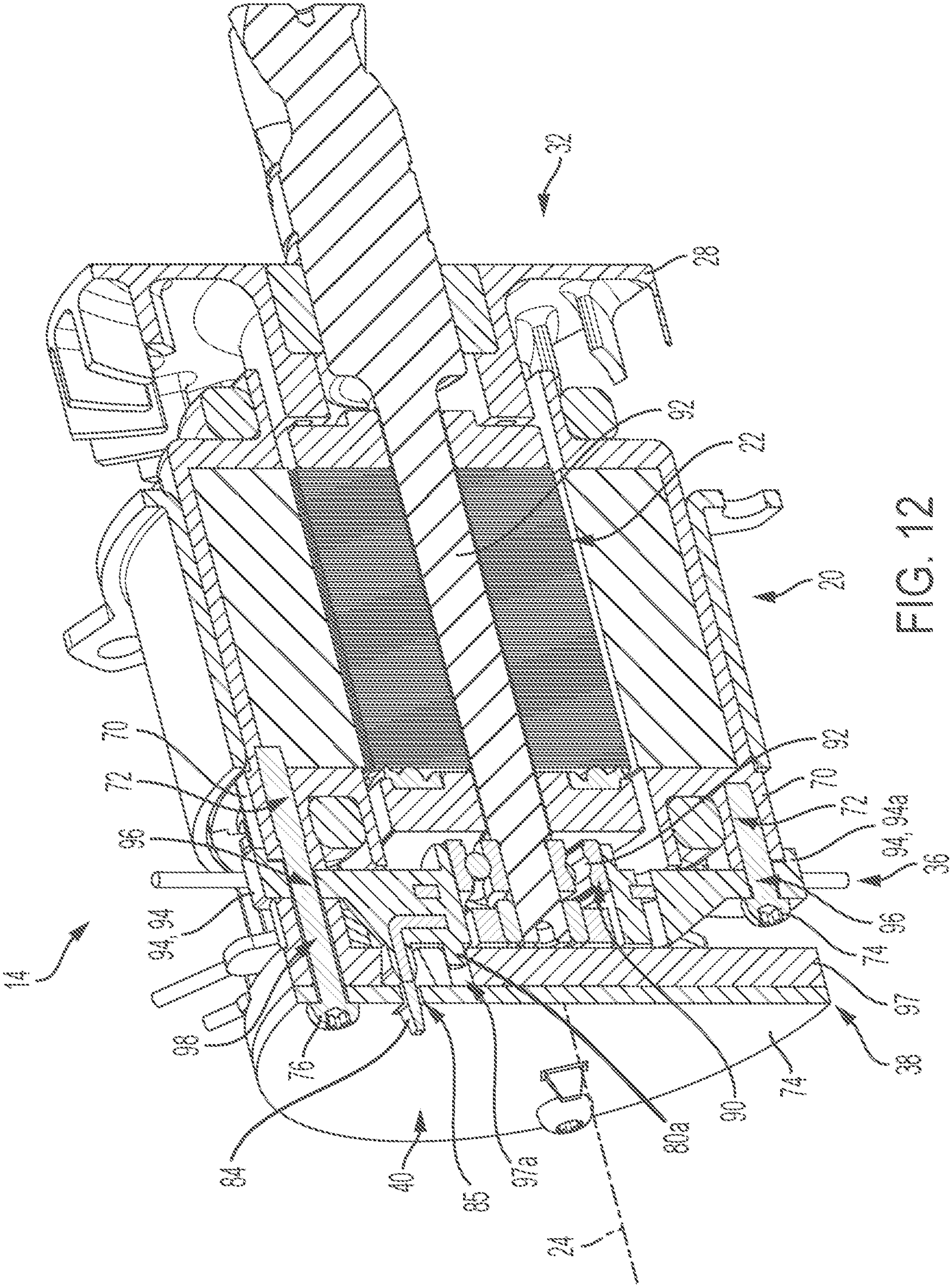
FIG. 12 is a perspective cross-sectional view of the electric motor of FIG. 2, taken along lines 12-12 of FIG. 2.

The overmolded body 80 includes a central hub 88 that defines a central aperture or bearing pocket 90 that receives a rotor bearing 92 (FIGS. 10-12). The rotor bearing 92 receives the rotor shaft 30 to rotatably support the rotor assembly 22. The overmolded body 80 further includes radial arms 94 that extend radially outward from the central hub 88. In some embodiments, the number of radial arms 94 corresponds to the number of mounting portions 70 of the stator assembly 20. In the illustrated embodiment, the overmolded body includes six radial arms 94 that correspond to the six mounting portions 70 of the six stator segments 42. Each radial arm 94 defines a first aperture 96 that aligns with the threaded bore 72 of the corresponding mounting portion 70.

With reference to FIGS. 3 and 12, the bus bar assembly 36 is secured to the mounting portions 70 of the stator assembly 20 by the first fasteners 74 and the second fasteners 76, and the PCBA 38 is secured to the stator assembly 20 by the second fasteners 76. The PCBA 38 includes second apertures 98 extending through the PCBA 38 and corresponding to the first apertures 96 of every other radial arm 94 in the circumferential direction. Thus, the radial arms 94 include first radial arms 94*a* and second radial arms 94*b*. The first radial arms 94*a* are coupled directly to the mounting portions 70 by the first fasteners 74. The second radial arms 94*b* are coupled to both the mounting portions 70 and the PCBA 38 by the second fasteners 76. More specifically, the first fasteners 74 are received through the first apertures 96 of the first radial arms 94*a* and tighten into the threaded bores 72 to secure the first radial arms 94*a* to the mounting portions 70. The second fasteners 76 are received through the second apertures 98 of the PCBA 38 and through the first apertures 96 of the second radial arms 94*b*, and tighten into the threaded bores to secure both the PCBA 38 and the second radial arms 94 to the mounting portions 70. As such, the bus bar assembly 36 is secured to each mounting portion 70 of each stator segment 42, and supports the rotor bearing 92 to center the rotor assembly 22 with respect to the stator assembly 20.

With reference to FIGS. 3, 4, and 12, the PCBA 38 includes a printed circuit board (PCB) 95 and a heat sink 97 secured to the PCB 95. The heat sink 97 includes a plurality of recesses 97*a*, and the overmolded body 80 includes a plurality of axially extending protrusions 80*a* that are received within the corresponding recesses 97*a* to align the PCBA 38 with the bus bar assembly 36.

FIGS. 13-16 illustrate a stator assembly 120 according to another embodiment of the disclosure. The stator assembly 120 is similar to the stator assembly 20 described above and includes much of the same structure as the stator assembly 20. And, the stator assembly 120 is operable with each the rotor assembly 22, the bus bar assembly 36, and the PCBA 38 described above. Features and elements of the stator assembly 120 that are similar to the features and elements of the stator assembly 20 are assigned the same reference numerals "plus 100." It should be understood that the features of the stator assembly 120 that are not explicitly described below have the same properties as the features of the stator assembly 20.

Figure 13:
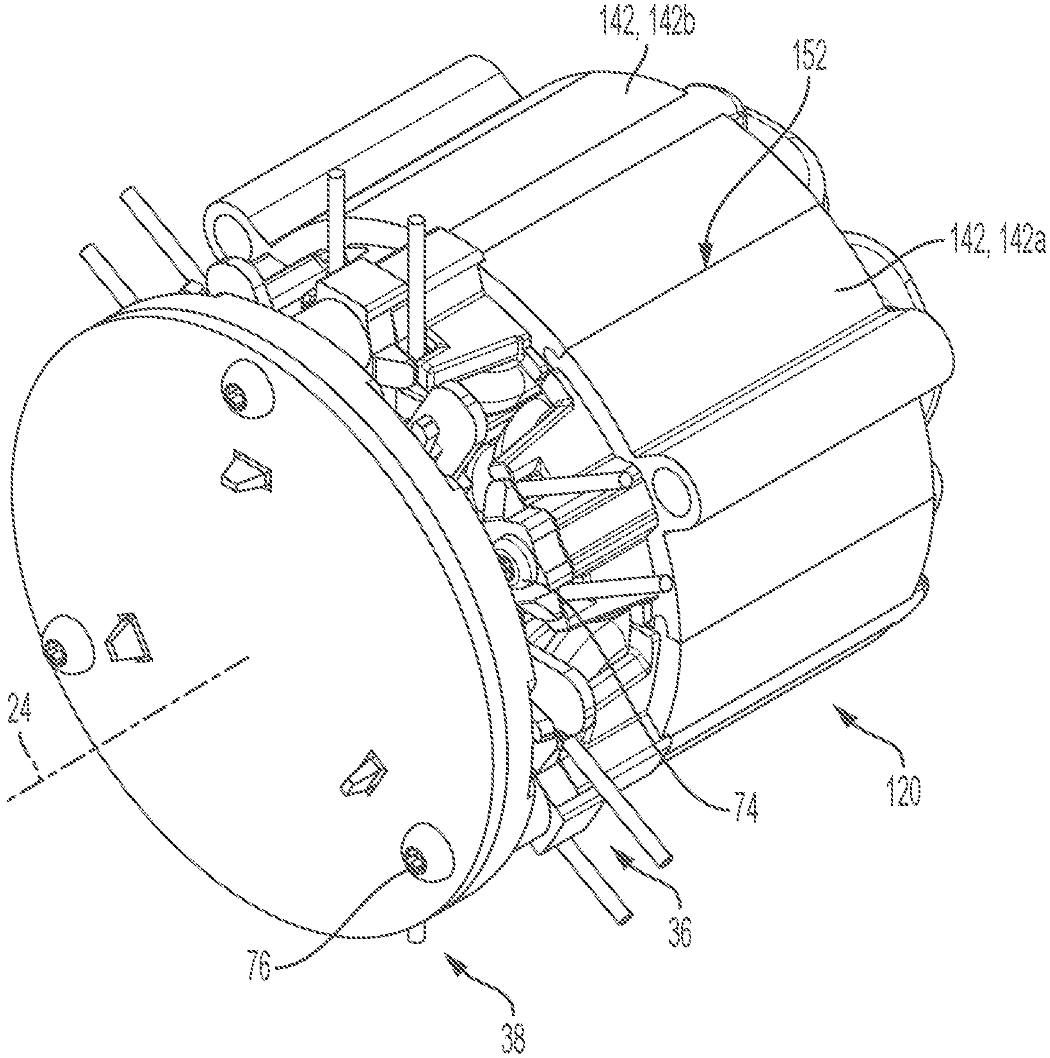
FIG. 13 is a perspective view of a stator assembly according to another embodiment.
Figure 14:
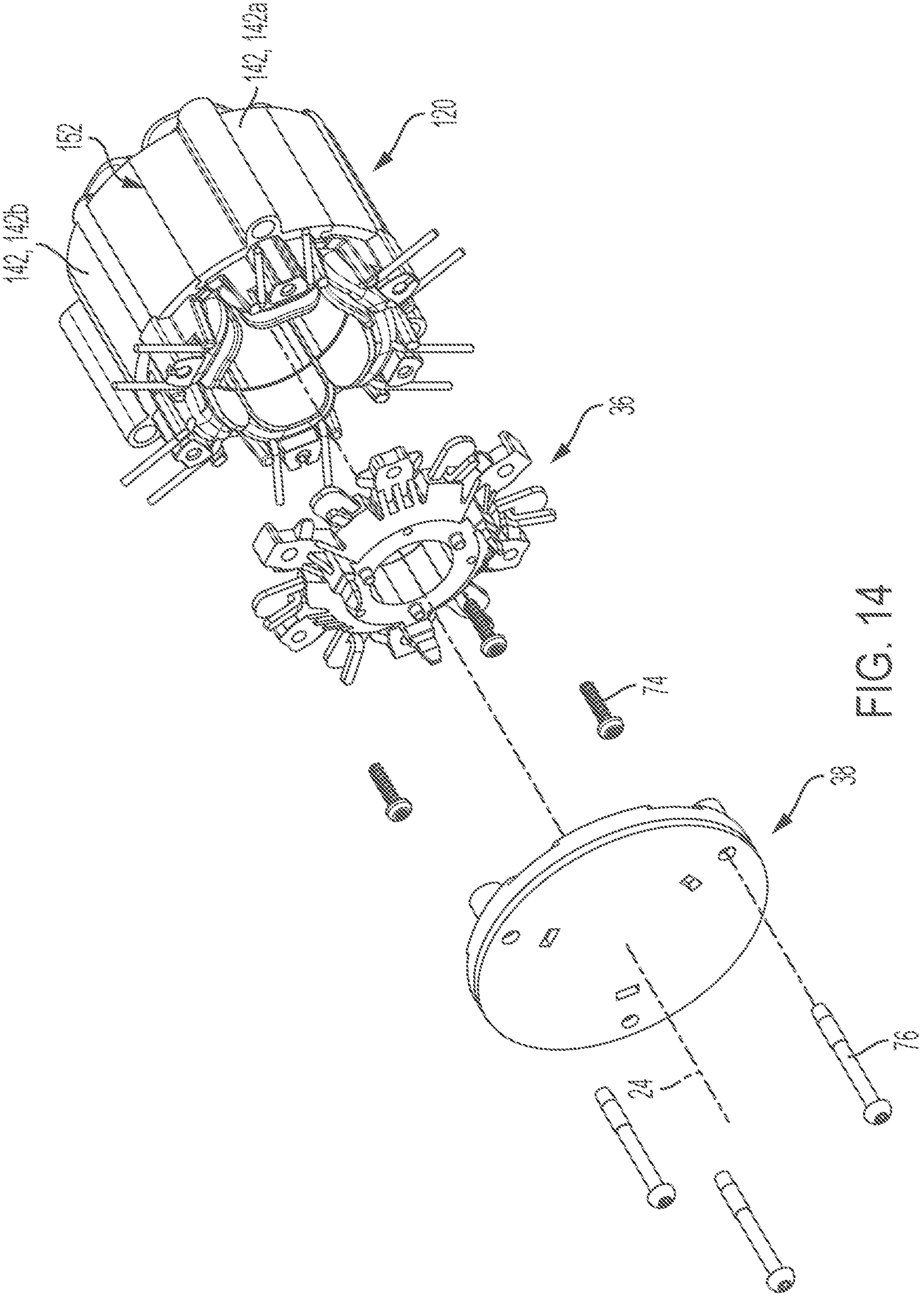
FIG. 14 is an exploded perspective view of the stator assembly of FIG. 13.
Figure 15:
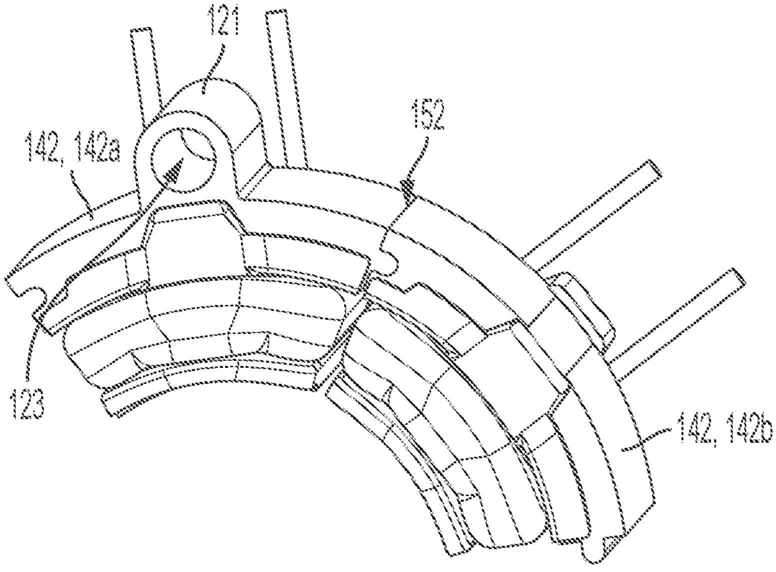
FIGS. 15 and 16 are perspective views of portions of the stator assembly of FIG. 13.
Figure 16:
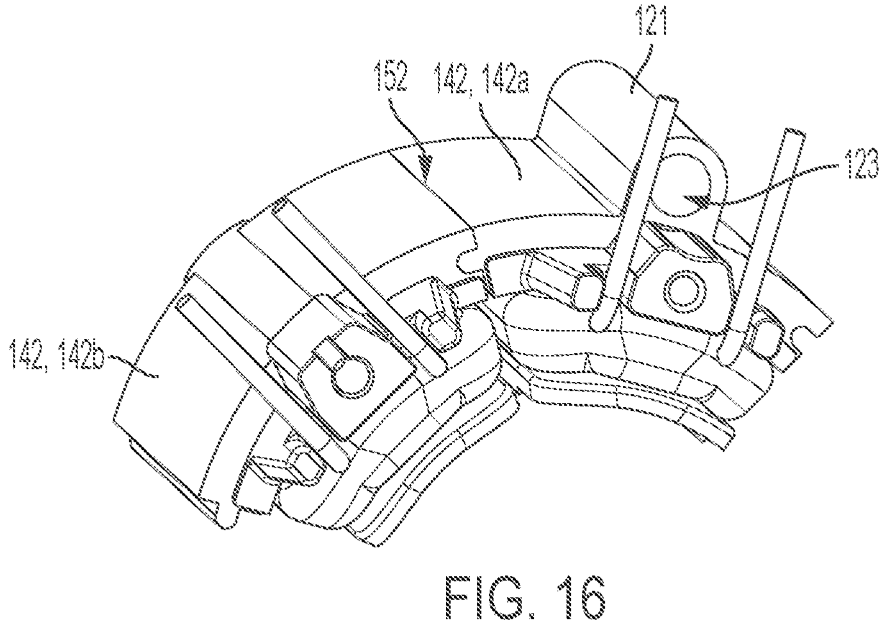

With reference to FIGS. 13 and 14, the stator assembly 120 couples to the bus bar assembly 36 and the PCBA 38 via the first fasteners 74 and the second fasteners 76 in the same manner as described above in connection with the stator assembly 20. And, the stator assembly 120 similarly includes stator segments 142 arranged end to end. However, the stator assembly 120 does not include a tubular housing. Instead, the stator segments 142 are laser welded at each notch and protrusion interlock 152 to secure the stator segments 142 together. Moreover, the stator segments 142 are not uniform, but instead include first stator segments 142*a* and second stator segments 142*b* arranged in an alternating order (FIGS. 15 and 16). More specifically, each first stator segment 142*a* is connected to a second stator segment 142*b* at each circumferential end. The first stator segments 142*a* each include a mounting rib 121 protruding radially outward and extending lengthwise in the axial direction. Each mounting rib 121 defines a mounting aperture 123 that receives a fastener for mounting the stator assembly 120 to, e.g., a gearcase (not shown). The second stator segments 142*b* do not include mounting ribs, but do include axially extending grooves that receive a portion of the overmolded insulator 148.

Figure 17:
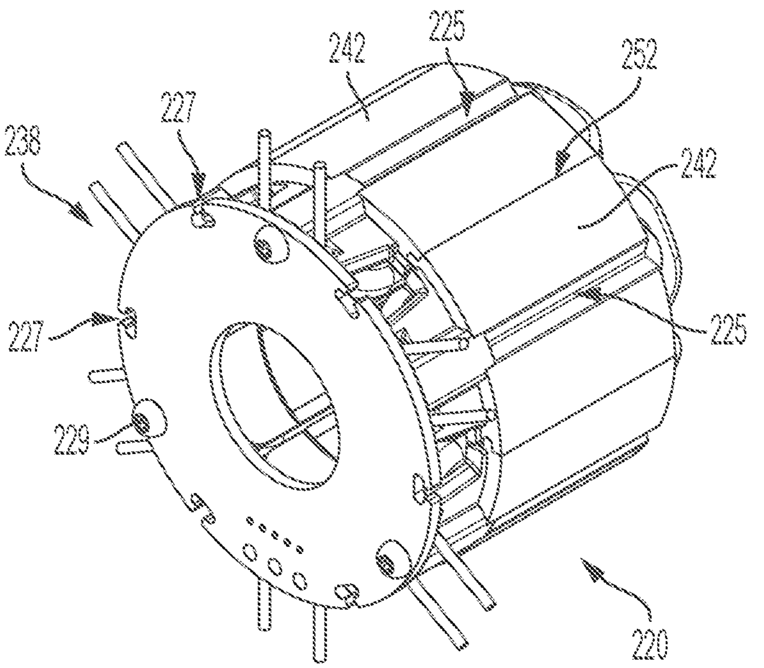
FIG. 17 is a perspective view of a stator assembly according to another embodiment.
Figure 18:
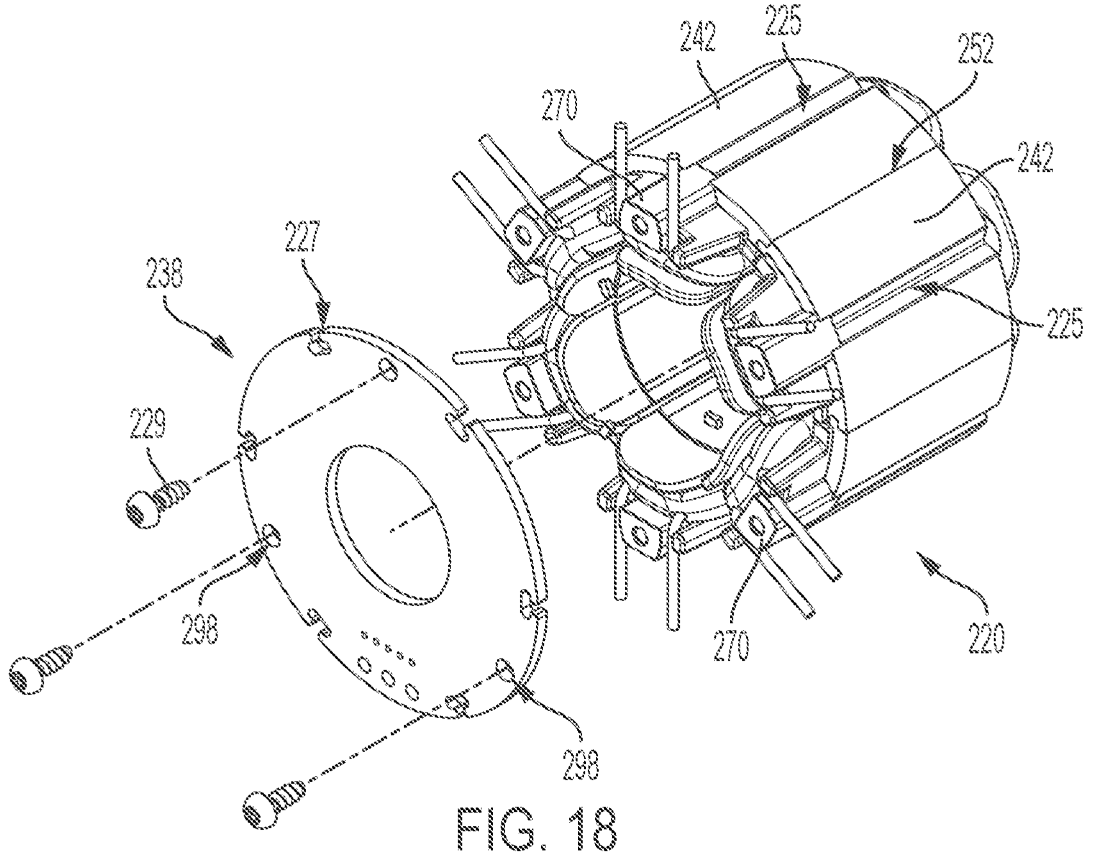
FIG. 18 is a partially exploded perspective view illustrating the stator assembly of FIG. 17.

FIGS. 17 and 18 illustrate a stator assembly 220 according to another embodiment of the disclosure. The stator assembly 220 is similar to the stator assemblies 20 and 120 described above and includes much of the same structure. And, the stator assembly 220 is operable with the rotor assembly 22 described above. Features and elements of the stator assembly 220 that are similar to the features and elements of the stator assemblies 20 and 120 are assigned the same reference numerals "plus 200." It should be understood that the features of the stator assembly 220 that are not explicitly described below have the same properties as the features of the stator assembly 20.

The stator assembly 220 includes stator segments 242 that are laser welded at each notch and protrusion interlock 252 to secure the stator segments 242 together. Each stator segment 242 includes an exterior groove 225 formed in a peripheral outer surface of a core 246 and extending lengthwise in an axial direction. The stator assembly 220 can be mounted within an interior of the housing 12. In this regard, the housing 12 can pe provided with longitudinal ribs (not shown) that project inward within the housing 12 and that can be received into the grooves 225 to fix the stator 220 against rotation relative to the housing 12. In addition, the stator assembly 220 is operable with a PCBA 238 that includes peripheral notches 227 formed at intervals about a periphery of the PCBA 238. Each notch 227 can receive two adjacent leads 286 of the stator windings 250. The leads 286 can be soldered directly to solder pads provided within the notches 227 to directly electrically connect the leads 286 to the PCBA 238. Because the leads 286 are secured directly to the PCBA 238, no separate bus bar assembly need be provided. The PCBA 238 also includes second apertures 298 that receive fasteners 229 that tighten to at least some of the mounting portions 270 to secure the PCBA 238 to an axial end of the stator assembly 220.

Figure 19:
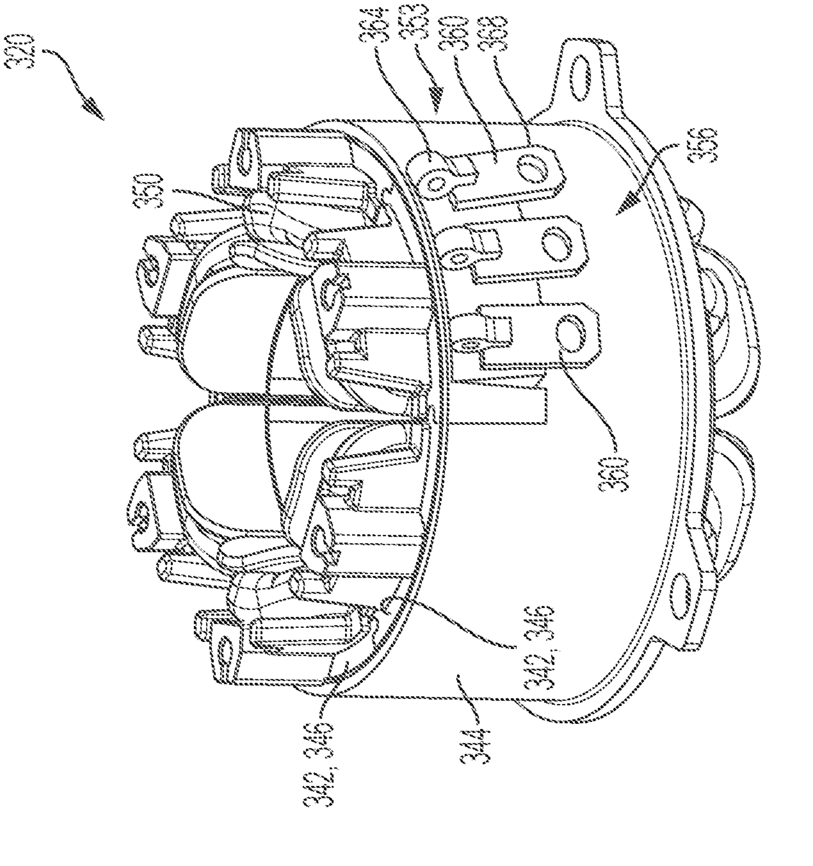
FIG. 19 is a perspective view of a stator assembly according to another embodiment.

FIG. 19 illustrates a stator assembly 320 according to another embodiment of the disclosure. The stator assembly 320 is similar to the stator assembly 20 described above and includes much of the same structure. And, the stator assembly 320 is operable with the rotor assembly 22 described above. Features and elements of the stator assembly 320 that are similar to the features and elements of the stator assembly 20 are assigned the same reference numerals "plus 300." It should be understood that the features of the stator assembly 320 that are not explicitly described below have the same properties as the features of the stator assembly 20.

Like the segmented stator assembly 20 described above, the stator assembly 320 is a segmented stator assembly 320 including, in the illustrated embodiment, six stator segments 342 arranged within a tubular housing 344. But, unlike the stator assembly 20, the stator assembly 320 does not couple to a bus bar assembly at its axial end. Rather, the stator assembly 320 further includes a terminal block assembly 353 molded directly to an outer circumferential surface 356 of a tubular wall 362 of the tubular housing 344. The terminal block assembly 353 includes, in the illustrated embodiment, three conductors 360 generally extending longitudinally along the outer circumferential surface 356. Each conductor 360 includes a winding connection portion 364 provided proximate an axial end of the stator 320 and a terminal 368 extending away from the winding connection portion 364 in the axial direction of the stator assembly 320. The winding connection portion 364 mechanically and electrically connects to leads of pairs of the windings 350, and each terminal 368 electrically connects to a PCBA (not shown). In this way, the conductors 360 electrically connect the stator windings 350 to the PCBA, which receives power from the battery pack 16 and selectively applies electrical current to the windings 350 to thereby cause the rotor shaft 30 to rotate about the axis 24. The conductors 360 can be supported on the outer circumferential surface 356 by a molded material (e.g., resin) that electrically insulates the conductors 360 from the sleeve 344 and from the cores 346 of the stator segments 342.

Figure 20:
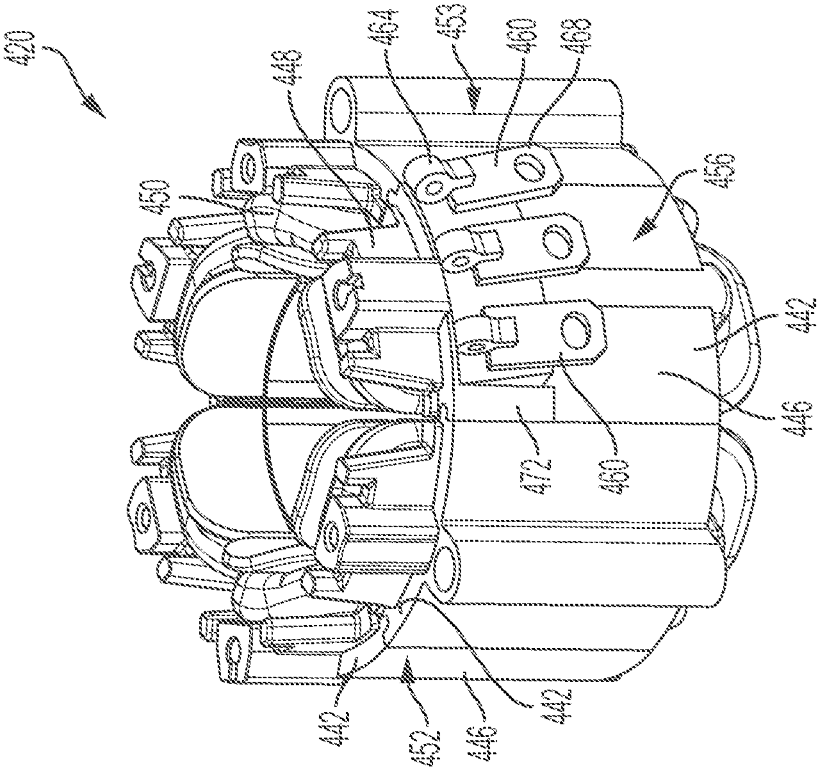
FIG. 20 is a perspective view of a stator assembly according to another embodiment.

FIG. 20 illustrates a stator assembly 420 according to another embodiment of the disclosure. The stator assembly 420 is similar to the stator assembly 120 described above and includes much of the same structure. And, the stator assembly 420 is operable with the rotor assembly 22 described above. Features and elements of the stator assembly 420 that are similar to the features and elements of the stator assembly 120 are assigned the same reference numerals "plus 300." It should be understood that the features of the stator assembly 420 that are not explicitly described below have the same properties as the features of the stator assembly 120.

Like the segmented stator assembly 120 described above, the stator assembly 420 is a segmented stator assembly 420 including, in the illustrated embodiment, six stator segments 442 that are laser welded at each notch and protrusion interlock 452 to secure the stator segments 442 together. But, unlike the stator assembly 120, the stator assembly 420 does not couple to a bus bar assembly at its axial end. Rather, the stator assembly 420 further includes a terminal block assembly 453 molded directly to an outer circumferential surface 456 of the core 446 of one of the stator segments 442. The terminal block assembly 453 includes, in the illustrated embodiment, three conductors 460 generally extending longitudinally along the outer circumferential surface 456. Each conductor 460 includes a winding connection portion 464 provided proximate an axial end of the stator 420 and a terminal 468 extending away from the winding connection portion 464 in the axial direction of the stator assembly 420. The winding connection portion 464 mechanically and electrically connects to leads of pairs of the windings 450, and each terminal 468 electrically connects to a PCBA (not shown). In this way, the conductors 460 electrically connect the stator windings 450 to the PCBA, which receives power from the battery pack 16 and selectively applies electrical current to the windings 450 to thereby cause the rotor shaft 30 to rotate about the axis 24. The conductors 460 can be supported on the outer circumferential surface 456 by a molded material (e.g., resin) that electrically insulates the conductors 460 from the core 446 the stator segment 442. In some embodiments, the overmolded insulator 448 of the stator segment 442 can be formed with a terminal block portion 472 that supports the conductors 460.

Figure 22:
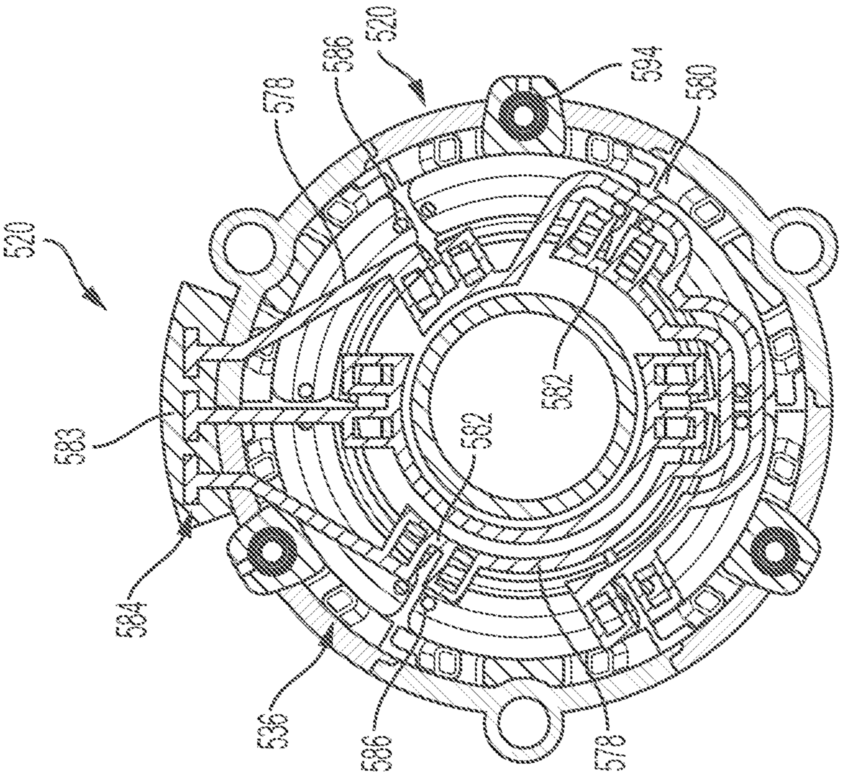
FIG. 22 is a cross-sectional view of the electric motor of FIG. 21, taken along line 22-22 of FIG. 21.
Figure 21:
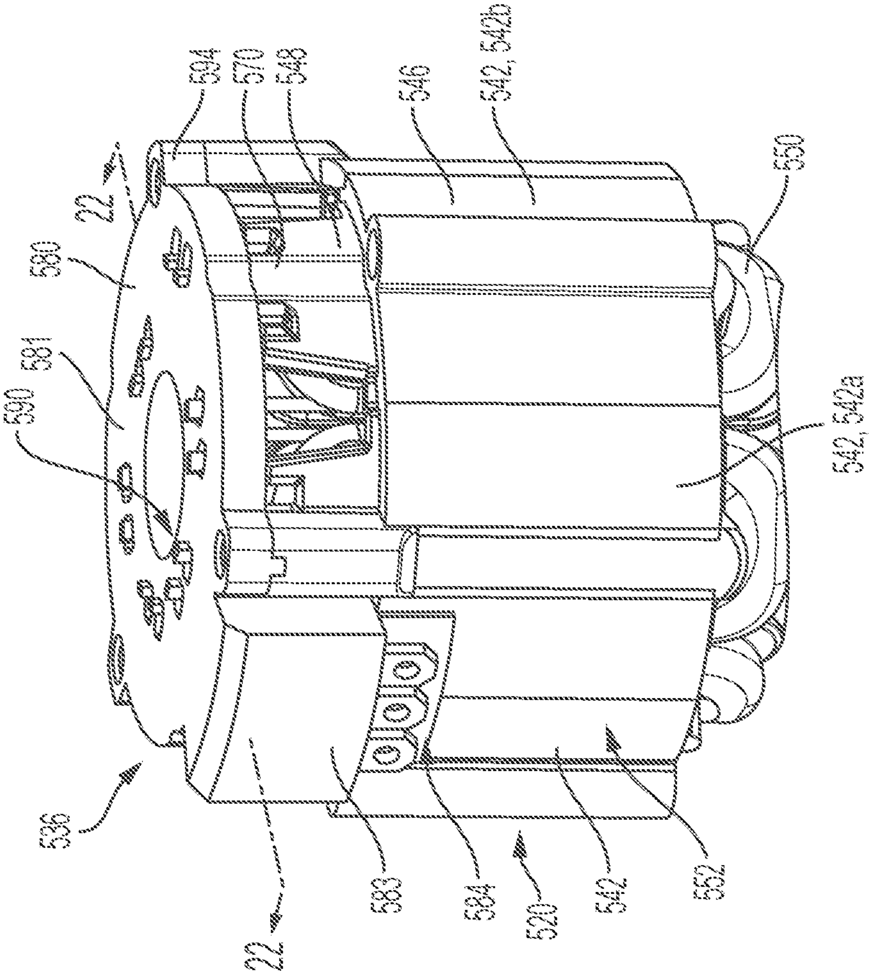
FIG. 21 is a perspective view of an electric motor according to another embodiment.

FIGS. 21 and 22 illustrate a segmented stator assembly 520 according to another embodiment of the disclosure. The stator assembly 520 is similar to the stator assembly 120 described above and includes much of the same structure. And, the stator assembly 520 is operable with the rotor assembly 22 described above. Features and elements of the stator assembly 520 that are similar to the features and elements of the stator assembly 120 are assigned the same reference numerals "plus 400." It should be understood that the features of the stator assembly 520 that are not explicitly described below have the same properties as the features of the stator assembly 120.

Like the segmented stator assembly 120 described above, the stator assembly 520 is a segmented stator assembly 520 including, in the illustrated embodiment, six stator segments 542 that are laser welded at each notch and protrusion interlock 552 to secure the stator segments 542 together. In alternative embodiments (not shown), the stator segments 542 may alternatively be arranged within a tubular housing such as the tubular housing 44 of the stator assembly 20 (FIG. 3) discussed above. Each stator segment 542 includes a core 546, an overmolded insulator 548, and a stator winding 550. The stator segments 542 are not uniform, but instead include first stator segments 542*a* and second stator segments 542*b* arranged in an alternating order. Each first stator segment 542*a* is connected to a second stator segment 542*b* at each circumferential end.

A bus bar assembly 536 couples to an axial end of the stator assembly 520. The bus bar assembly 536 includes three annular conductors 578 and an overmolded body 580 that fixedly supports the conductors 578. Each conductor 578 includes tangs 582 provided at one end of the conductor 578 and a terminal 584 formed at an opposite end of the conductor 578. The overmolded body 580 includes a disk portion 581 that supports the tangs 582 and a terminal block portion 583 extending axially away from the disk portion 581 at a circumferential edge of the disk portion 581. The terminal block portion 583 supports the terminals 584. The disk portion 581 also includes mounting tabs 594 that engage mounting portions 570 defined by the overmolded insulators 548 of the first stator segments 542*a*. The mounting tabs 594 can be secured to the mounting portions 570 via, e.g., threaded fasteners.

Each terminal 584 electrically connects to a PCBA (e.g., via wires; not shown) that receives power from the battery pack 16 (FIG. 1) and selectively applies electrical current to the stator windings 550. Each winding 550 includes a pair of leads 586 that connect to the adjacent tangs 582 of the conductors 578. In this way, the conductors 578 electrically connect the stator windings 550 to the PCBA 538.

The disk portion 581 of the overmolded body 580 defines a central aperture or bearing pocket 590 that receives the rotor bearing 92 (FIG. 3). The rotor bearing 92 receives the rotor shaft 30 of the rotor assembly 22 (FIG. 3) to rotatably support the rotor assembly 22. Since the bus bar assembly 536 is secured to each mounting portion 570 of each stator segment 542*a*, and further supports the rotor bearing 592, the bus bar assembly 536 centers the rotor assembly 22 with respect to the stator assembly 520.

Figure 24:
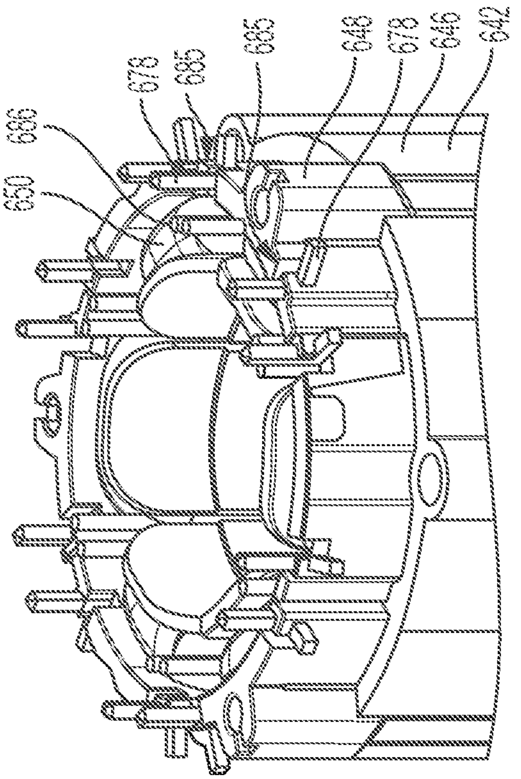
FIGS. 24 and 25 are partial perspective views of a stator assembly of the electric motor of FIG. 23.
Figure 25:
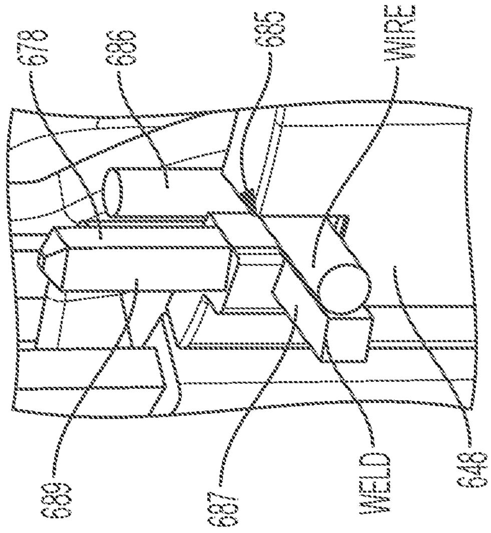
Figure 23:
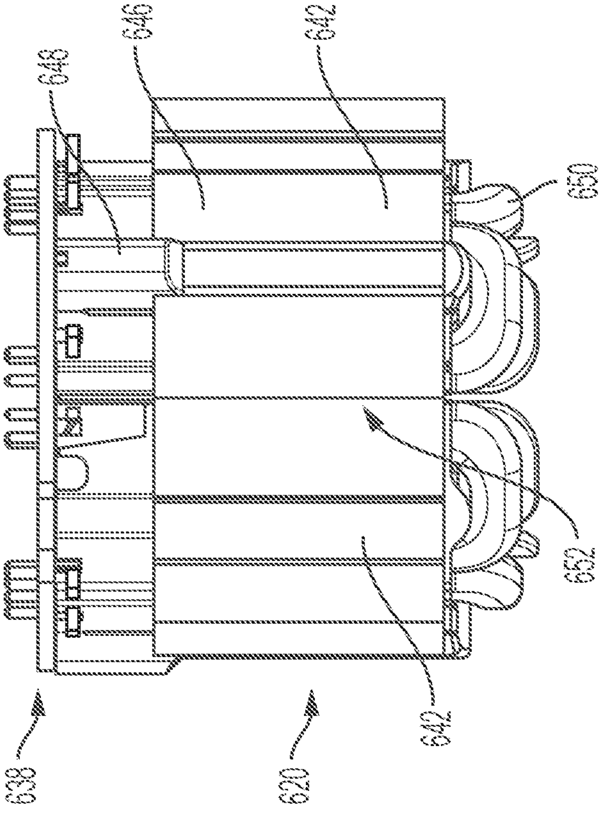
FIG. 23 is a side view of an electric motor according to another embodiment.

FIGS. 23-25 illustrate a stator assembly 620 according to another embodiment of the disclosure. The stator assembly 620 is similar to the stator assembly 120 described above and includes much of the same structure. And, the stator assembly 620 is operable with the rotor assembly 22 described above. Features and elements of the stator assembly 620 that are similar to the features and elements of the stator assembly 120 are assigned the same reference numerals "plus 500." It should be understood that the features of the stator assembly 620 that are not explicitly described below have the same properties as the features of the stator assembly 120.

Like the segmented stator assembly 120 described above, the stator assembly 620 is a segmented stator assembly 620 including, in the illustrated embodiment, six stator segments 642 that are laser welded to one another at notch and protrusion interlocks 652 to secure the stator segments 642 together. In alternative embodiments (not shown), the stator segments 642 may alternatively be arranged within a tubular housing such as the tubular housing 44 of the stator assembly 20 (FIG. 3) discussed above. Each stator segment 642 includes a core 646, an overmolded insulator 648, and a stator winding 650.

The stator assembly 620 is operable with a PCBA 638 that couples to an axial end of the stator assembly 620. The PCBA 638 receives power from the battery pack 16 (FIG. 1) and selectively applies electrical current to the stator windings 650. Each overmolded insulator 648 defines a pair of notches 685 at the axial end, and an L-shaped conductive terminal 678 is molded into the overmolded insulator 648 adjacent to each notch 685. A first leg 687 of the terminal 678 extends radially outward from the overmolded insulator 648, and a second leg 689 of the terminal 678 extends axially away from the overmolded insulator 648. Each lead 686 of each winding 650 is bent into a corresponding notch of the notches 685 and electrically connected to the corresponding first leg 687 of the terminal 678 (e.g., via laser welding). The second legs 689 of the terminals 678 are mechanically and electrically coupled to the PCBA 638 (e.g., via soldering). In some embodiments, the soldered connections between the PCBA 638 and the terminals 678 are sufficient to mechanically secure the PCBA 638 to the stator assembly 620.

Figure 26:
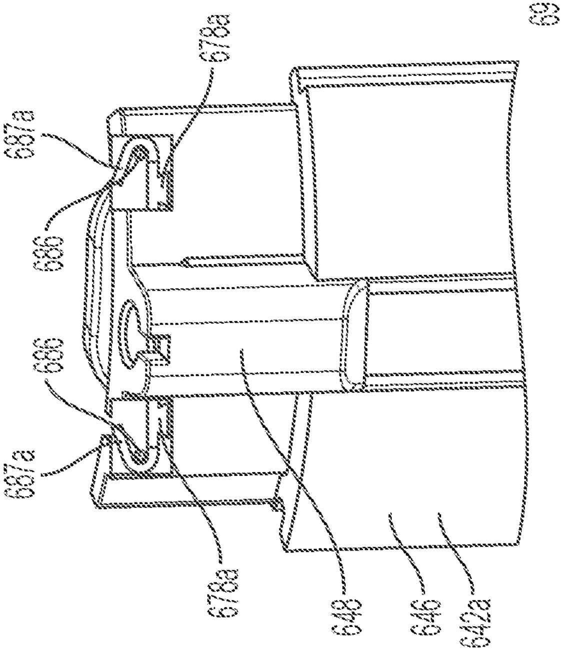
FIG. 26 is a partial perspective view of a portion of the stator assembly of FIG. 24 according to another embodiment.

With reference to FIG. 26, in another embodiment, the stator assembly 620 can alternatively include stator segments 642*a* including molded-in conductive terminals 678*a* each having a perpendicular tang 687*a* instead of a radially extending first leg as described above. Each perpendicular tang 687*a* is folded over the corresponding lead 686 of the coil windings 650 and fused. A second leg (not shown) of the terminal 678*a* is soldered to the PCBA 638 (FIG. 23) in a manner similar to that described above.

Figure 27:
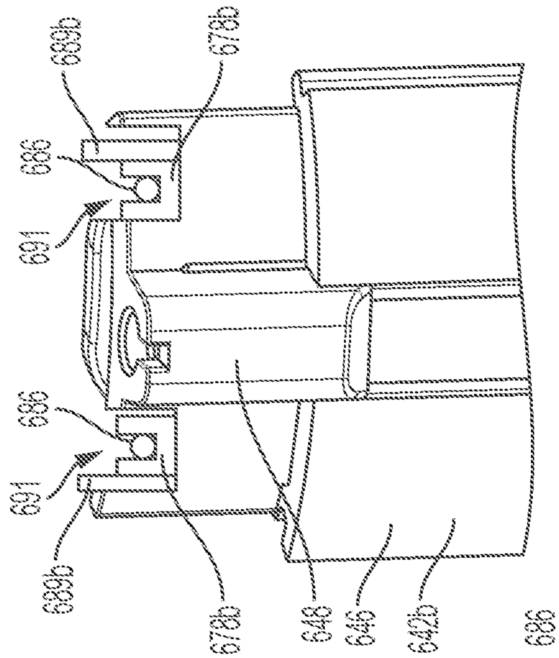
FIG. 27 is a partial perspective view of a portion of the stator assembly of FIG. 24 according to another embodiment.

With reference to FIG. 27, in another embodiment, the stator assembly 620 can alternatively include stator segments 642*b* including molded-in conductive terminals 678*b* that each define a stuff slot 691. The leads 686 of the coil windings 650 are pressed into the stuff slot 691 to form an electrical connection. A second leg 689*b* of the terminal 678*b* is soldered to the PCBA 638 (FIG. 23) in a manner similar to that described above.

Figure 28:
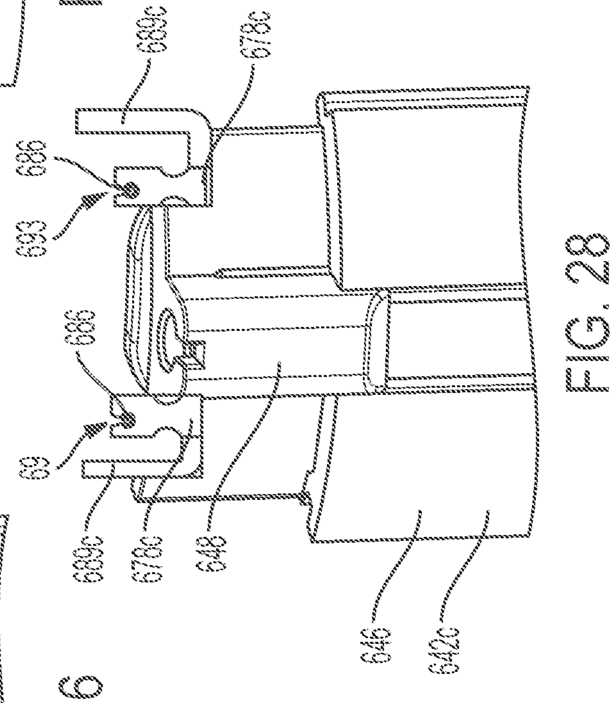
FIG. 28 is a partial perspective view of a portion of the stator assembly of FIG. 24 according to another embodiment.

With reference to FIG. 28, in another embodiment, the stator assembly 620 can alternatively include stator segments 642*c* including molded-in conductive terminals 678*c* each having a pinch weld slot 693. The leads 686 of the coil windings 650 are pressed into the pinch weld slot 693 and welded to form an electrical connection. A second leg 689*c* of the terminal 678*c* is soldered to the PCBA 638 (FIG. 23) in a manner similar to that described above.

FIGS. 29-32 illustrate a segmented stator assembly 720 according to another embodiment of the disclosure. The stator assembly 720 is similar to the stator assembly 520 described above and includes much of the same structure. And, the stator assembly 720 is operable with the rotor assembly 22 described above. Features and elements of the stator assembly 720 that are similar to the features and elements of the stator assembly 520 are assigned the same reference numerals "plus 200." It should be understood that the features of the stator assembly 720 that are not explicitly described below have the same properties as the features of the stator assembly 520.

Like the segmented stator assembly 520 described above, the stator assembly 720 is a segmented stator assembly 720 including, in the illustrated embodiment, six stator segments 742 that are laser welded at each notch and protrusion interlock 752 to secure the stator segments 742 together. In alternative embodiments (not shown), the stator segments 742 may alternatively be arranged within a tubular housing such as the tubular housing 44 of the stator assembly 20 (FIG. 3) discussed above. Each stator segment 742 includes a core 746, an overmolded insulator 748, and a stator winding 750. The stator segments 742 are not uniform, but instead include first stator segments 742*a* and second stator segments 742*b* arranged in an alternating order. Each first stator segment 742*a* is connected to a second stator segment 742*b* at each circumferential end.

A bus bar assembly 736 couples to an axial end of the stator assembly 720. The bus bar assembly 736 includes three annular conductors 778 and an overmolded body 780 that fixedly supports the conductors 778. The overmolded body 780 is molded over the arranged conductors 778 such that a portion of each conductor 778 extends generally within the overmolded body 780.

Figure 30:
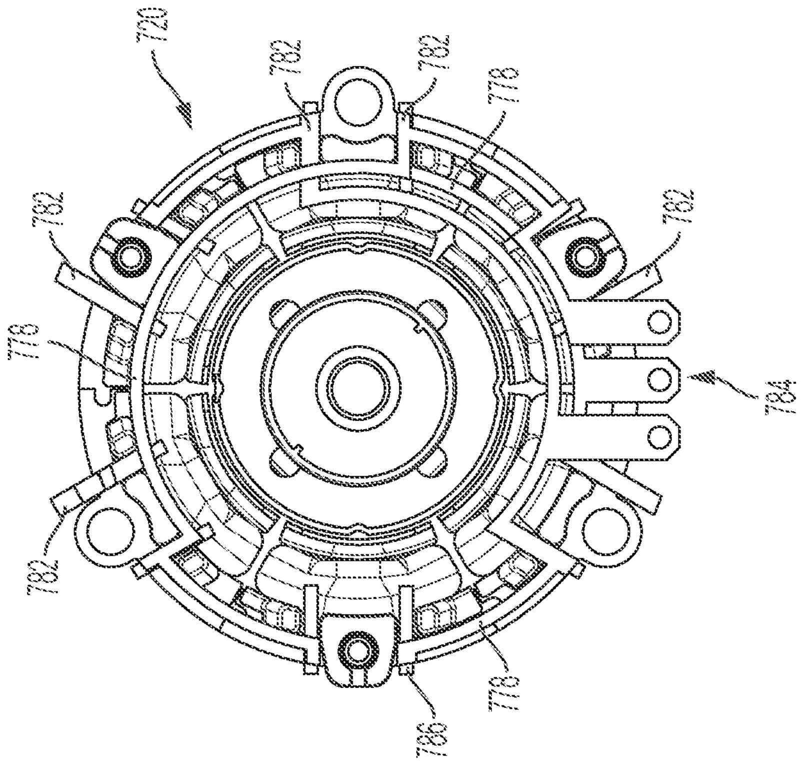
FIG. 30 is a top view of the electric motor of FIG. 29 with portions removed.

FIG. 30 illustrates the segmented stator assembly 720 with the overmolded body 780 removed to expose the annular conductors 778. Each conductor 778 includes two pairs of tangs 782 that each protrude radially outward, or radially and tangentially outward from the overmolded body 778. The two pairs of conductors 778 are provided at circumferentially opposite sides of the annular conductor 778. Each tang 782 connects to a lead 786 (FIG. 31) of the adjacent stator winding 750.

Figure 31:
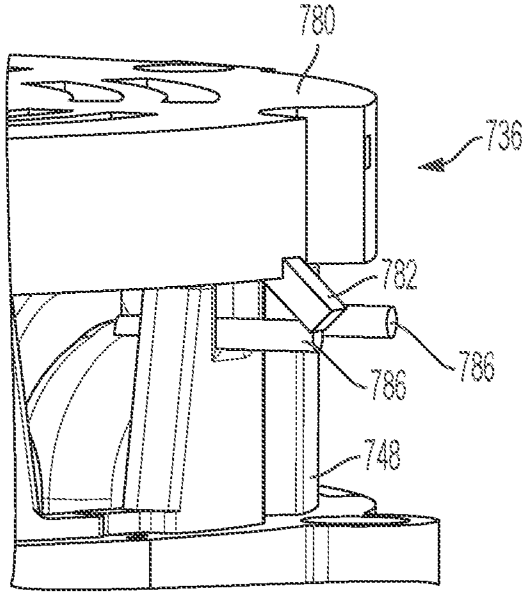
FIG. 31 is a partial perspective view of the electric motor of FIG. 29.

With reference to FIG. 31, each overmolded insulator 748 defines a pair of notches 785 at the axial end. Each notch 785 is located adjacent a corresponding tang 782. Each lead 786 of each winding 750 is bent into a corresponding notch of the notches 785 and electrically connected to the corresponding tang 782 (e.g., via laser welding). Likewise, each tang 782 is bent toward the notch 785 (i.e., toward the axial direction) to bring the tang 782 into contact with the lead 786.

Each conductor 778 also includes a terminal 784 protruding radially outward, or at least radially and tangentially outward from the overmolded body 778. Each terminal 784 electrically connects to a PCBA (e.g., via wires; not shown) that receives power from the battery pack 16 (FIG. 1) and selectively applies electrical current to the stator windings 750. In this way, the conductors 578 electrically connect the stator windings 550 to the PCBA 538.

Figure 29:
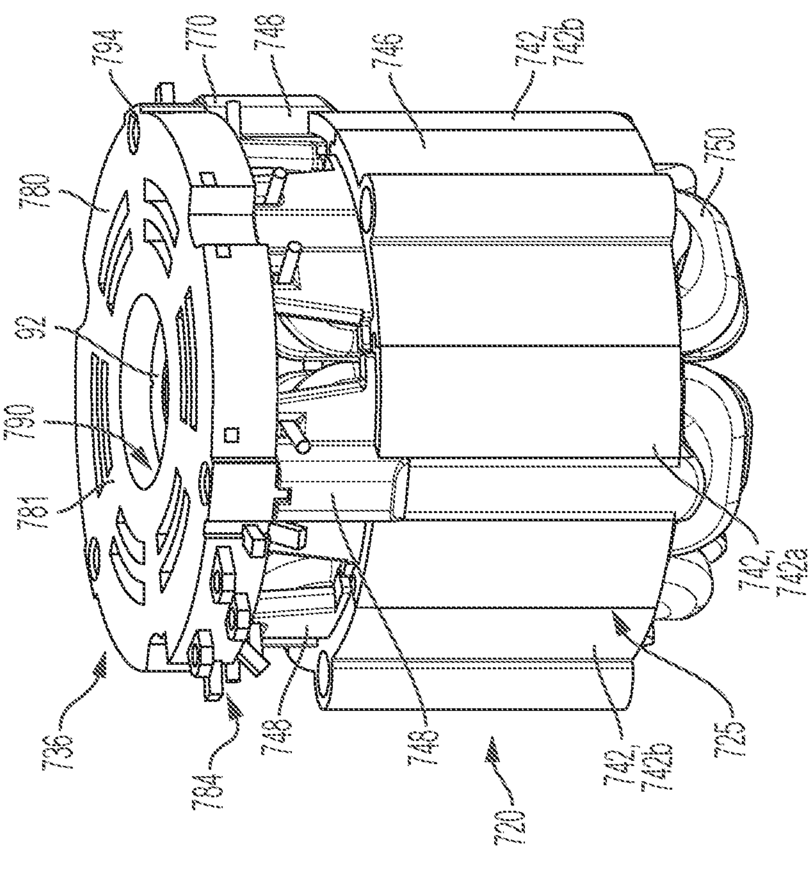
FIG. 29 is a perspective view of an electric motor according to another embodiment.
Figure 32:
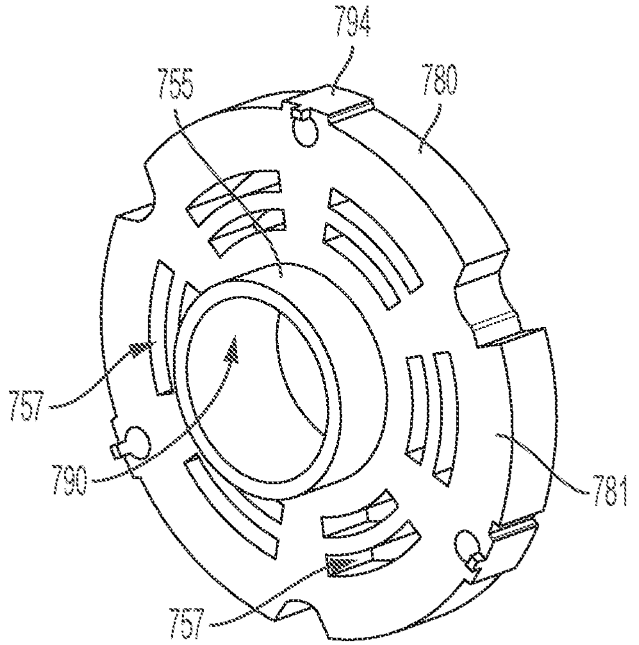
FIG. 32 is a perspective view of a molded insulator of a bus bar assembly of the electric motor of FIG. 29.
Figure 33:
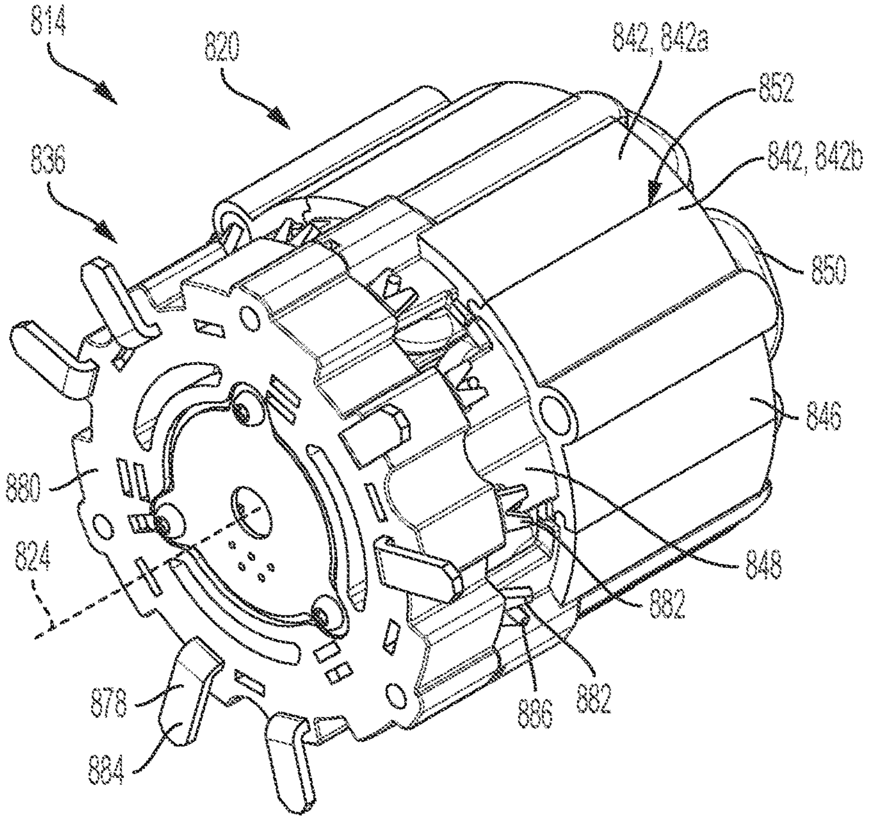
FIG. 33 is a perspective view of portions of an electric motor according to another embodiment.
Figure 34:
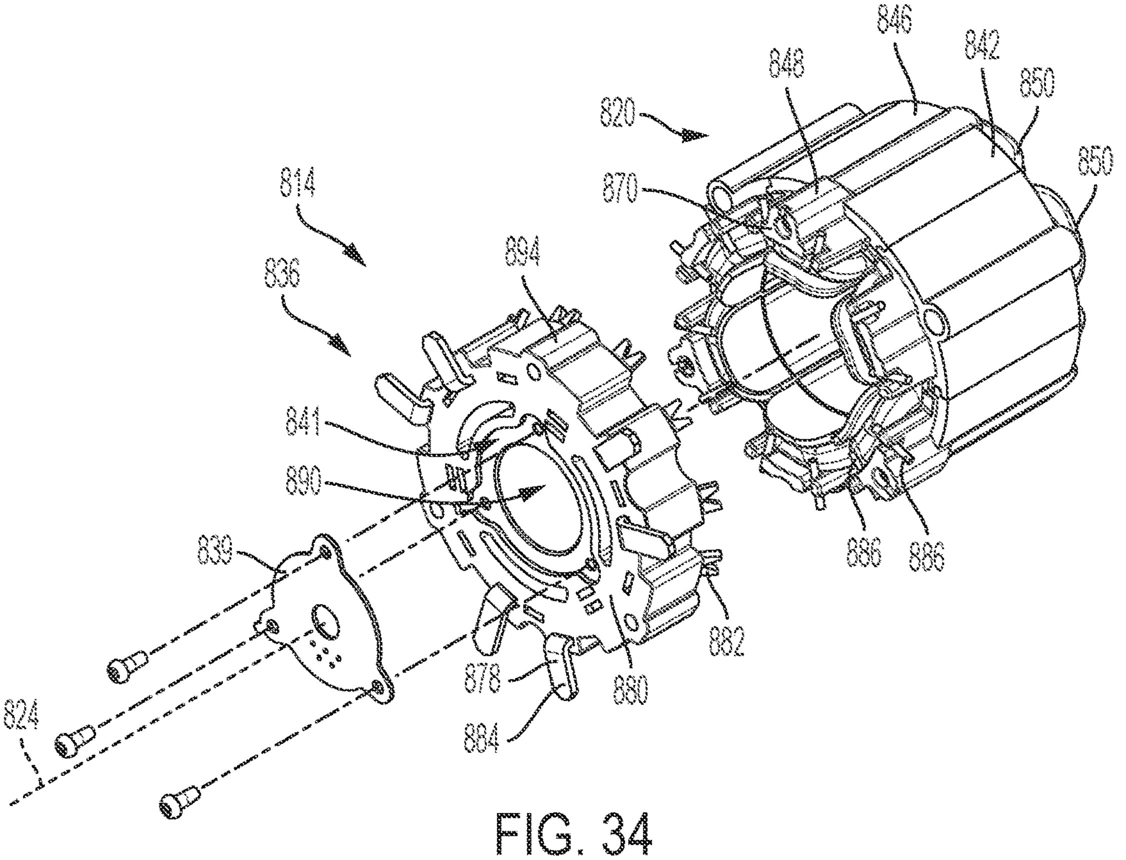
FIG. 34 is a partially exploded perspective view of the electric motor of FIG. 33.

With reference to FIGS. 29 and 32, the overmolded body 780 includes a generally disk-shaped disk portion 781 mounting tabs 794 that protrude radially outward from the disk portion 781. The mounting tabs 794 engage mounting portions 770 defined by the overmolded insulators 748 of the first stator segments 742*a*. The mounting tabs 794 can be secured to the mounting portions 770 via, e.g., threaded fasteners.

The overmolded body 780 includes a central annular wall 755 that extends axially away from the disk portion 781 and toward the rotor assembly 22 (FIG. 3). The annular wall 755 and the disk portion 781 together define a central aperture or bearing pocket 790 that receives the rotor bearing 92 (FIG. 29). The rotor bearing 92 receives the rotor shaft 30 (FIG. 3) of the rotor assembly 22 to rotatably support the rotor assembly 22. Since the bus bar assembly 736 is secured to each mounting portion 770 of each stator segment 742*a*, and further supports the rotor bearing 792, the bus bar assembly 736 centers the rotor assembly 22 with respect to the stator assembly 720. The disk portion 781 also includes a plurality of vent apertures 757 surrounding the bearing pocket 790 (FIG. 32). The vent apertures 757 permit cooling airflow generated by the fan 28 (FIG. 3) to pass through the bus bar assembly 736.

FIGS. 33-38 illustrate portions of an electric motor 814 according to another embodiment of the disclosure. The motor 814 includes a segmented stator assembly 820 that is similar to the stator assembly 120 described above and includes much of the same structure. And, the stator assembly 820 is operable with the rotor assembly 22 described above. Features and elements of the stator assembly 820 that are similar to the features and elements of the stator assembly 120 are assigned the same reference numerals "plus 700." It should be understood that the features of the stator assembly 820 that are not explicitly described below have the same properties as the features of the stator assembly 120.

Like the segmented stator assembly 120 described above, the stator assembly 820 is a segmented stator assembly 820 including, in the illustrated embodiment, six stator segments 842 that are laser welded at each notch and protrusion interlock 852 to secure the stator segments 842 together. In alternative embodiments (not shown), the stator segments 842 may alternatively be arranged within a tubular housing such as the tubular housing 44 of the stator assembly 20

(FIG. 3) discussed above. Each stator segment 842 includes a core 846, an overmolded insulator 848, and a stator winding 850. The stator segments 842 are not uniform, but instead include first stator segments 842*a* and second stator segments 842*b* arranged in an alternating order. Each first stator segment 842*a* is connected to a second stator segment 842*b* at each circumferential end.

The motor 814 includes a bus bar assembly 836 that couples to an axial end of the stator assembly 820. The bus bar assembly 836 includes six annular conductors 878 and an overmolded body 880 that fixedly supports the conductors 878. Each conductor 878 includes two tangs 882 provided at two opposite ends of the conductor 878 and a terminal 884 formed at one of the ends of the conductor 878 and located adjacent one of the two tangs 882. The overmolded body 880 includes mounting tabs 894 that engage mounting portions 870 defined by the overmolded insulators 848 of the first stator segments 842*a*. The mounting tabs 894 can be secured to the mounting portions 870 via, e.g., threaded fasteners.

Each terminal 884 electrically connects to a PCBA (e.g., via wires; not shown) that receives power from the battery pack 16 (FIG. 1) and selectively applies electrical current to the stator windings 850. Each winding 850 includes a pair of leads 886 that connect to the two adjacent tangs 882 of the conductors 878. In this way, the conductors 878 electrically connect the stator windings 850 to the PCBA.

The overmolded body 880 defines a central aperture or bearing pocket 890 that receives the rotor bearing 92 (FIG. 3). The rotor bearing 92 receives the rotor shaft 30 of the rotor assembly 22 (FIG. 3) to rotatably support the rotor assembly 22. Since the bus bar assembly 836 is secured to each mounting portion 870 of each stator segment 842*a*, and further supports the rotor bearing 92, the bus bar assembly 836 centers the rotor assembly 22 with respect to the stator assembly 820.

A PCBA 839, such as a rotor position sensor circuit board, is coupled to the overmolded body 880 of the bus bar assembly 836. The PCBA 839 is generally annular in shape and received into a corresponding centrally located, annularly shaped recess 841 defined in the overmolded body 880 and secured thereto by threaded fasteners. The PCBA 839 covers at least a portion of the bearing pocket 890.

Figure 35:
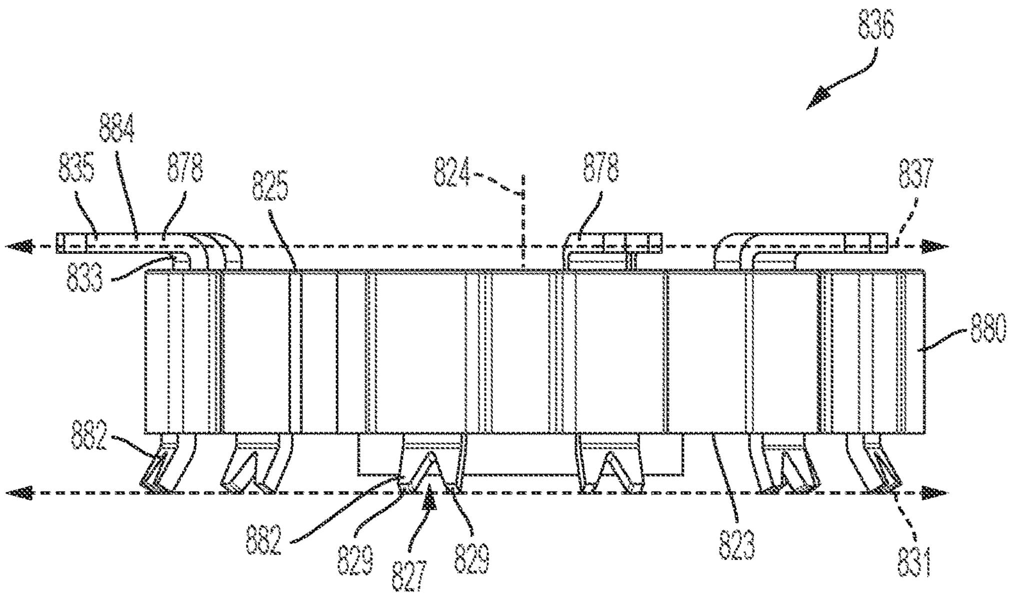
FIG. 35 is a side view illustrating a bus bar assembly of the electric motor of FIG. 33.
Figure 36:
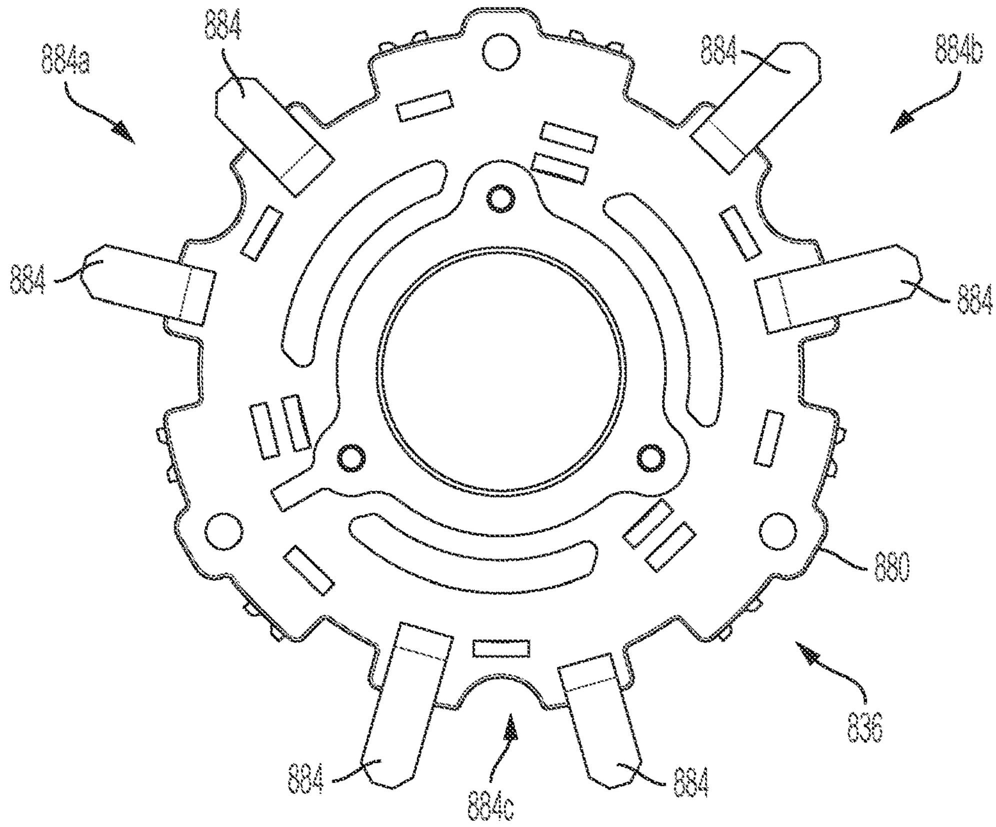
FIG. 36 is a plan view of the bus bar assembly of FIG. 35.
Figure 37:
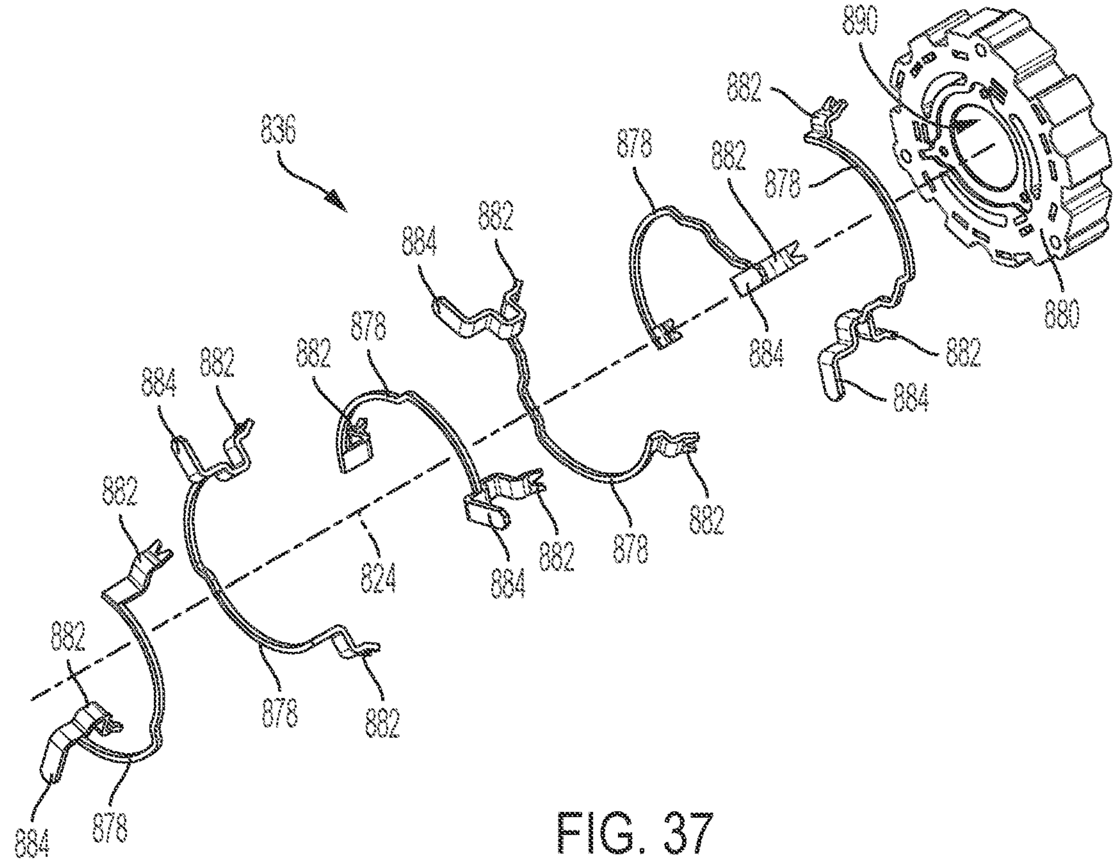
FIG. 37 is an exploded perspective view of the bus bar assembly of FIG. 35.
Figure 38:
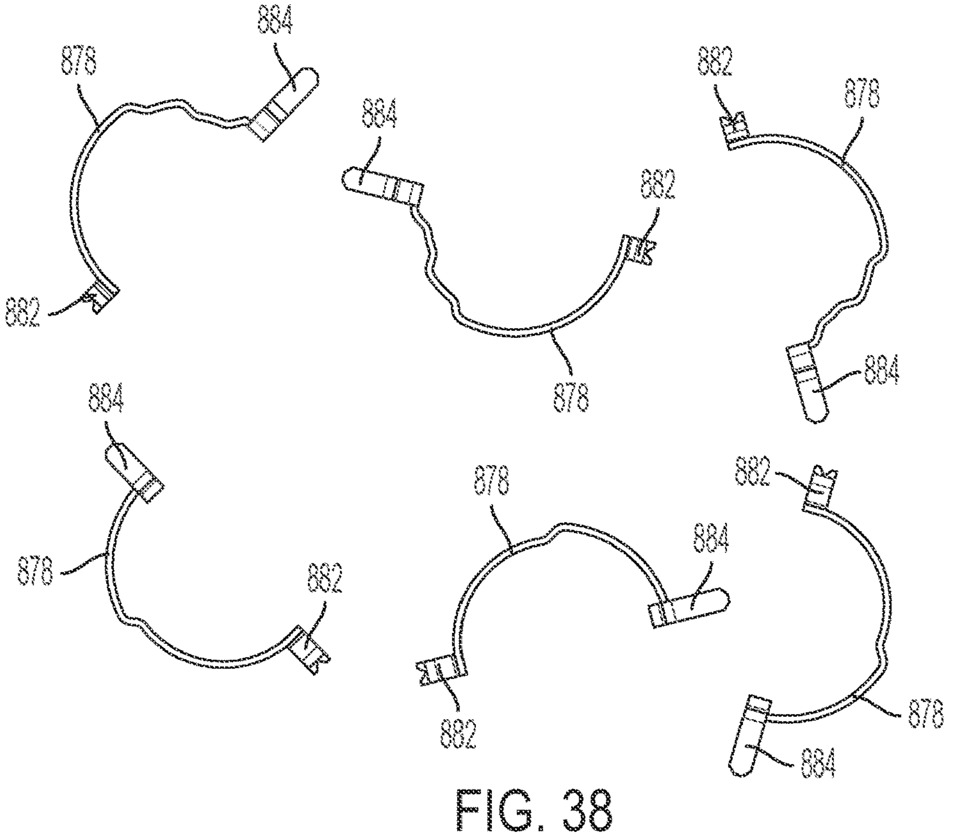
FIG. 38 is an exploded plan view of the bus bar assembly of FIG. 35 with portions removed.
Figure 39:
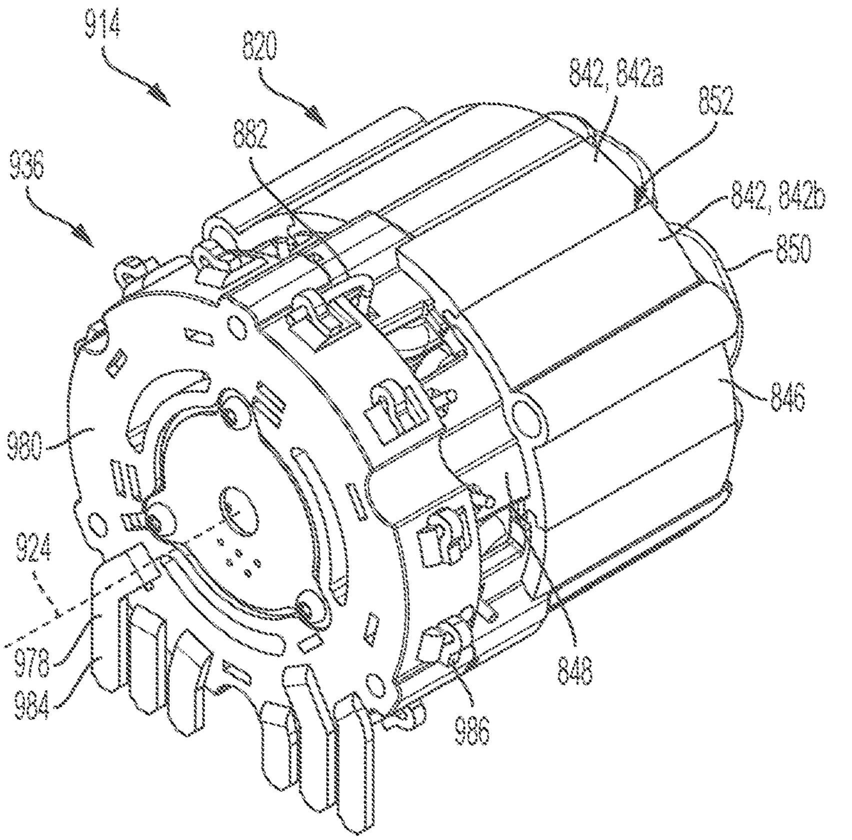
FIG. 39 is a perspective view of portions of an electric motor according to another embodiment.
Figure 40:
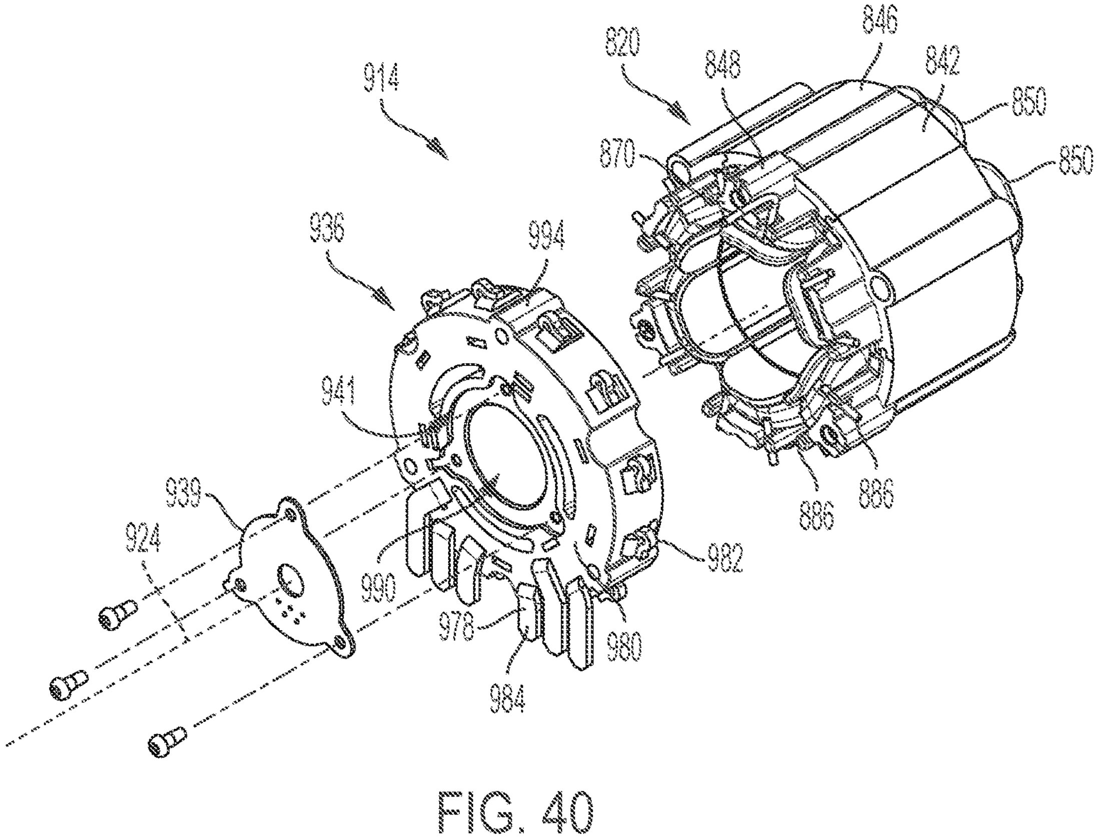
FIG. 40 is a partially exploded perspective view of the electric motor of FIG. 39.

With reference to FIGS. 35 and 36, the bus bar assembly 836 includes, in sum, twelve tangs 882 that are equally spaced circumferentially about a periphery of the overmolded body 880. In other embodiments (not shown), fewer or more tangs are also contemplated, and the number of tangs may be twice the number of stator windings such that each tang connects to a corresponding lead of the stator windings. In the illustrated embodiment, the bus bar assembly 836 also includes six terminals 884 provided in three pairs 884*a*-884*c* (i.e., three groups 884*a*-884*c* of two terminals 884). The three pairs 884*a*-884*c* are circumferentially spaced apart from one another about the periphery of the overmolded body 880. In the illustrated embodiment, each group 884*a*-884*c* is spaced apart from the other groups 884*a*-884*c* by approximately 120 degrees, measured about a central axis 824 of the motor 814.

As shown in FIG. 35, the overmolded body 880 includes a first axial surface 823 extending at a first axial end thereof and a second axial surface 825 extending at a second axial end thereof. The first axial surface 823 faces toward the stator assembly 820 and the second axial surface 825 faces away from the stator assembly 820. The tangs 882 each protrude from the first axial surface 823 and extend partially in the axial direction and partially in the radial direction. That is, each tang 882 extends generally toward the stator assembly 820 and also outward in the radial direction. Each tang 882 also includes a V-shaped notch 827 defined in a distal end thereof between two adjacent prongs 829. The corresponding lead 886 (FIG. 33) of the adjacent stator winding 850 is received into the notch 827 and mechanically attached to the tang 882 between the prongs 829 by, e.g., laser welding. As further shown in FIG. 35, each of the tangs 882 are also generally located within the same axial region of the motor 814. In particular, the tips of each of the prongs 829 of each tang 882 together define a first plane 831 that extends perpendicular to the central axis 824.

Each terminal 884 protrudes from the second axial surface 825 of the overmolded body 880 and is generally L-shaped with a first leg 833 extending in the axial direction and a second leg 835 extending in the radial direction. The second legs 835 of each terminal 884 are all generally located within the same axial region of the motor 814. In particular, the second legs 835 of each of the terminals 884 together define a second plane 837 that extends perpendicular to the central axis 824 and parallel to the first plane 831.

FIGS. 39-44 illustrate portions of an electric motor 914 according to another embodiment of the disclosure. The motor 914 includes the segmented stator assembly 820 described herein in connection with FIGS. 33-38, and is operable with the rotor assembly 22 described herein in connection with FIGS. 2-4 and 12.

The motor 914 includes a bus bar assembly 936 that couples to an axial end of the stator assembly 920. The bus bar assembly 936 includes six annular conductors 978 and an overmolded body 980 that fixedly supports the conductors 978. Each conductor 978 includes two tangs 982 provided at two opposite ends of the conductor 978 and a terminal 984 formed at one of the ends of the conductor 978 and located adjacent one of the two tangs 982. The overmolded body 980 includes mounting tabs 994 that engage mounting portions 870 defined by the overmolded insulators 848 of the first stator segments 842*a*. The mounting tabs 994 can be secured to the mounting portions 870 via, e.g., threaded fasteners.

Each terminal 984 electrically connects to a PCBA (e.g., via wires; not shown) that receives power from the battery pack 16 (FIG. 1) and selectively applies electrical current to the stator windings 850. The leads 886 of the windings 850 connect to the two adjacent tangs 982 of the conductors 978. In this way, the conductors 978 electrically connect the stator windings 850 to the PCBA.

The overmolded body 980 defines a central aperture or bearing pocket 990 that receives the rotor bearing 92 (FIG. 3). The rotor bearing 92 receives the rotor shaft 30 of the rotor assembly 22 (FIG. 3) to rotatably support the rotor assembly 22. Since the bus bar assembly 936 is secured to each mounting portion 870 of each stator segment 842*a*, and further supports the rotor bearing 92, the bus bar assembly 936 centers the rotor assembly 22 with respect to the stator assembly 820.

A PCBA 939, such as a rotor position sensor circuit board, is coupled to the overmolded body 980 of the bus bar assembly 936. The PCBA 939 is generally annular in shape and received into a corresponding centrally located, annularly shaped recess 941 defined in the overmolded body 980 and secured thereto by threaded fasteners. The PCBA 939 covers at least a portion of the bearing pocket 990.

Figure 41:
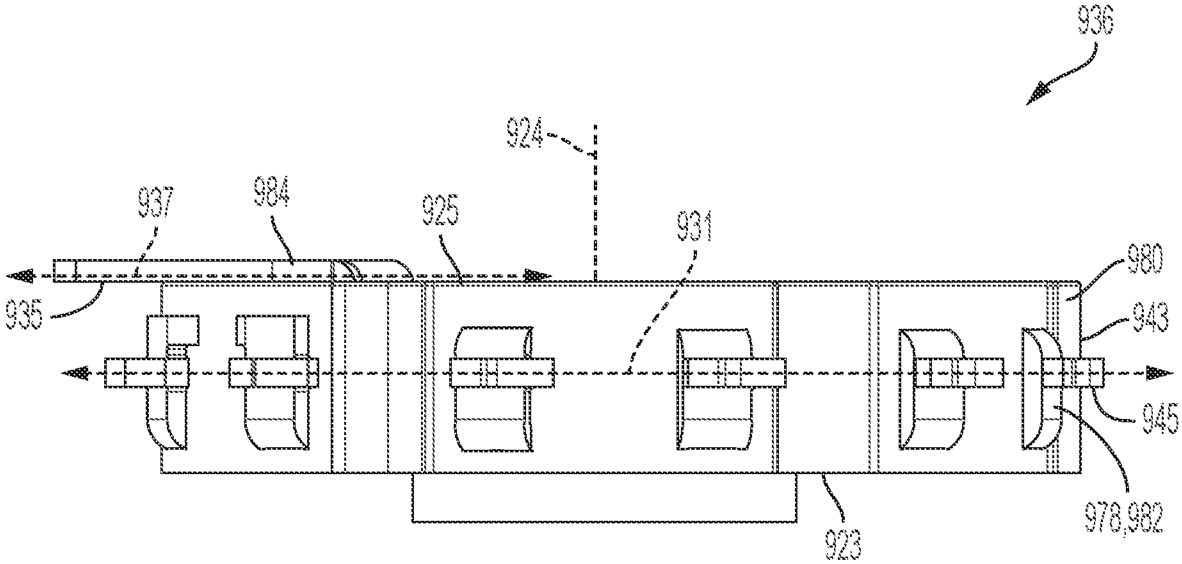
FIG. 41 is a side view illustrating a bus bar assembly of the electric motor of FIG. 39.

As shown in FIG. 41, the overmolded body 980 includes a first axial surface 923 extending at a first axial end thereof and a second axial surface 925 extending at a second axial end thereof. The first axial surface 923 faces toward the stator assembly 820 and the second axial surface 925 faces away from the stator assembly 820. The overmolded body 980 also includes a circumferential outer surface 943 that extends between the first and second axial surfaces 923, 925. The tangs 982 each protrude from the circumferential outer surface 943 generally in the radial direction. Each tang 982 includes a hook portion 945 that extends generally in the circumferential direction. The corresponding lead 886 (FIG. 33) of the adjacent stator winding 850 is received by and contacts the hook portion 945 and is mechanically attached thereto by, e.g., laser welding. In other embodiments, the leads 886 can be attached to the hook portions 945 by other means, such as soldering, ultrasonic welding, crimping, and the like. As further shown in FIG. 41, each of the tangs 982 are also generally located within the same axial region of the motor 814. In particular, each of the hook portions 945 of each tang 982 together define a first plane 931 that extends perpendicular to the central axis 924.

Figure 42:
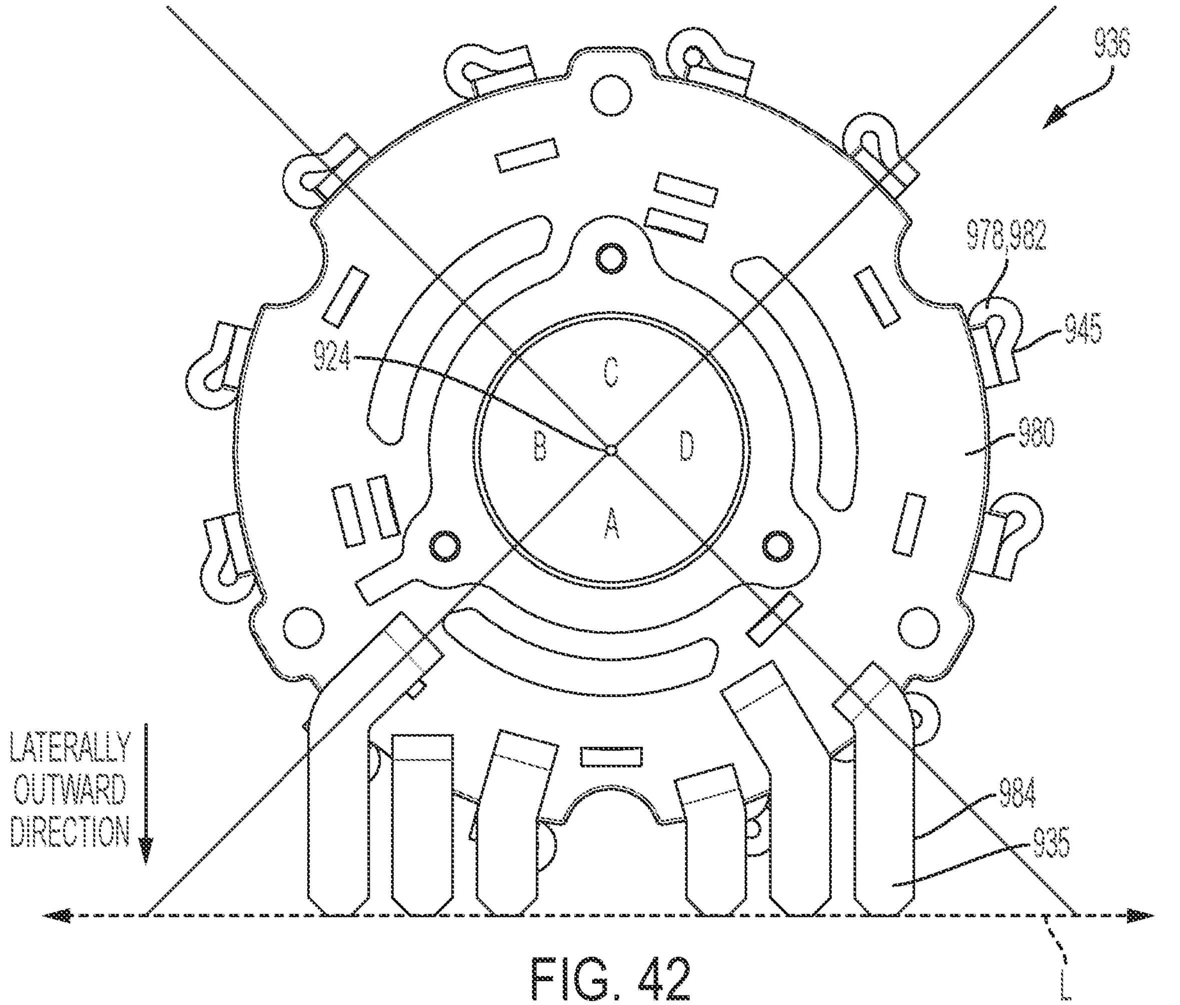
FIG. 42 is a plan view of the bus bar assembly of FIG. 41.
Figure 43:
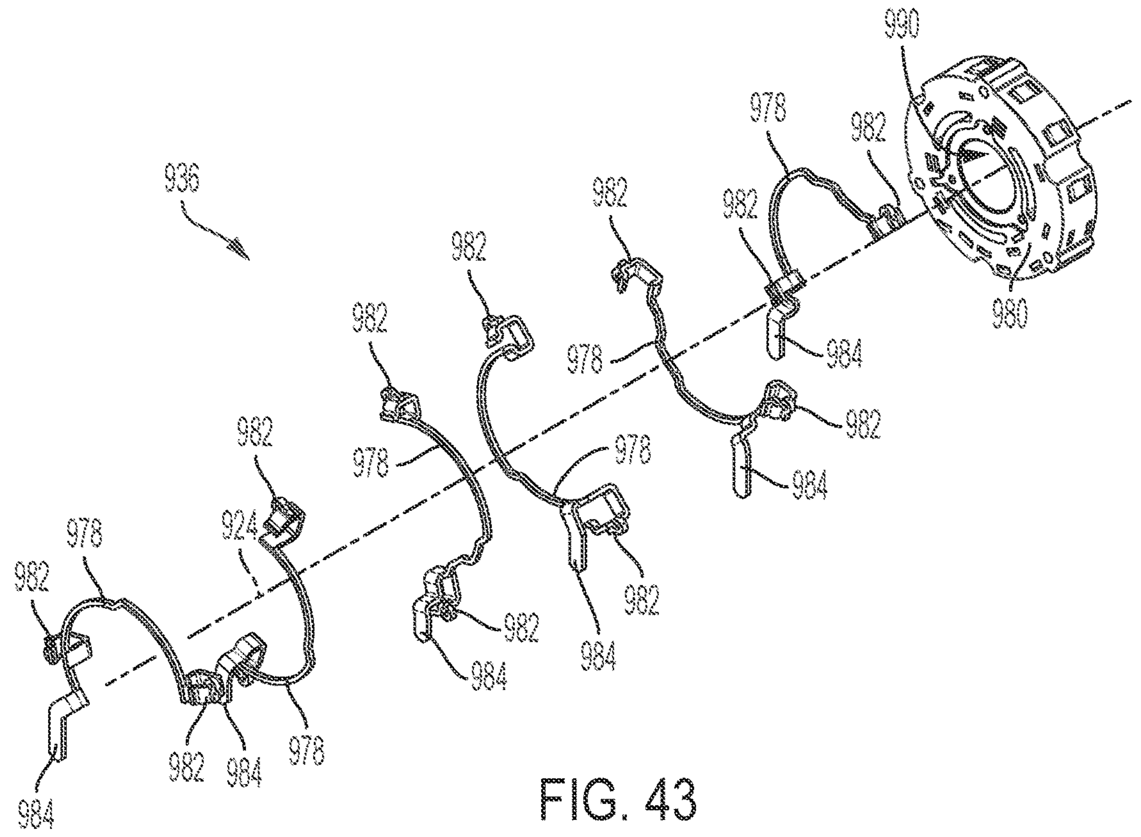
FIG. 43 is an exploded perspective view of the bus bar assembly of FIG. 41.
Figure 44:
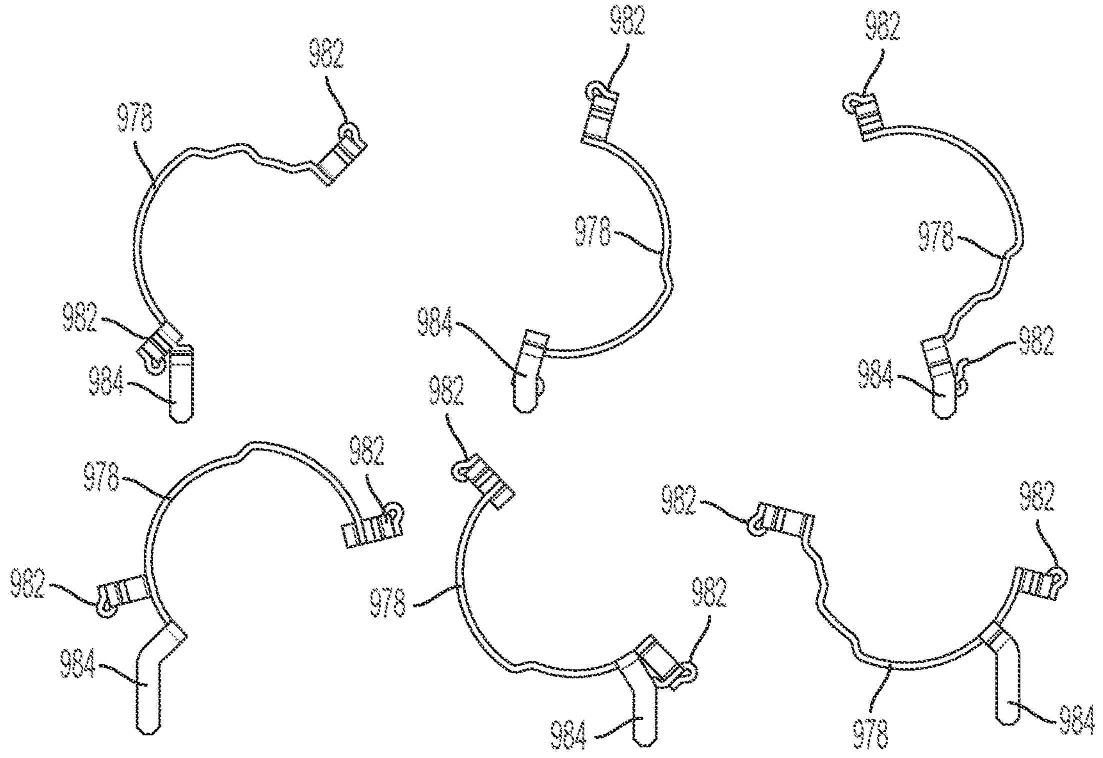
FIG. 44 is an exploded plan view of the bus bar assembly of FIG. 41 with portions removed.
Figure 45:
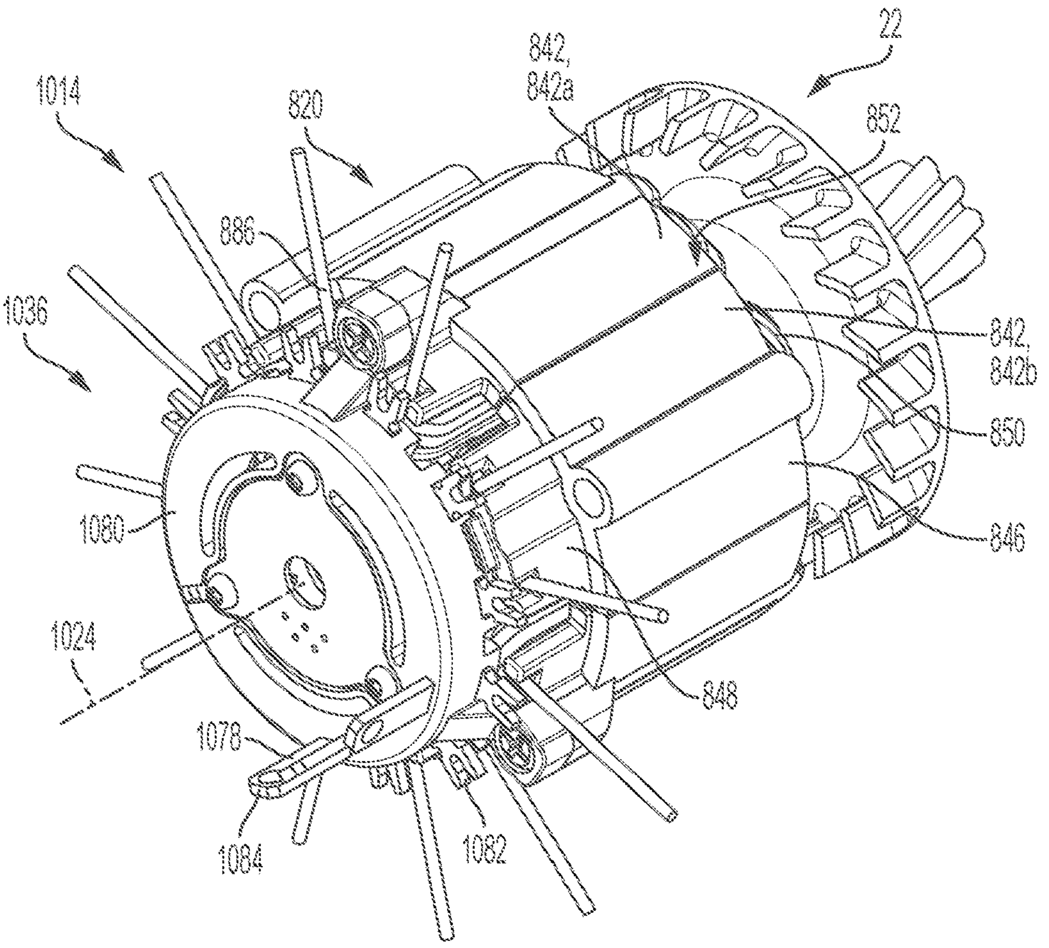
FIG. 45 is a perspective view of portions of an electric motor according to another embodiment.
Figure 46:
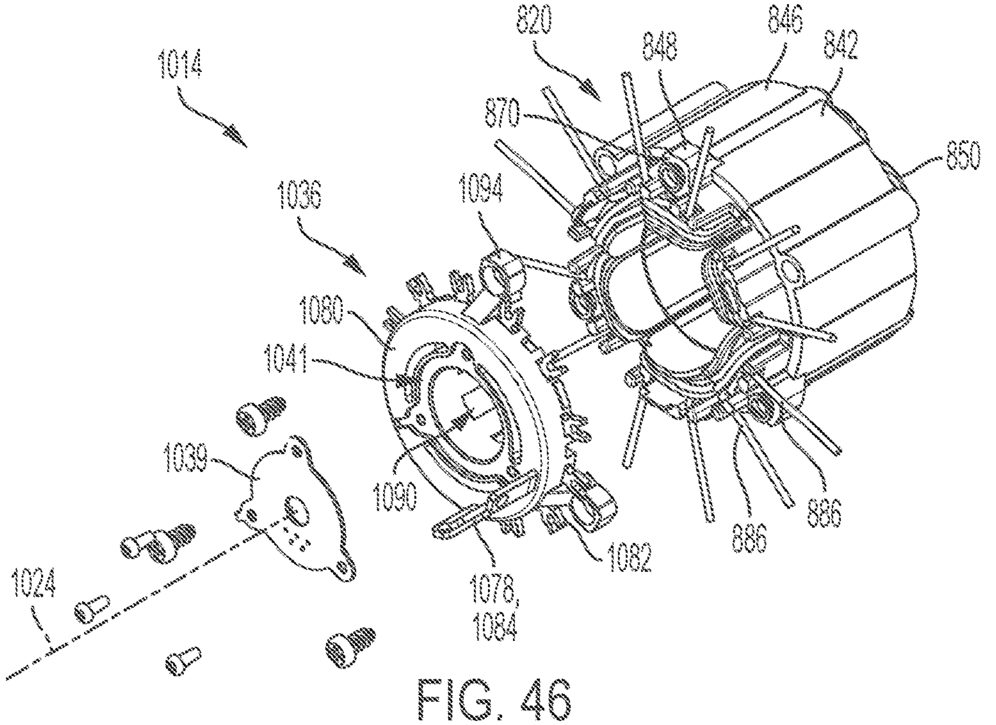
FIG. 46 is a partially exploded perspective view of the electric motor of FIG. 45.

In the illustrated embodiment, the bus bar assembly 936 includes six terminals 984 that are gathered to one lateral side of the overmolded body 980. Each terminal 984 protrudes from the second axial surface 925 of the overmolded body 980 and includes a leg portion 935 that extends in a laterally outward direction that is perpendicular to the central axis 924. Each of the leg portions 935 extend generally parallel to one another. The longitudinal extents of each leg portion 935 together define a second plane 937 that extends perpendicular to the central axis 924 and parallel to the first plane 931. In addition, distal tips 947 of each leg portion 935 are laterally aligned with each other. In particular, the distal tips 947 terminate along a straight line L that extends perpendicular to the central axis 924 and perpendicular to the laterally outward direction. Moreover, as shown in FIG. 42, the bus bar assembly 936 may be divided into four equal radial quadrants A-D that each originate from the central axis 924. The leg portions 935 of each terminal 984 are located within a single quadrant A.

FIGS. 45-50 illustrate all or portions of an electric motor 1014 according to another embodiment of the disclosure. The motor 1014 includes the segmented stator assembly 820 described herein in connection with FIGS. 33-38, and is operable with the rotor assembly 22 described herein in connection with FIGS. 2-4 and 12.

The motor 1014 includes a bus bar assembly 1036 that couples to an axial end of the stator assembly 820. The bus bar assembly 1036 includes three annular conductors 1078 (FIGS. 49-50) and an overmolded body 1080 that fixedly supports the conductors 1078. Each conductor 1078 includes four winding connection terminals or tangs 1082 provided at two opposite ends of the conductor 1078, and a power connection terminal 1084 protruding from the conductor 1078. The overmolded body 1080 includes three mounting arms 1094 protruding radially from a central region of the body 1080 and spaced at equal intervals about the circumference thereof. The mounting arms 1094 engage mounting portions 870 defined by the overmolded insulators 848 of the first stator segments 842*a*. The mounting arms 1094 can be secured to the mounting portions 870 via, e.g., threaded fasteners.

Each terminal 1084 electrically connects to a PCBA (e.g., via wires; not shown) that receives power from the battery pack 16 (FIG. 1) and selectively applies electrical current to the stator windings 850. The leads 886 of the windings 850 connect to the two adjacent tangs 1082 of the conductors 1078. In this way, the conductors 1078 electrically connect the stator windings 850 to the PCBA.

The overmolded body 1080 defines a central aperture or bearing pocket 1090 that receives the rotor bearing 92 (FIG. 3). The rotor bearing 92 receives the rotor shaft 30 of the rotor assembly 22 (FIG. 3) to rotatably support the rotor assembly 22. Since the bus bar assembly 1036 is secured to each mounting portion 870 of each stator segment 842*a*, and further supports the rotor bearing 92, the bus bar assembly 1036 centers the rotor assembly 22 with respect to the stator assembly 820.

A PCBA 1039, such as a rotor position sensor circuit board, is coupled to the overmolded body 1080 of the bus bar assembly 1036. The PCBA 1039 is generally annular in shape and received into a corresponding centrally located, annularly shaped recess 1041 defined in the overmolded body 1080 and secured thereto by threaded fasteners. The PCBA 1039 covers at least a portion of the bearing pocket 1090.

Figure 47:
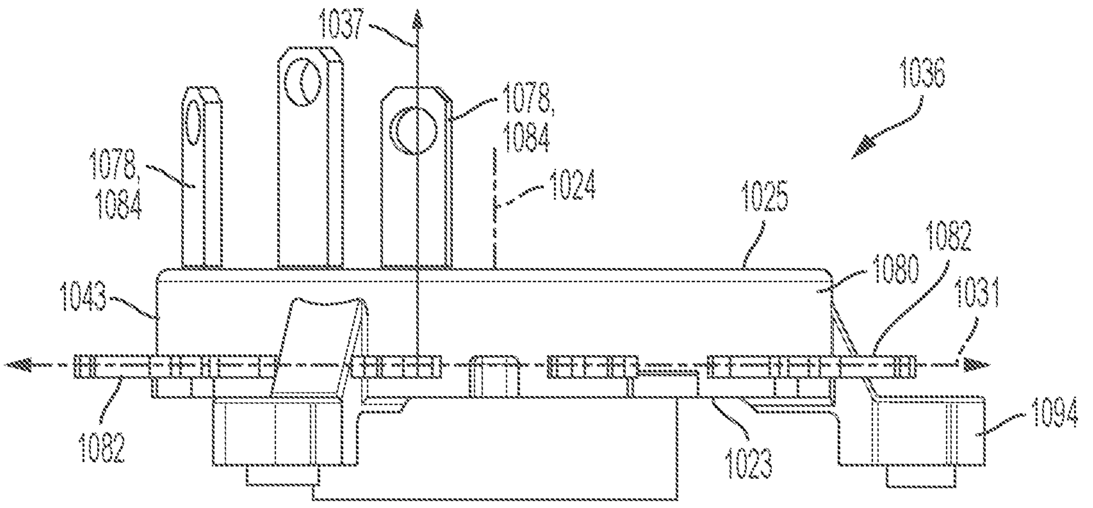
FIG. 47 is a side view illustrating a bus bar assembly of the electric motor of FIG. 45.
Figure 48:
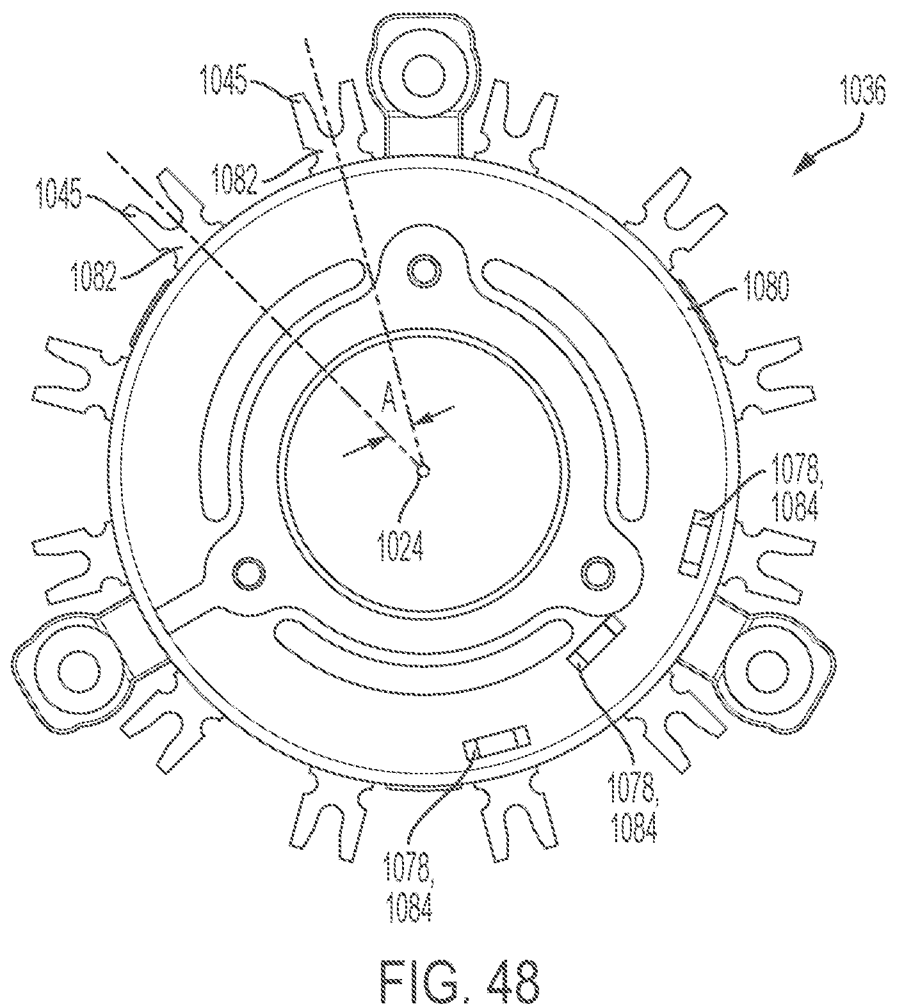
FIG. 48 is a plan view of the bus bar assembly of FIG. 47.
Figure 49:
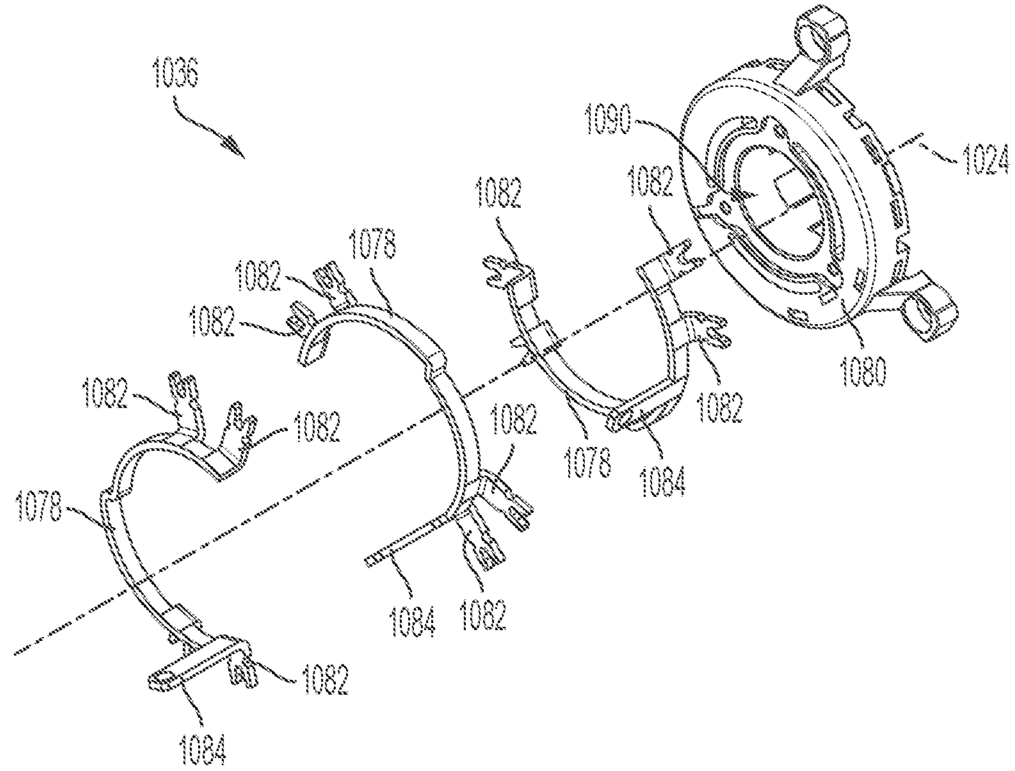
FIG. 49 is an exploded perspective view of the bus bar assembly of FIG. 47.
Figure 50:
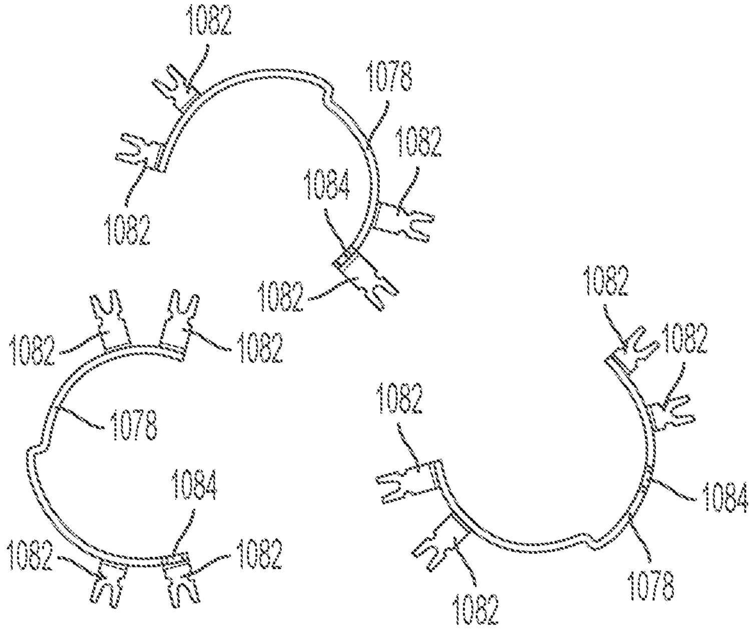
FIG. 50 is an exploded plan view of the bus bar assembly of FIG. 47 with portions removed.
Figure 51:
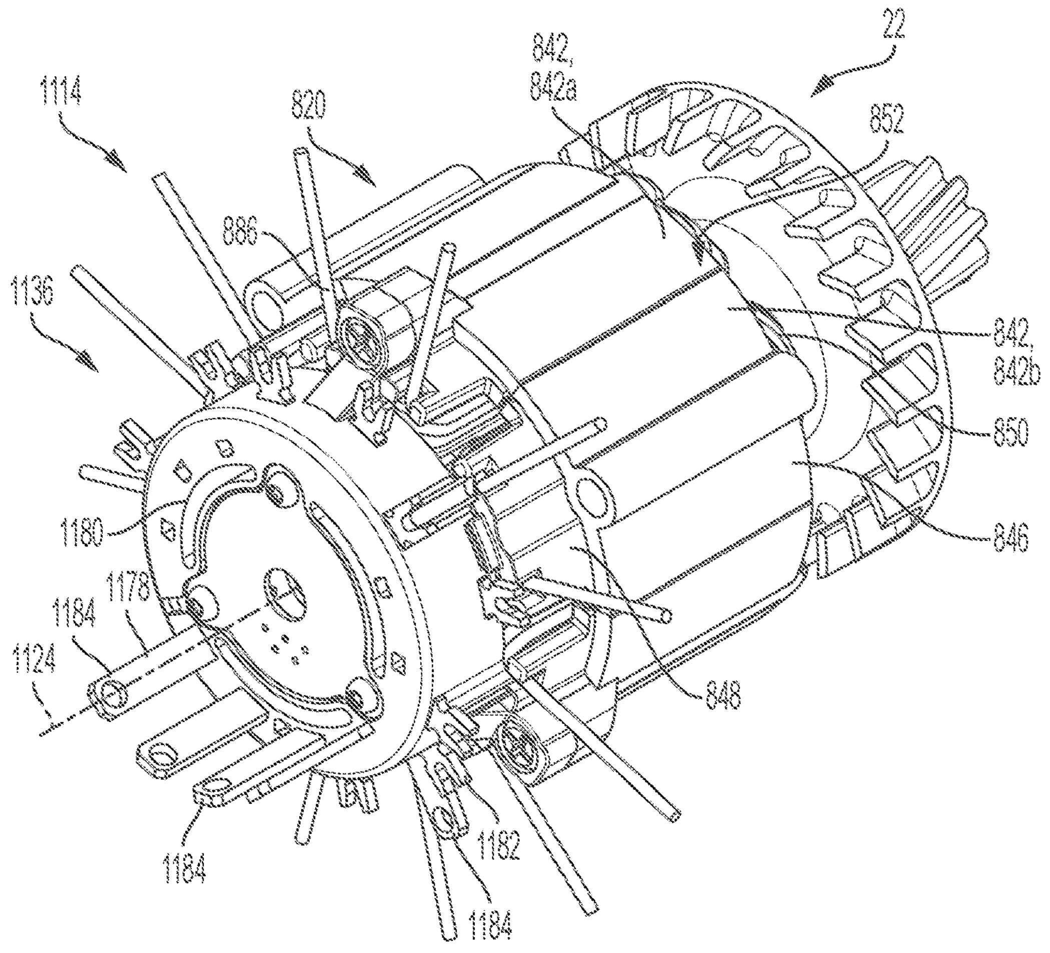
FIG. 51 is a perspective view of portions of an electric motor according to another embodiment.
Figure 52:
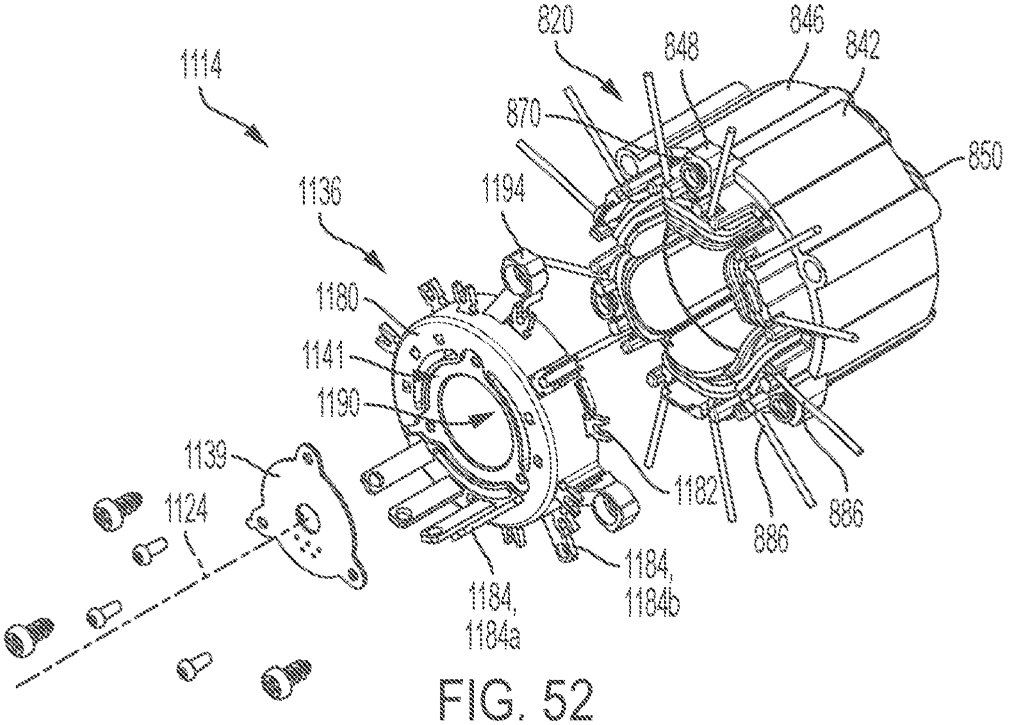
FIG. 52 is a partially exploded perspective view of the electric motor of FIG. 51.

As shown in FIG. 47, the overmolded body 1080 includes a first axial surface 1023 extending at a first axial end thereof and a second axial surface 1025 extending at a second axial end thereof. The first axial surface 1023 faces toward the stator assembly 820 and the second axial surface 1025 faces away from the stator assembly 820. The overmolded body 1080 also includes a circumferential outer surface 1043 that extends between the first and second axial surfaces 1023, 1025. The tangs 1082 each protrude from the circumferential outer surface 1043 generally in the radial direction. Each tang 1082 includes a forked tip 1045 at its distal end and is generally planar in shape. The corresponding lead 886 (FIG. 45) of the adjacent stator winding 850 is received by and contacts the forked tip 1045 and is mechanically attached thereto by, e.g., laser welding. In other embodiments, the leads 886 can be attached to the forked tips 1045 by other means, such as soldering, ultrasonic welding, crimping, and the like. As further shown in FIG. 47, each of the tangs 1082 are also generally located within the same axial region of the motor 1014. In particular, each tang 1082 lies within and defines a first plane 1031 that extends perpendicular to the central axis 1024. As shown in FIG. 47, the tangs 1082 are spaced at generally equal intervals about the circumference of the overmolded body 1080. As such, an angle A is measured on center about the central axis 1024 between any two adjacent tangs 1082. In the illustrated embodiment, the bus bar assembly 1036 includes twelve tangs 1082 and the angle A is approximately 30 degrees.

In the illustrated embodiment, the bus bar assembly 1036 includes three power connection terminals 1084 that protrude from the second axial surface 1025 of the overmolded body 1080 in an axial direction 1037. Each terminal 1084 is formed as a straight leg oriented perpendicular to the central axis 1024. All of the terminals 1084 extend generally parallel to one another and perpendicular to the first plane 1031.

The bus bar assembly 1036 is configured to provide a parallel delta winding configuration for the motor 1014. Specifically, when the leads 886 of the windings 850 forming each coil are connected to the corresponding forked tips 1045 of the respective nearest tangs 1082, the windings 850 are arranged in a parallel delta winding configuration.

FIGS. 51-56 illustrate portions of an electric motor 1114 according to another embodiment of the disclosure. The motor 1114 includes the segmented stator assembly 820 described herein in connection with FIGS. 33-38, and is operable with the rotor assembly 22 described herein in connection with FIGS. 2-4 and 12.

The motor 1114 includes a bus bar assembly 1136 that couples to an axial end of the stator assembly 820. The bus bar assembly 1136 includes six annular conductors 1178 (FIGS. 55 and 56) and an overmolded body 1180 that fixedly supports the conductors 1178. Each conductor 1178 includes two winding connection terminals or tangs 1182 provided at two opposite ends of the conductor 1178 and a power connection terminal 1184. The overmolded body 1180 includes three mounting arms 1194 protruding radially from a central region of the body 1180 and spaced at equal intervals about the circumference thereof. The mounting arms 1194 engage mounting portions 870 defined by the overmolded insulators 848 of the first stator segments 842*a*. The mounting arms 1194 can be secured to the mounting portions 870 via, e.g., threaded fasteners.

Each terminal 1184 electrically connects to a PCBA (e.g., via wires; not shown) that receives power from the battery pack 16 (FIG. 1) and selectively applies electrical current to the stator windings 850. The two leads 886 of each winding 850 forming each coil connect to the two adjacent tangs 1182 of the conductors 1178. In this way, the conductors 1178 electrically connect the stator windings 850 to the PCBA.

The overmolded body 1180 defines a central aperture or bearing pocket 1190 that receives the rotor bearing 92 (FIG. 3). The rotor bearing 92 receives the rotor shaft 30 of the rotor assembly 22 (FIG. 3) to rotatably support the rotor assembly 22. Since the bus bar assembly 1136 is secured to each mounting portion 870 of each stator segment 842*a*, and further supports the rotor bearing 92, the bus bar assembly 1136 centers the rotor assembly 22 with respect to the stator assembly 820.

A PCBA 1139, such as a rotor position sensor circuit board, is coupled to the overmolded body 1180 of the bus bar assembly 1136. The PCBA 1139 is generally annular in shape and received into a corresponding centrally located, annularly shaped recess 1141 defined in the overmolded body 1180 and secured thereto by threaded fasteners. The PCBA 1139 covers at least a portion of the bearing pocket 1190.

Figure 53:
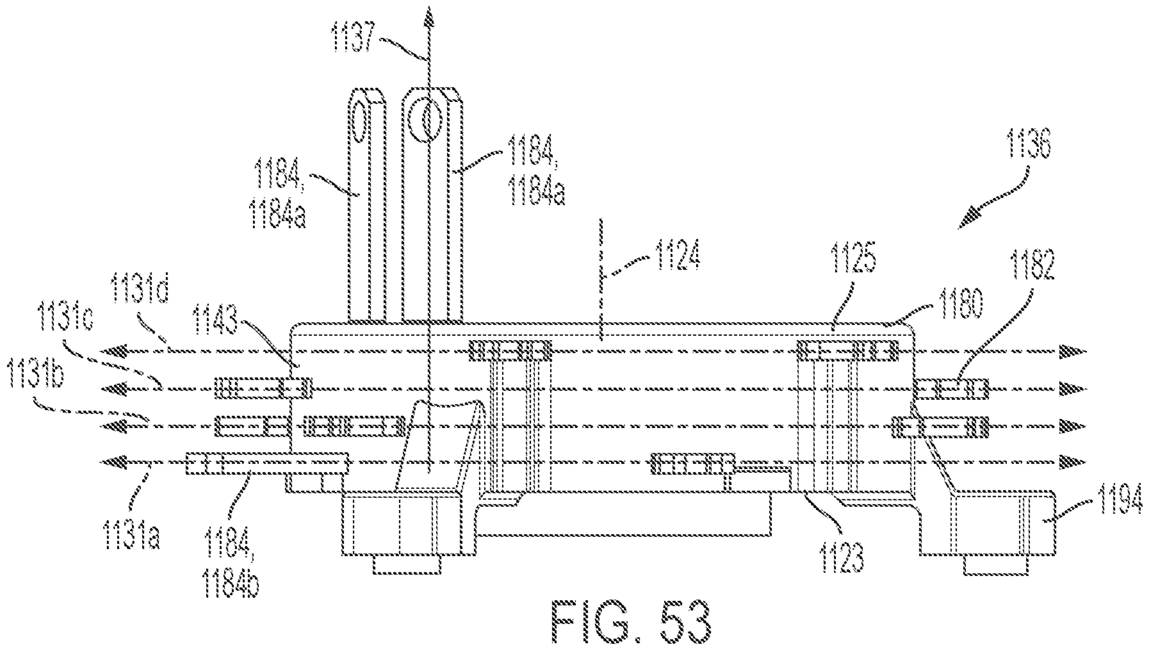
FIG. 53 is a side view illustrating a bus bar assembly of the electric motor of FIG. 51.
Figure 54:
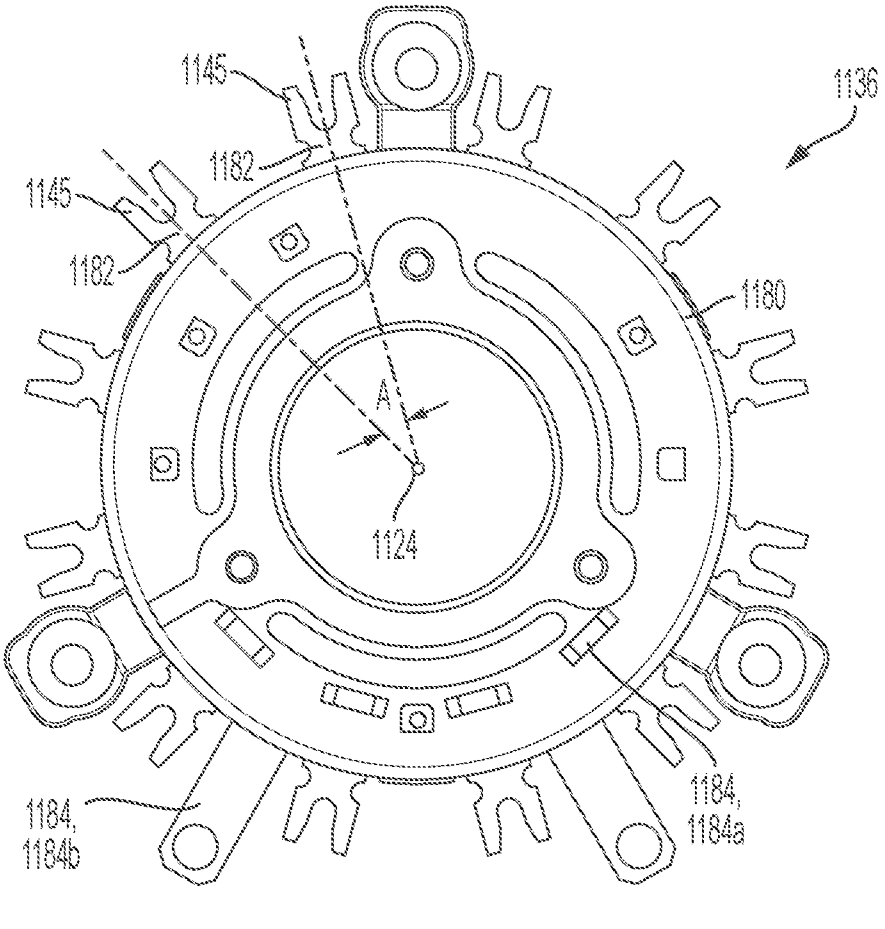
FIG. 54 is a plan view of the bus bar assembly of FIG. 53.
Figure 55:
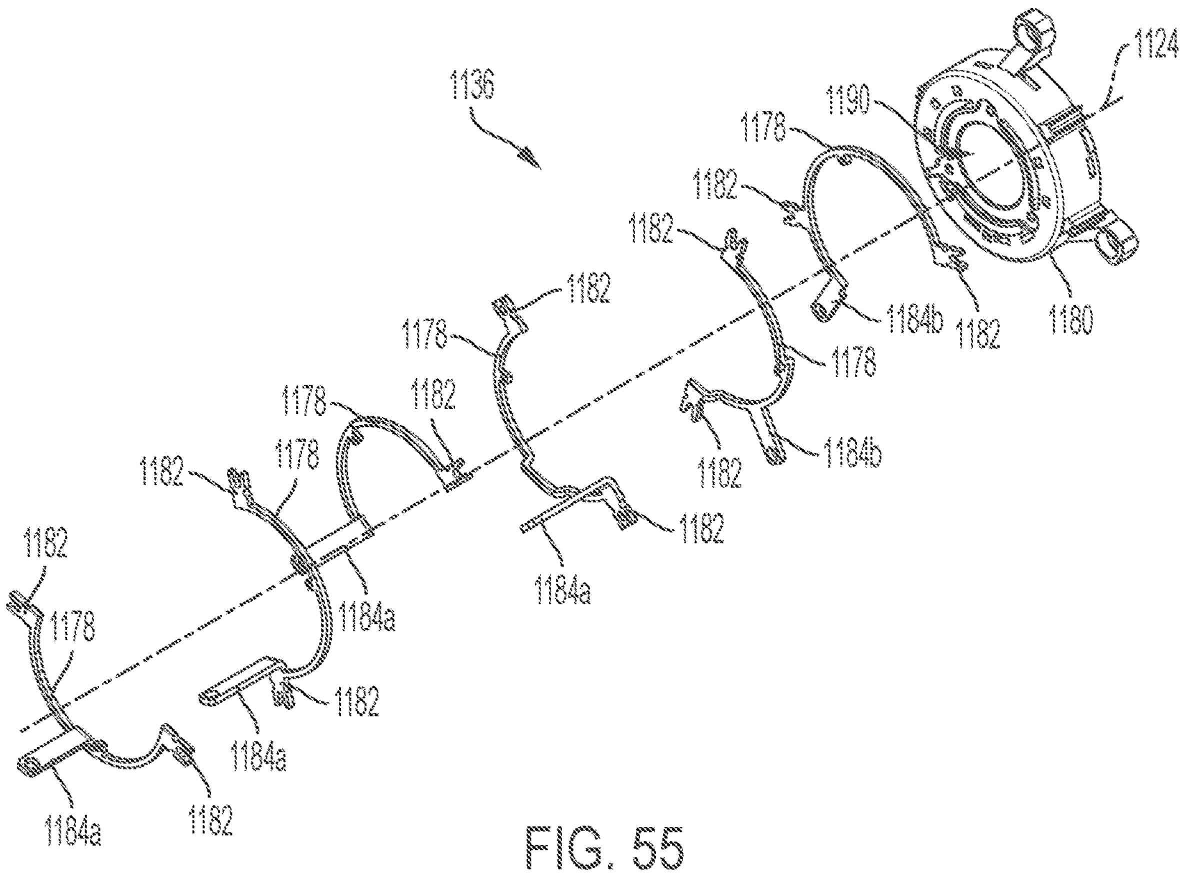
FIG. 55 is an exploded perspective view of the bus bar assembly of FIG. 53.
Figure 56:
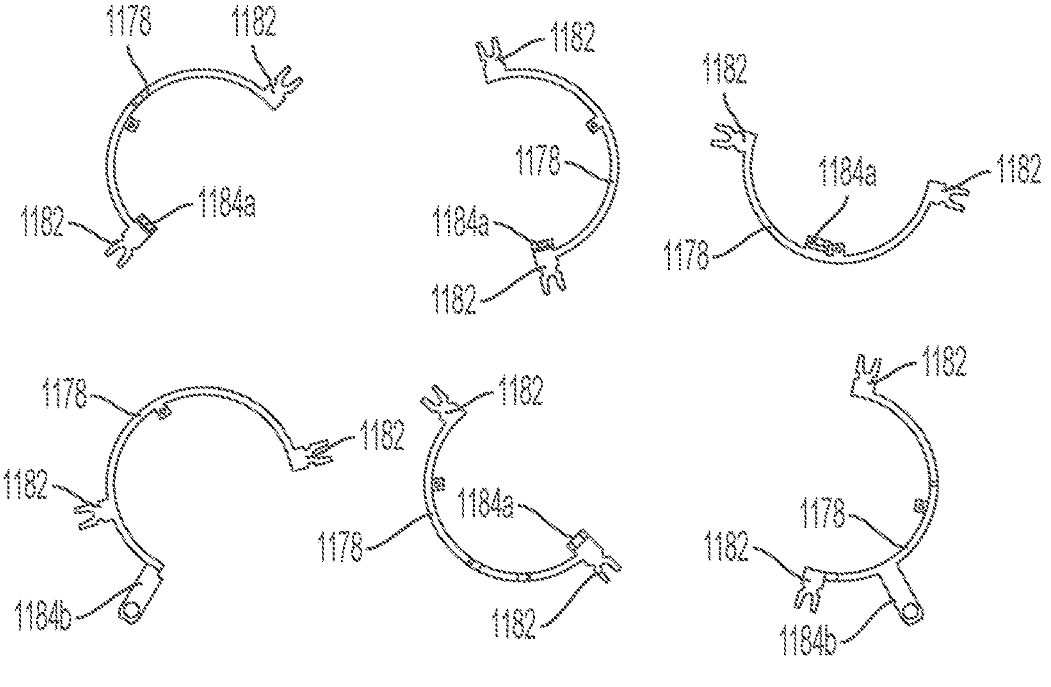
FIG. 56 is an exploded plan view of the bus bar assembly of FIG. 53 with portions removed.
Figure 57:
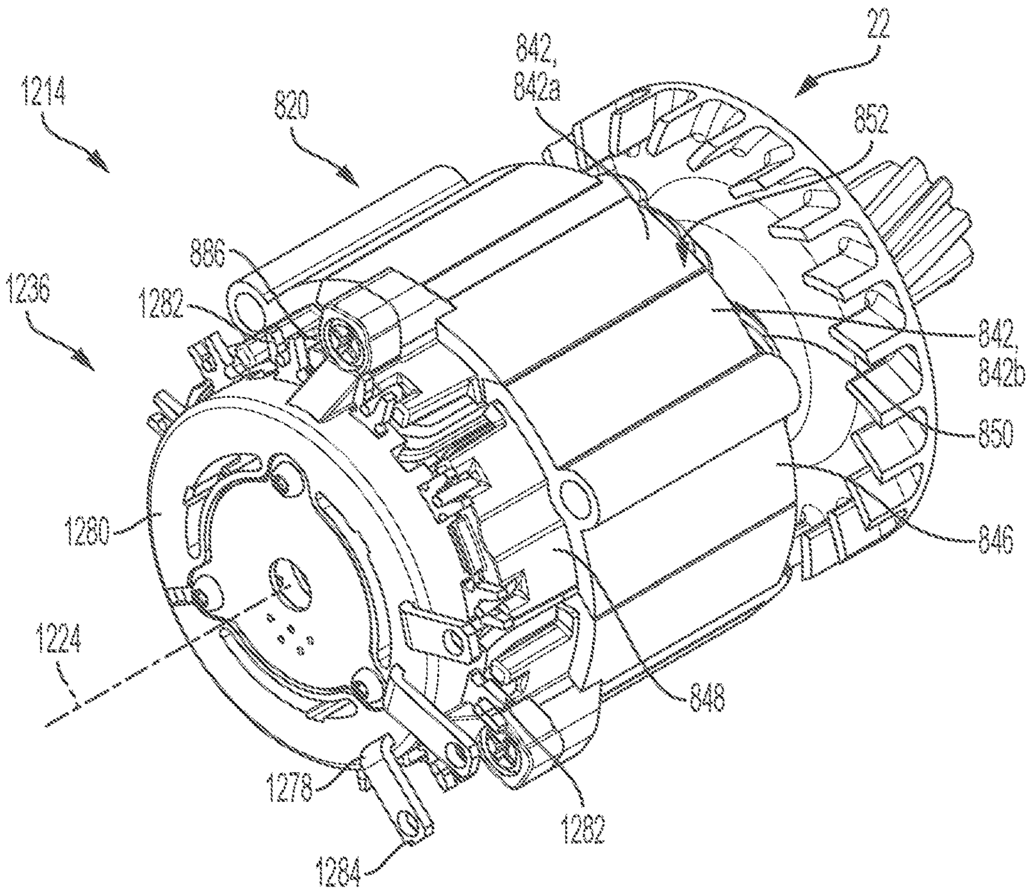
FIG. 57 is a perspective view of portions of an electric motor according to another embodiment.
Figure 58:
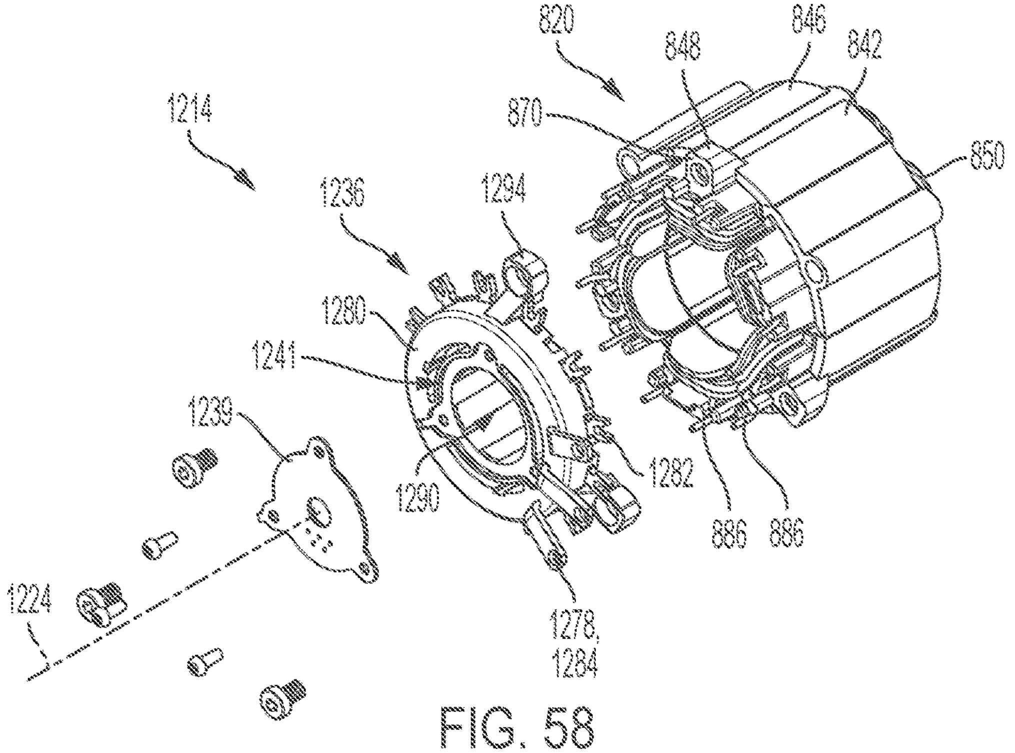
FIG. 58 is a partially exploded perspective view of the electric motor of FIG. 57.

As shown in FIG. 53, the overmolded body 1180 includes a first axial surface 1123 extending at a first axial end thereof and a second axial surface 1125 extending at a second axial end thereof. The first axial surface 1123 faces toward the stator assembly 820 and the second axial surface 1125 faces away from the stator assembly 820. The overmolded body 1180 also includes a circumferential outer surface 1143 that extends between the first and second axial surfaces 1123, 1125. The tangs 1182 each protrude from the circumferential outer surface 1143 generally in the radial direction. Each tang 1182 includes a forked tip 1145 at its distal end and is generally planar in shape. The corresponding lead 886 (FIG. 51) of the adjacent stator winding 850 is received by and contacts the forked tip 1145 and is mechanically attached thereto by, e.g., laser welding. In other embodiments, the leads 886 can be attached to the forked tips 1145 by other means, such as soldering, ultrasonic welding, crimping, and the like. As further shown in FIG. 53, each of the tangs 1182 are also generally located within different axial regions of the motor 1114. In particular, some of the tangs 1182 lie within and defines a first plane 1131*a*, others of the tangs 1182 lie within and define a second plane 1131*b*, others of the tangs 1182 lie within and define a third plane 1131*c*, and yet others of the tangs 1182 lie within and define a fourth plane 1131*d*. Each of the first, second, third, and fourth planes 1131*a*-1131*d* extend parallel to one another and perpendicular to the central axis 1124 and are spaced apart from each other at intervals in the axial direction. As shown in FIG. 54, the tangs 1182 are spaced at generally equal intervals about the circumference of the overmolded body 1180. As such, an angle A is measured on center about the central axis 1124 between any two adjacent tangs 1182. In the illustrated embodiment, the bus bar assembly 1136 includes twelve tangs 1182 and the angle A is approximately 30 degrees.

In the illustrated embodiment, the bus bar assembly 1136 includes six terminals 1184 that are gathered to one lateral side of the overmolded body 1180. The terminals 1184 include four first terminals 1184*a* that protrude from the second axial surface 1125 of the overmolded body 1180 in an axial direction 1137. Each terminal 1184*a* is formed as a straight leg oriented perpendicular to the central axis 1124. All of the first terminals 1184*a* extend generally parallel to one another and perpendicular to the first plane 1131*a*. The terminals 1184 also include two second terminals 1184*b* that protrude radially outward from the circumferential surface 1143 of the overmolded body 1180 in a direction that is perpendicular to the central axis 1124. Both of the second terminals 1184*b* reside in the first plane 1131*a* that extends perpendicular to the central axis 1124.

The bus bar assembly 1136 is configured to provide a delta wye winding configuration for the motor 1014. Specifically, when the leads 886 of the windings 850 forming each coil are connected to the corresponding forked tips 1145 of the respective nearest tangs 1182, the windings 850 are arranged in a delta wye winding configuration.

FIGS. 57-62 illustrate all or portions of an electric motor 1214 according to another embodiment of the disclosure. The motor 1214 includes the segmented stator assembly 820 described herein in connection with FIGS. 33-38, and is operable with the rotor assembly 22 described herein in connection with FIGS. 2-4 and 12.

The motor 1214 includes a bus bar assembly 1236 that couples to an axial end of the stator assembly 820. The bus bar assembly 1236 includes three annular conductors 1278 (FIGS. 61-62) and an overmolded body 1280 that fixedly supports the conductors 1278. Each conductor 1278 includes four winding connection terminals or tangs 1282 provided at two opposite ends of the conductor 1278, and a power connection terminal 1284 protruding from the conductor 1278. The overmolded body 1280 includes three mounting arms 1294 protruding radially from a central region of the body 1280 and spaced at equal intervals about the circumference thereof. The mounting arms 1294 engage mounting portions 870 defined by the overmolded insulators 848 of the first stator segments 842*a*. The mounting arms 1294 can be secured to the mounting portions 870 via, e.g., threaded fasteners.

Each terminal 1284 electrically connects to a PCBA (e.g., via wires; not shown) that receives power from the battery pack 16 (FIG. 1) and selectively applies electrical current to the stator windings 850. The leads 886 of the windings 850 connect to the two adjacent tangs 1282 of the conductors 1278. In this way, the conductors 1278 electrically connect the stator windings 850 to the PCBA.

The overmolded body 1280 defines a central aperture or bearing pocket 1290 that receives the rotor bearing 92 (FIG. 3). The rotor bearing 92 receives the rotor shaft 30 of the rotor assembly 22 (FIG. 3) to rotatably support the rotor assembly 22. Since the bus bar assembly 1236 is secured to each mounting portion 870 of each stator segment 842*a*, and further supports the rotor bearing 92, the bus bar assembly 1236 centers the rotor assembly 22 with respect to the stator assembly 820.

A PCBA 1239, such as a rotor position sensor circuit board, is coupled to the overmolded body 1280 of the bus bar assembly 1236. The PCBA 1239 is generally annular in shape and received into a corresponding centrally located, annularly shaped recess 1241 defined in the overmolded body 1280 and secured thereto by threaded fasteners. The PCBA 1239 covers at least a portion of the bearing pocket 1290.

Figure 59:
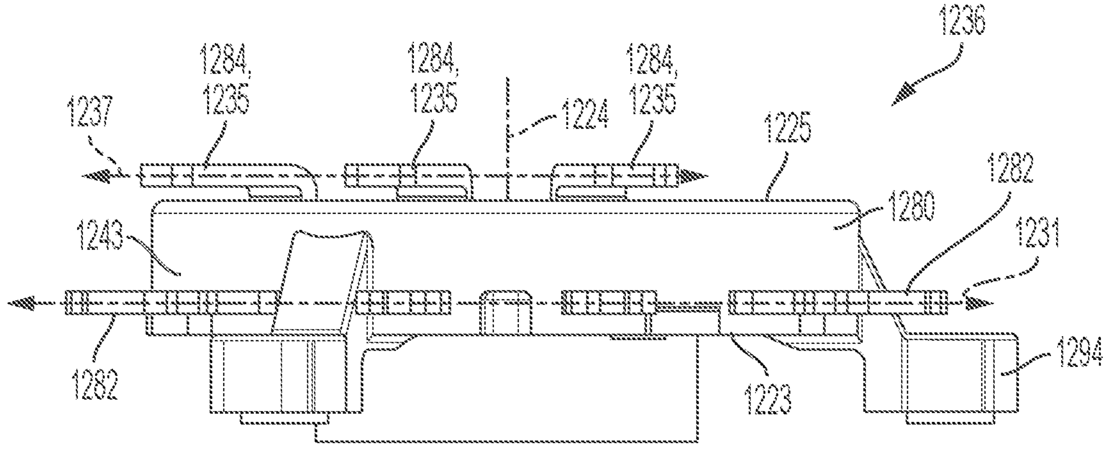
FIG. 59 is a side view illustrating a bus bar assembly of the electric motor of FIG. 57.
Figure 60:
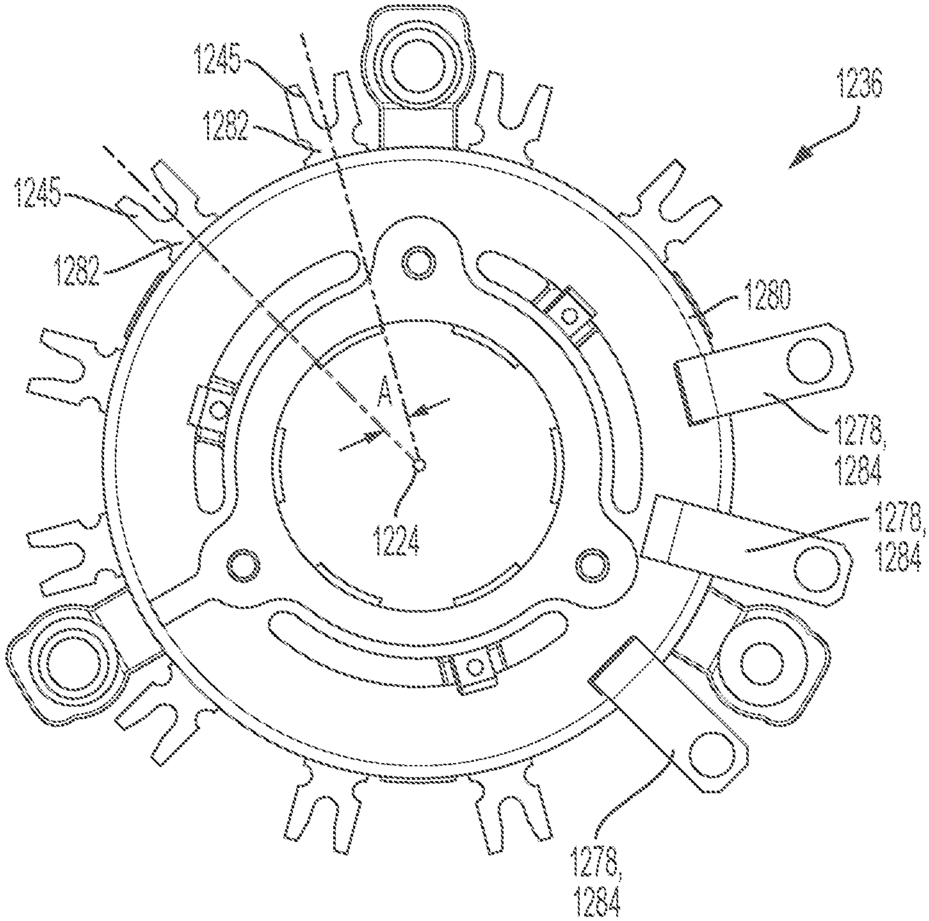
FIG. 60 is a plan view of the bus bar assembly of FIG. 59.
Figure 61:
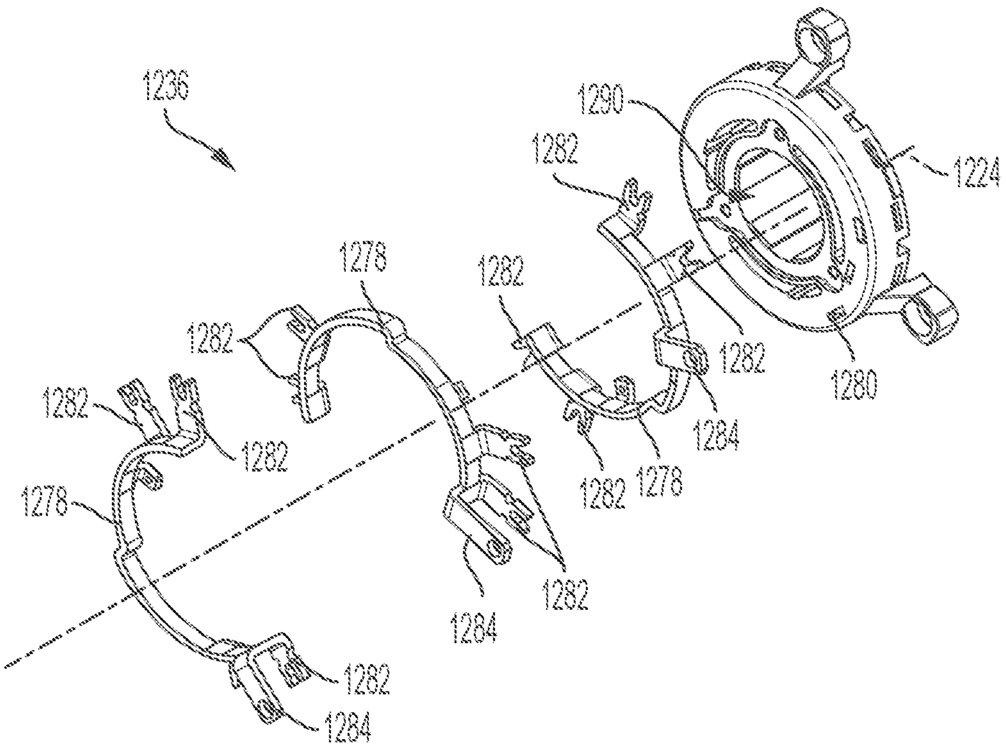
FIG. 61 is an exploded perspective view of the bus bar assembly of FIG. 59.
Figure 62:
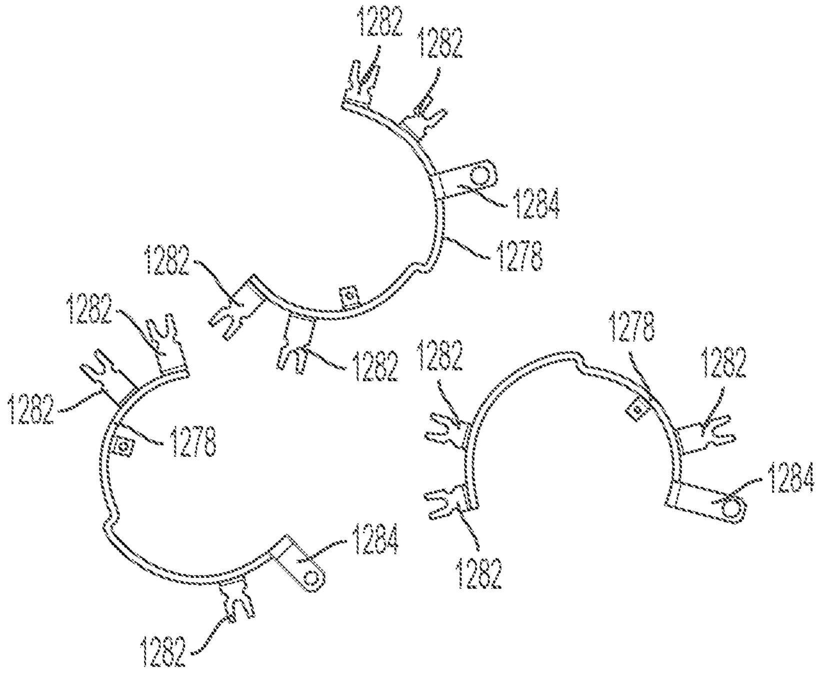
FIG. 62 is an exploded plan view of the bus bar assembly of FIG. 59 with portions removed.

As shown in FIG. 59, the overmolded body 1280 includes a first axial surface 1223 extending at a first axial end thereof and a second axial surface 1225 extending at a second axial end thereof. The first axial surface 1223 faces toward the stator assembly 820 and the second axial surface 1225 faces away from the stator assembly 820. The overmolded body 1280 also includes a circumferential outer surface 1243 that extends between the first and second axial surfaces 1223, 1225. The tangs 1282 each protrude from the circumferential outer surface 1243 generally in the radial direction. Each tang 1282 includes a forked tip 1245 at its distal end and is generally planar in shape. The corresponding lead 886 (FIG. 45) of the adjacent stator winding 850 is received by and contacts the forked tip 1245 and is mechanically attached thereto by, e.g., laser welding. In other embodiments, the leads 886 can be attached to the forked tips 1245 by other means, such as soldering, ultrasonic welding, crimping, and the like. As further shown in FIG. 47, each of the tangs 1282 are also generally located within the same axial region of the motor 1214. In particular, each tang 1282 lies within and defines a first plane 1231 that extends perpendicular to the central axis 1224. As shown in FIG. 60, the tangs 1282 are spaced at generally equal intervals about the circumference of the overmolded body 1280. As such, an angle A is measured on center about the central axis 1224 between any two adjacent tangs 1282. In the illustrated embodiment, the bus bar assembly 1236 includes twelve tangs 1282 and the angle A is approximately 30 degrees.

In the illustrated embodiment, the bus bar assembly 1236 includes three power connection terminals 1284. Each terminal 1284 protrudes from the second axial surface 1225 of the overmolded body 1280 and includes a leg portion 1235 that extends radially outward perpendicular to the central axis 1224. The longitudinal extents of each leg portion 935 together define a second plane 1237 that extends perpendicular to the central axis 1224 and parallel to the first plane 1231.

Figure 63:
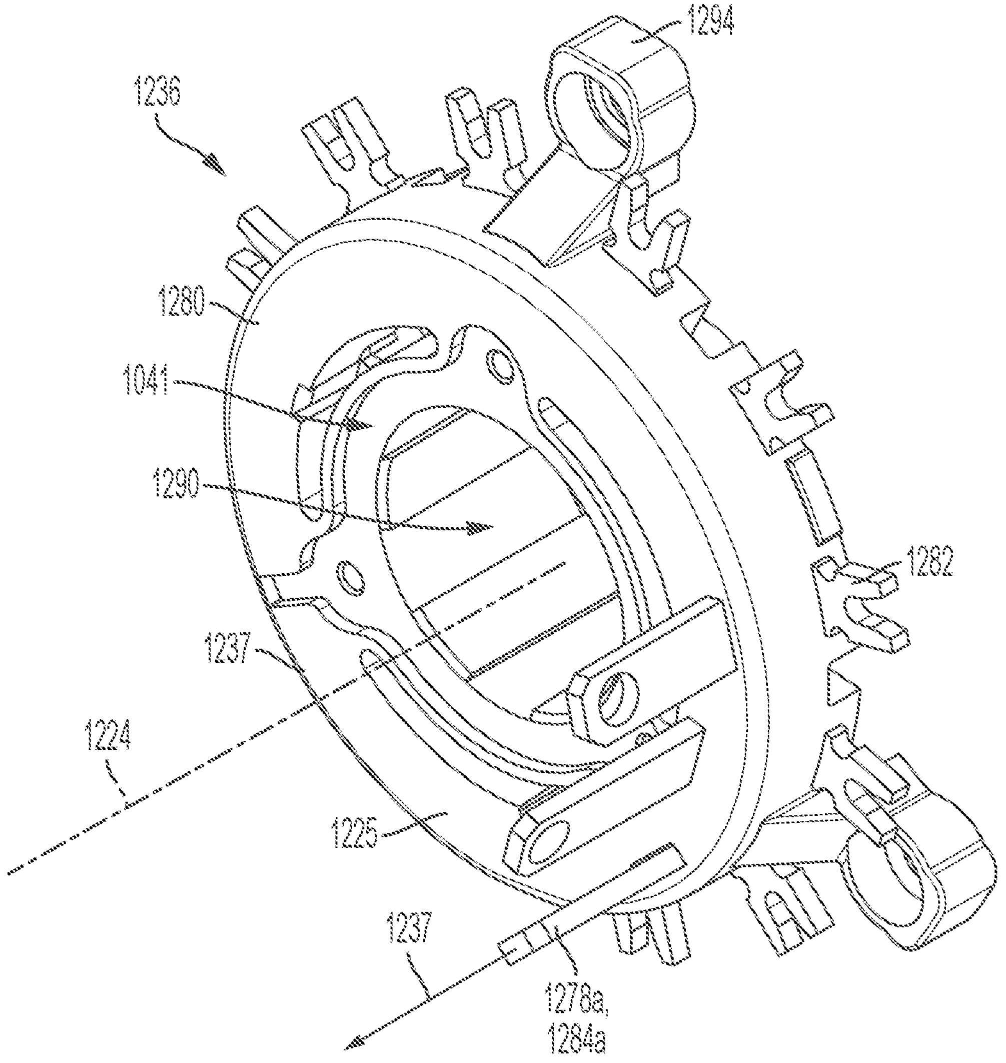
FIG. 63 is a perspective view illustrating a bus bar assembly of the electric motor of FIG. 57 according to another embodiment.

FIG. 63 illustrates the bus bar assembly 1236 according to another embodiment. The bus bar assembly 1236 of FIG. 63 is substantially similar to the bus bar assembly 1236 of FIGS. 57-62, but differs with respect to the power connection terminals. In particular, the bus bar assembly 1236 of FIG. 63 includes three modified conductors **1278*a* having three power connection terminals 1284*a* that protrude from the second axial surface 1225 of the overmolded body 1280 in an axial direction 1237. Each terminal 1284*a* is formed as a straight leg oriented perpendicular to the central axis 1224. All of the terminals 1284** extend generally parallel to one another.

The bus bar assembly 1236 is configured to provide a series delta winding configuration for the motor 1214. Specifically, when the leads 886 of the windings 850 forming each coil are connected to the corresponding forked tips 1245 of the respective nearest tangs 1282, the windings 850 are arranged in a series delta winding configuration.

Various features of the disclosure are set forth in the following claims.

What is claimed is:

1. An electric motor comprising:

a rotor assembly including a rotor shaft;

a stator assembly including a plurality of stator segments, each stator segment including a core, an insulator at least partially covering the core, and a coil winding, the plurality of stator segments including a first stator segment and a second stator segment adjacent the first stator segment in a circumferential direction;

a printed circuit board assembly configured to direct electric current to each coil winding;

a bus bar assembly attached to the stator assembly and configured to electrically connect the coil windings to the printed circuit board assembly, the bus bar assembly including a molded body and a plurality of conductors, the bus bar assembly defining a bearing pocket; and a rotor bearing that is received into the bearing pocket and that supports the rotor shaft for rotation relative to the stator assembly;

wherein the molded body includes a central hub that defines the bearing pocket and a plurality of arms extending radially outward from the central hub; and wherein a fastener extends through the printed circuit board assembly, through at least one arm of the plurality of arms, and into a mounting portion of the insulator.

2. The electric motor of claim 1, wherein the stator assembly further comprises a tubular housing that receives the plurality of stator segments.

3. The electric motor of claim 1, wherein the first stator segment is affixed to the second stator segment by laser welding.

4. The electric motor of claim 1, wherein the first stator segment includes a protrusion and the second stator segment includes a notch that receives the protrusion.

5. The electric motor of claim 1, wherein each conductor includes a terminal that protrudes in an axial direction of the motor.

6. The electric motor of claim 5, wherein the printed circuit board assembly includes a plurality of apertures configured to receive the terminals.

7. The electric motor of claim 6, wherein the terminals are soldered to the printed circuit board assembly.

8. The electric motor of claim 5, wherein the conductors include tangs and the coil windings include wire leads that connect to the tangs.

9. The electric motor of claim 8, wherein the wire leads are at least one of soldered to the tangs or fused to the tangs.

10. The electric motor of claim 1, wherein the molded body defines a plurality of axially extending protrusions and the printed circuit board assembly defines a plurality of recesses that receive the axially extending protrusions.

11. An electric motor comprising:

a rotor assembly including a rotor shaft;

a stator assembly including a plurality of stator segments, each stator segment including a core, an insulator at least partially covering the core, and a coil winding, the plurality of stator segments including a first stator segment and a second stator segment adjacent the first stator segment in a circumferential direction;

a bus bar assembly attached to the stator assembly and configured to electrically connect to the coil windings, the bus bar assembly including a molded body and a plurality of conductors, the molded body including a disk portion and a terminal block portion extending axially from a circumferential edge of the disk portion, the disk portion defining a bearing pocket, the terminal block portion supporting a plurality of terminals of the plurality of conductors; and a rotor bearing that is received into the bearing pocket and that supports the rotor shaft for rotation relative to the stator assembly;

wherein the insulator of each stator segment includes a mounting portion, and wherein the disk portion further includes a plurality of radially protruding mounting tabs configured to be secured to the mounting portions via fasteners.

12. The electric motor of claim 11, wherein the stator assembly further comprises a tubular housing that receives the plurality of stator segments.

13. The electric motor of claim 11, wherein the first stator segment is affixed to the second stator segment by laser welding.

14. The electric motor of claim 11, wherein the first stator segment includes a protrusion and the second stator segment includes a notch that receives the protrusion.

* * * * *